United States Patent
Yang et al.

(10) Patent No.: US 12,402,108 B2
(45) Date of Patent: Aug. 26, 2025

(54) 60 GHz PHYSICAL LAYER CONVERGENCE PROTOCOL (PLCP) PROTOCOL DATA UNIT (PPDU) FORMATS

(71) Applicant: QUALCOMM Incorporated, San Diego, CA (US)

(72) Inventors: Lin Yang, San Diego, CA (US); Jialing Li Chen, San Diego, CA (US); Bin Tian, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 17/828,085

(22) Filed: May 31, 2022

(65) Prior Publication Data
US 2023/0388986 A1  Nov. 30, 2023

(51) Int. Cl.
*H04W 72/0453* (2023.01)
*H04L 5/00* (2006.01)
*H04L 27/26* (2006.01)

(52) U.S. Cl.
CPC ....... *H04W 72/0453* (2013.01); *H04L 5/0044* (2013.01); *H04L 5/0078* (2013.01); *H04L 27/2602* (2013.01)

(58) Field of Classification Search
CPC ............. H04W 72/0453; H04L 5/0044; H04L 5/0078; H04L 27/2602; H04L 27/26132;
(Continued)

(56) References Cited

U.S. PATENT DOCUMENTS 9,451,590 B2   9/2016  Sampath et al.
2014/0307650 A1*  10/2014  Vermani ............. H04L 27/2613
                                                    370/329
(Continued)

OTHER PUBLICATIONS

Partial International Search Report—PCT/US2023/066891—ISA/EPO—Aug. 18, 2023.
(Continued)

*Primary Examiner* — Yu-Wen Chang
(74) *Attorney, Agent, or Firm* — Kevin M. Donnelly; Holland & Hart LLP

(57) ABSTRACT

This disclosure provides methods, devices and systems for increasing carrier frequencies for wireless communications in wireless local area networks (WLANs). Some implementations more specifically relate to packet designs that support wireless communications on carrier frequencies above 7 GHz. In some aspects, a wireless communication device may map a physical layer convergence protocol (PLCP) protocol data unit (PPDU) to orthogonal subcarriers according to existing tone plans associated with carrier frequencies below 7 GHz and may up-clock the PPDU for transmission on carrier frequencies above 7 GHz (such as by increasing the frequency of a clock signal used to convert the PPDU between the frequency domain and the time domain). In some implementations, the PPDU may conform to an existing PPDU format designed for sub-7 GHz wireless communications. In some other implementations, the PPDU may conform to a "green field" PPDU format optimized for wireless communications on carrier frequencies above 7 GHz.

30 Claims, 36 Drawing Sheets

(58) Field of Classification Search
CPC ............. H04L 27/2644; H04L 27/2603; H04L 27/26025; H04B 7/0617
See application file for complete search history.

(56) References Cited

U.S. PATENT DOCUMENTS

| | | | |
|---|---|---|---|
| 2016/0173662 A1* | 6/2016 | Seok ................... | H04L 1/1896 |
| | | | 370/252 |
| 2017/0127440 A1* | 5/2017 | Chun .................. | H04W 56/005 |
| 2017/0272976 A1* | 9/2017 | Yang ................... | H04L 27/2613 |
| 2018/0007661 A1 | 1/2018 | Chun et al. | |
| 2019/0158333 A1* | 5/2019 | Zhang ............... | H04L 27/26025 |
| 2019/0208463 A1* | 7/2019 | Lou ....................... | H04W 72/27 |
| 2019/0289612 A1* | 9/2019 | Chen ................... | H04L 27/2613 |
| 2021/0385115 A1* | 12/2021 | Cao ......................... | H04L 69/22 |
| 2022/0159555 A1 | 5/2022 | Cariou et al. | |
| 2023/0119491 A1* | 4/2023 | Liu ..................... | H04L 27/2613 |
| | | | 370/330 |
| 2023/0141111 A1* | 5/2023 | Ciochina .............. | H04B 7/0626 |
| | | | 375/267 |
| 2023/0284195 A1* | 9/2023 | Hu ................... | H04L 27/26025 |
| | | | 370/329 |
| 2024/0179737 A1* | 5/2024 | Tsai ................... | H04L 27/0006 |

OTHER PUBLICATIONS

International Search Report and Written Opinion—PCT/US2023/066891—ISA/EPO—Oct. 31, 2023.

\* cited by examiner

| | | | | |
|---|---|---|---|---|
| 8ᵀᴴ 20*M MHZ | L-STF | L-LTF | L-SIG | Data | PE or TRNs |
| 6ᵀᴴ 20*M MHZ | L-STF | L-LTF | L-SIG | Data | PE or TRNs |
| 6ᵀᴴ 20*M MHZ | L-STF | L-LTF | L-SIG | Data | PE or TRNs |
| 5ᵀᴴ 20*M MHZ | L-STF | L-LTF | L-SIG | Data | PE or TRNs |
| 4ᵀᴴ 20*M MHZ | L-STF | L-LTF | L-SIG | Data | PE or TRNs |
| 3ᴿᴰ 20*M MHZ | L-STF | L-LTF | L-SIG | Data | PE or TRNs |
| 2ᴺᴰ 20*M MHZ | L-STF | L-LTF | L-SIG | Data | PE or TRNs |
| 1ˢᵀ 20*M MHZ | L-STF | L-LTF | L-SIG | Data | PE or TRNs |

910 — arrow; 911 (L-STF/L-LTF), 912 (Data), 913 (PE or TRNs); total 160*M MHz

*Figure 9B*

| | L-STF | L-LTF | L-SIG | SIG-A1 | SIG-A2 | PE or TRNs |
|---|---|---|---|---|---|---|
| 8TH 20*M MHZ | L-STF | L-LTF | L-SIG | SIG-A1 | SIG-A2 | PE or TRNs |
| 7TH 20*M MHZ | L-STF | L-LTF | L-SIG | SIG-A1 | SIG-A2 | PE or TRNs |
| 6TH 20*M MHZ | L-STF | L-LTF | L-SIG | SIG-A1 | SIG-A2 | PE or TRNs |
| 5TH 20*M MHZ | L-STF | L-LTF | L-SIG | SIG-A1 | SIG-A2 | PE or TRNs |
| 4TH 20*M MHZ | L-STF | L-LTF | L-SIG | SIG-A1 | SIG-A2 | PE or TRNs |
| 3RD 20*M MHZ | L-STF | L-LTF | L-SIG | SIG-A1 | SIG-A2 | PE or TRNs |
| 2ND 20*M MHZ | L-STF | L-LTF | L-SIG | SIG-A1 | SIG-A2 | PE or TRNs |
| 1ST 20*M MHZ | L-STF | L-LTF | L-SIG | SIG-A1 | SIG-A2 | PE or TRNs |

*Figure 9C*

| | | | | | | |
|---|---|---|---|---|---|---|
| L-STF | L-LTF | L-SIG | RL-SIG | SIG1 | SIG2 | PE or TRNs |
| L-STF | L-LTF | L-SIG | RL-SIG | SIG1 | SIG2 | PE or TRNs |
| L-STF | L-LTF | L-SIG | RL-SIG | SIG1 | SIG2 | PE or TRNs |
| L-STF | L-LTF | L-SIG | RL-SIG | SIG1 | SIG2 | PE or TRNs |
| L-STF | L-LTF | L-SIG | RL-SIG | SIG1 | SIG2 | PE or TRNs |
| L-STF | L-LTF | L-SIG | RL-SIG | SIG1 | SIG2 | PE or TRNs |
| L-STF | L-LTF | L-SIG | RL-SIG | SIG1 | SIG2 | PE or TRNs |
| L-STF | L-LTF | L-SIG | RL-SIG | SIG1 | SIG2 | PE or TRNs |

Rows (top to bottom): 8TH 20*M MHZ, 7TH 20*M MHZ, 6TH 20*M MHZ, 5TH 20*M MHZ, 4TH 20*M MHZ, 3RD 20*M MHZ, 2ND 20*M MHZ, 1ST 20*M MHZ 930, 931, 932, 933, Beam Management Info. 905, 160*M MHz

*Figure 9D*

60 GHz PHYSICAL LAYER CONVERGENCE PROTOCOL (PLCP) PROTOCOL DATA UNIT (PPDU) FORMATS

TECHNICAL FIELD

This disclosure relates generally to wireless communication, and more specifically, to physical layer convergence protocol (PLCP) protocol data unit (PPDU) formats for wireless communications in the 60 GHz frequency band.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many existing WLAN communication protocols are designed for wireless communications on carrier frequencies below 7 GHz (such as in the 2.4 GHz, 5 GHz, or 6 GHz frequency bands). However, new WLAN communication protocols are being developed to enable enhanced WLAN communication features (such as higher throughput and wider bandwidth) that require even higher carrier frequencies (such as in the 45 GHz or 60 GHz frequency bands). Wireless communications on higher carrier frequencies may suffer from greater phase noise and greater path loss compared to wireless communications on lower carrier frequencies. Thus, as new WLAN communication protocols enable enhanced features, new packet designs and numerology are needed to support wireless communications on carrier frequencies above 7 GHz.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include mapping a first portion of a physical layer (PHY) convergence protocol (PLCP) protocol data unit (PPDU) to a number (N) of subcarriers, where the first portion of the PPDU represents at least portion of a PHY preamble that includes a short training field (STF), a long training field (LTF), and one or more signal (SIG) fields that immediately follow the LTF and carry information for interpreting the PPDU; transforming the N subcarriers into a first time-varying signal at a sampling rate ($f_s$) associated with a first subcarrier spacing (SCS) that is greater than 1.2 MHz, where the first SCS represents an amount of separation, in the frequency domain, between adjacent subcarriers of the N subcarriers; and transmitting the first time-varying signal over a wireless channel having a bandwidth (BW) associated with the sampling rate $f_s$. In some aspects, the first time-varying signal may be transmitted on a carrier frequency above 7 GHz.

In some aspects, the PPDU may conform to a PPDU format associated with wireless communications on a carrier frequency below 7 GHz. In some implementations, the one or more SIG fields may include a legacy SIG field (L-SIG) and a non-legacy SIG field immediately following L-SIG. In some other implementations, the one or more SIG fields may include an L-SIG, a repeat of L-SIG (RL-SIG) immediately following L-SIG, and a non-legacy SIG field immediately following RL-SIG. In some implementations, the STF and the non-legacy SIG field may each consist of two orthogonal frequency-division multiplexing (OFDM) symbols. In some other implementations, the STF may consist of two OFDM symbols that are repeated in time and the non-legacy SIG field may consist of four OFDM symbols.

In some aspects, the PPDU may consist of only the first portion. In some other aspects, the method may further include mapping, to a number (M) of subcarriers, a second portion of the PPDU including at least a data field, a packet extension, or one or more training fields (TRNs); transforming the M subcarriers into a second time-varying signal at the sampling rate $f_s$; and transmitting the second time-varying signal over the wireless channel immediately following the first time-varying signal. In some implementations, the one or more SIG fields may consist of a single SIG field that is immediately followed by the data field, the packet extension, or the one or more TRNs. In some implementations, the second portion of the PPDU may further include one or more additional LTFs. In some implementations, the one or more SIG fields may consist of a single SIG field that is immediately followed by the one or more additional LTFs.

In some implementations, M may be equal to N and BW may be equal to $f_s$. In some other implementations, M may be equal to N and the PPDU may be duplicated for transmission on a number (m) of sub-bands each spanning a respective bandwidth portion equal to BW/m, where BW is equal to $m^*f_s$. Still further, in some implementations, M may be greater than N. In some implementations, the first portion of the PPDU may be duplicated for transmission on a number (n) of sub-bands each spanning a respective bandwidth portion equal to BW/n, where BW is equal to $f_s$. In some implementations, the transformation of the M subcarriers into the second time-varying signal may result in a second SCS equal to the first SCS, where the second SCS represents an amount of separation, in the frequency domain, between adjacent subcarriers of the M subcarriers. In some other implementations, the transformation of the M subcarriers into the second time-varying signal may result in a second SCS different than the first SCS, where the second SCS represents an amount of separation, in the frequency domain, between adjacent subcarriers of the M subcarriers.

In some implementations, the LTF may be transmitted on the same subcarriers as the second portion of the PPDU as a result of duplicating the first portion of the PPDU for transmission on the n sub-bands. In some implementations, the LTF may include a first OFDM symbol and a second OFDM symbol identical to the first OFDM symbol. In some other implementations, the LTF may include a first OFDM symbol and a second OFDM symbol, where the method further includes applying a P-matrix to the LTF so that the first OFDM symbol is different than the second OFDM symbol. In some implementations, the STF may include a Golay sequence. In some implementations, the information carried in the one or more SIG fields may include an indication of whether the PPDU is associated with a beamforming training operation.

Another innovative aspect of the subject matter described in this disclosure can be implemented in a wireless communication device. In some implementations, the wireless communication device may include at least one memory and at least one processor communicatively coupled with the at least one memory and configured to cause the wireless communication device to perform operations including mapping a first portion of a PPDU to a number (N) of subcarriers, where the first portion of the PPDU represents at least portion of a PHY preamble that includes an STF, an LTF, and one or more SIG fields that immediately follow the LTF and carry information for interpreting the PPDU; transforming the N subcarriers into a first time-varying signal at a sampling rate ($f_s$) associated with a first SCS that is greater than 1.2 MHz, where the first SCS represents an amount of separation, in the frequency domain, between adjacent subcarriers of the N subcarriers; and transmitting the first time-varying signal over a wireless channel having a bandwidth (BW) associated with the sampling rate $f_s$.

Another innovative aspect of the subject matter described in this disclosure can be implemented as a method of wireless communication. The method may be performed by a wireless communication device and may include mapping a first portion of a PPDU to a number (N) of subcarriers, where the first portion of the PPDU represents at least portion of a PHY preamble that includes an STF and one or more SIG fields carrying information for interpreting the PPDU; mapping an LTF of the PHY preamble to a number (M) of subcarriers, where the LTF follows the STF and precedes the one or more SIG fields in the PHY preamble, where M is greater than N; transforming the N subcarriers and the M subcarriers to a time-varying signal; and transmitting the time-varying signal over a wireless channel. In some aspects, the wireless channel may be associated with a carrier frequency above 7 GHz.

In some implementations, the method may further include mapping, to the M subcarriers, a second portion of the PPDU including at least a data field, a packet extension, or one or more TRNs. In some implementations, the N subcarriers and the M subcarriers may be transformed to the time-varying signal at a sampling rate ($f_s$) associated with an SCS greater than 1.2 MHz, where the SCS represents an amount of separation, in the frequency domain, between adjacent subcarriers of the N subcarriers. In some implementations, the first portion of the PPDU may be duplicated for transmission on a number (n) of sub-bands each spanning a respective bandwidth portion equal to BW/n.

Another innovative aspect of the subject matter described in this disclosure can be implemented in a wireless communication device. In some implementations, the wireless communication device may include at least one memory and at least one processor communicatively coupled with the at least one memory and configured to cause the wireless communication device to perform operations including mapping a first portion of a PPDU to a number (N) of subcarriers, where the first portion of the PPDU represents at least portion of a PHY preamble that includes an STF and one or more SIG fields carrying information for interpreting the PPDU; mapping an LTF of the PHY preamble to a number (M) of subcarriers, where the LTF follows the STF and precedes the one or more SIG fields in the PHY preamble, where M>N; transforming the N subcarriers and the M subcarriers to a time-varying signal; and transmitting the time-varying signal over a wireless channel.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 9B shows an example up-clocked PPDU based on the PPDU format depicted in FIG. 9A, according to some implementations.

FIG. 9C shows another example up-clocked PPDU based on the PPDU format depicted in FIG. 9A, according to some implementations.

FIG. 9D shows another example up-clocked PPDU based on the PPDU format depicted in FIG. 9A, according to some implementations.

Like reference numbers and designations in the various drawings indicate like elements.

DETAILED DESCRIPTION

Figure 1:
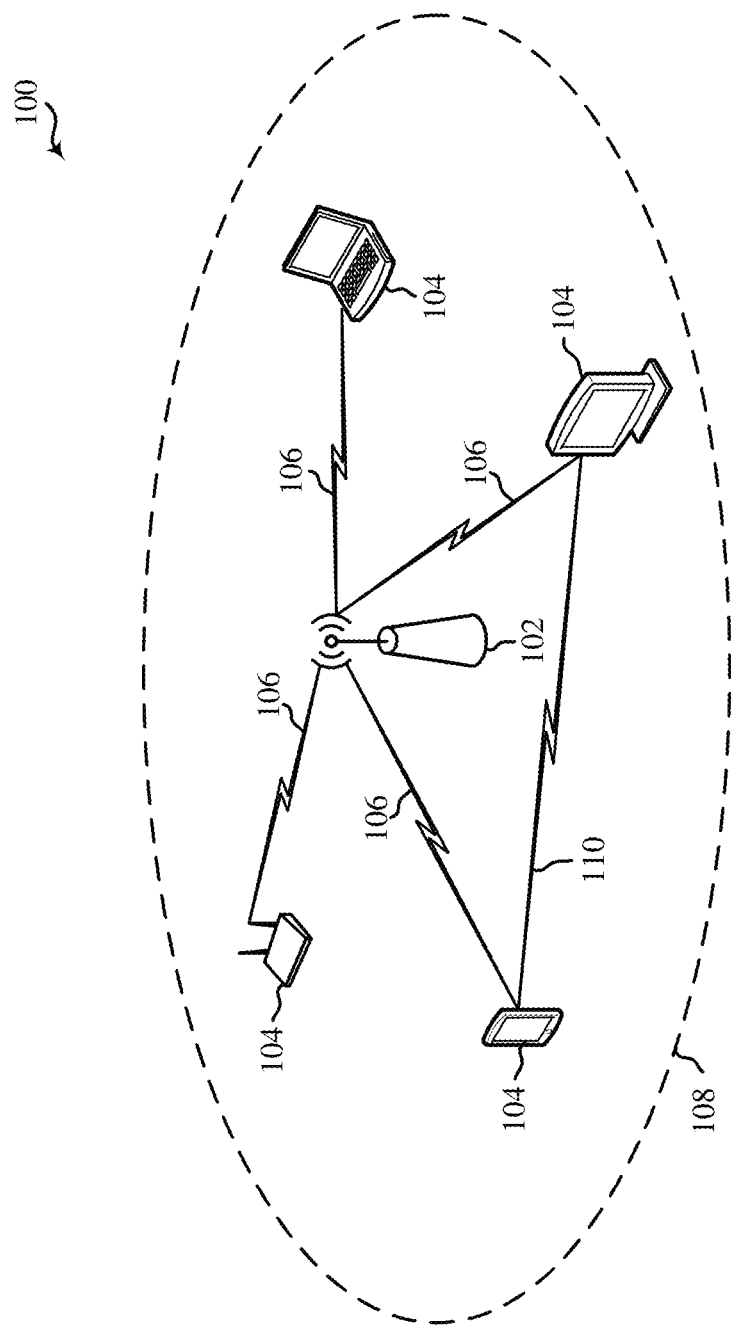
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As described above, new WLAN communication protocols are being developed to enable enhanced features for wireless communications on carrier frequencies above 7 GHz (such as in the 45 GHz or 60 GHz frequency bands). However, wireless communications on higher carrier frequencies may suffer from greater phase noise and path loss compared to wireless communications on lower frequency bands. For example, increasing the carrier frequency from 5.8 GHz to 60 GHz results in a 10× increase in phase noise. Aspects of the present disclosure recognize that the phase noise can be mitigated by increasing the subcarrier spacing (SCS) between modulated subcarriers. Existing WLAN packet formats include a legacy short training field (L-STF) that is modulated on every $4^{th}$ subcarrier spanning a given bandwidth to support carrier frequency offset (CFO) estimations up to 2 subcarriers apart. Aspects of the present disclosure also recognize that the local oscillators (LOs) implemented by existing WLAN transmitters and receivers are required to be accurate up to ±20 ppm. As such, existing WLAN architectures can support CFOs up to ±40 ppm (between the transmitter and the receiver), which is equivalent to ±2.4 MHz in the 60 GHz frequency band and ±1.8 MHz in the 45 GHz frequency band. To support CFOs up to ±2.4 MHz, the SCS associated with L-STF should be greater than or equal to 1.2 MHz Various aspects relate generally to increasing carrier frequencies for wireless communications in WLANs, and more particularly, to packet designs that support wireless communications on carrier frequencies above 7 GHz. In some aspects, a wireless communication device may map a physical layer convergence protocol (PLCP) protocol data unit (PPDU) to orthogonal frequency-division multiplexing (OFDM) subcarriers according to existing tone plans associated with carrier frequencies below 7 GHz (also referred to as "sub-7 GHz" tone plans) and may up-clock the PPDU for transmission on carrier frequencies above 7 GHz. As used herein, the term "up-clocking" refers to increasing the frequency of a clock signal used to convert the PPDU between the frequency domain and the time domain (beyond a frequency ($f_0$) associated with the existing sub-7 GHz tone plan), and the ratio (K) of the up-clocked frequency ($f_s$) to $f_0$ is referred to as the "up-clocking ratio" (where $K=f_s/f_0$). In some aspects, the up-clocking may result in an SCS greater than or equal to 1.2 MHz, where the SCS represents a spacing between the subcarriers to which at least a portion of the PPDU (including L-STF) is mapped. More specifically, the SCS as a result of up-clocking ($SCS_U$) may be a multiple of an SCS associated with the existing sub-7 GHz tone plan ($SCS_0$), where $SCS_U = K*SCS_0$. In some implementations, the up-clocked PPDU may conform to an existing PPDU format designed for sub-7 GHz wireless communications. In some other implementations, the up-clocked PPDU may conform to a new "green field" PPDU format optimized for wireless communications on carrier frequencies above 7 GHz.

Particular implementations of the subject matter described in this disclosure can be implemented to realize one or more of the following potential advantages. By up-clocking PPDUs that are mapped to OFDM subcarriers according to existing sub-7 GHz tone plans, aspects of the present disclosure can leverage existing WLAN hardware to increase the carrier frequencies on which such PPDUs are transmitted (such as to the 60 GHz or 45 GHz frequency bands). As described above, existing WLAN architectures can support CFO estimation in the 60 GHz frequency band if the SCS associated with L-STF is greater than or equal to 1.2 MHz. The SCS depends, in part, on the tone plan used to map the PPDU to the OFDM subcarriers, and more particularly, the size of the inverse fast Fourier transform (IFFT) associated with the tone plan. Aspects of the present disclosure recognize that, for any given IFFT size ($N_{IFFT}$) associated with an existing sub-7 GHz tone plan, a suitable sampling rate $f_s$ can be selected so that $$SCS = \frac{f_s}{N_{IFFT}} \geq 1.2 \text{ MHz}.$$

By up-clocking existing sub-7 GHz tone plans, aspects of the present disclosure can further reuse existing PPDU formats (associated with such tone plans) for wireless communications on carrier frequencies above 7 GHz, thereby reducing the cost and complexity of hardware that would otherwise be needed to support new PPDU formats. On the other hand, by designing new green field PPDU formats, aspects of the present disclosure can reduce the overhead of communications on carrier frequencies above 7 GHz by eliminating various fields, signaling, or other redundancies associated with legacy WLAN protocols (such as in existing PPDU formats).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (vs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
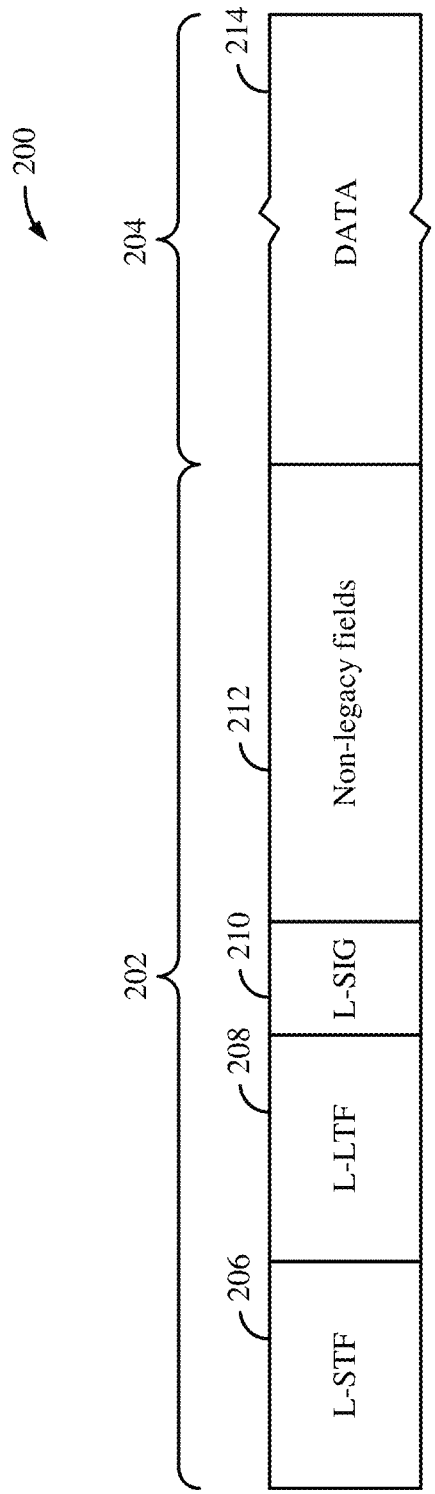
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
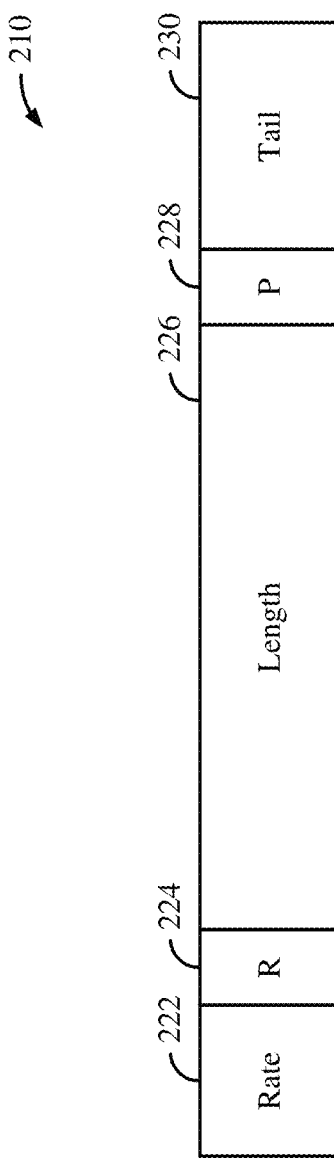
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
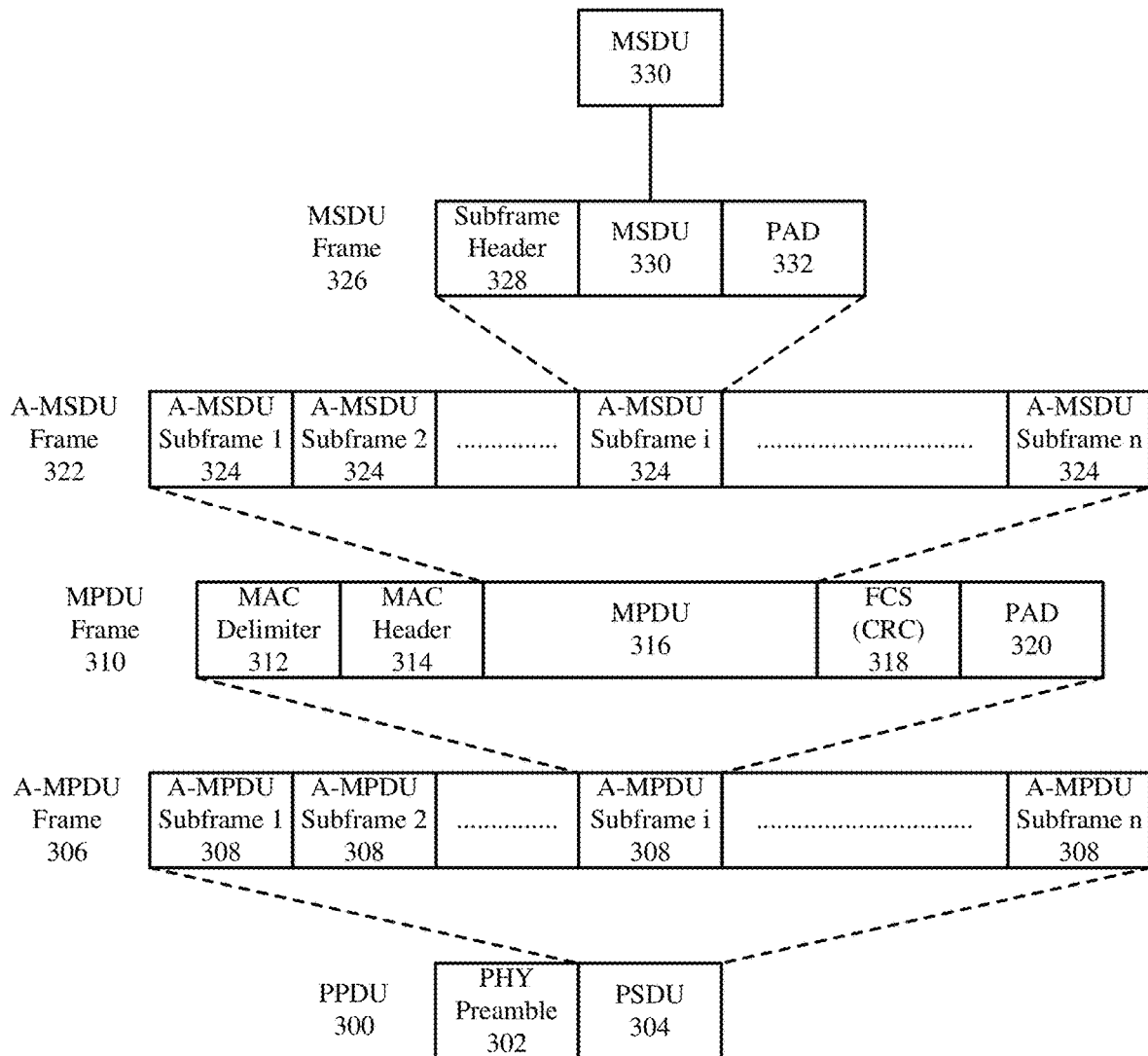
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
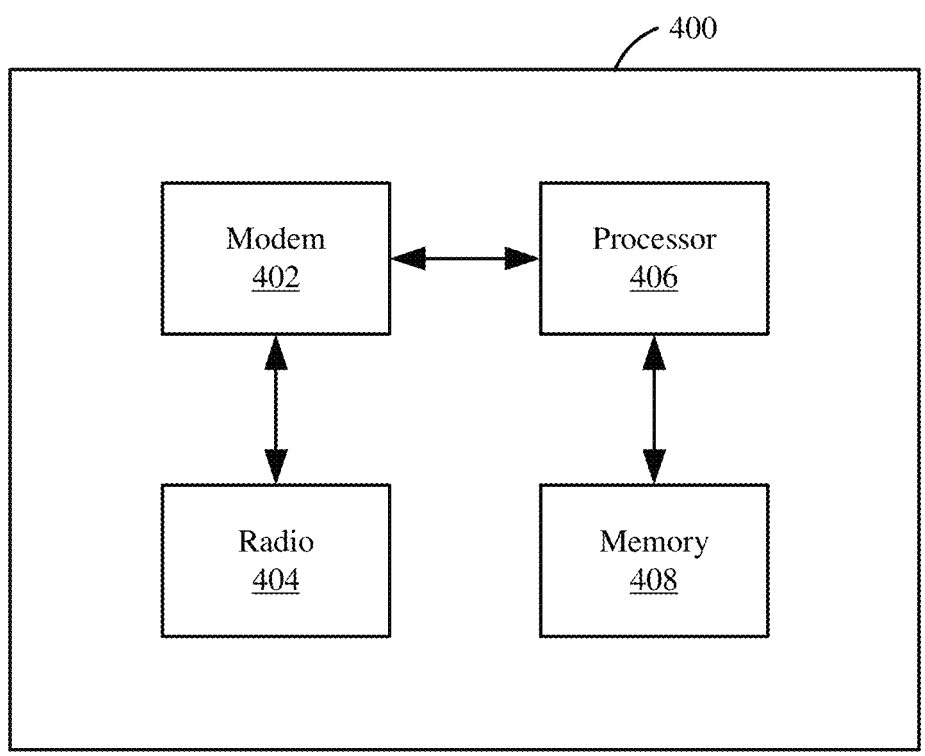
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
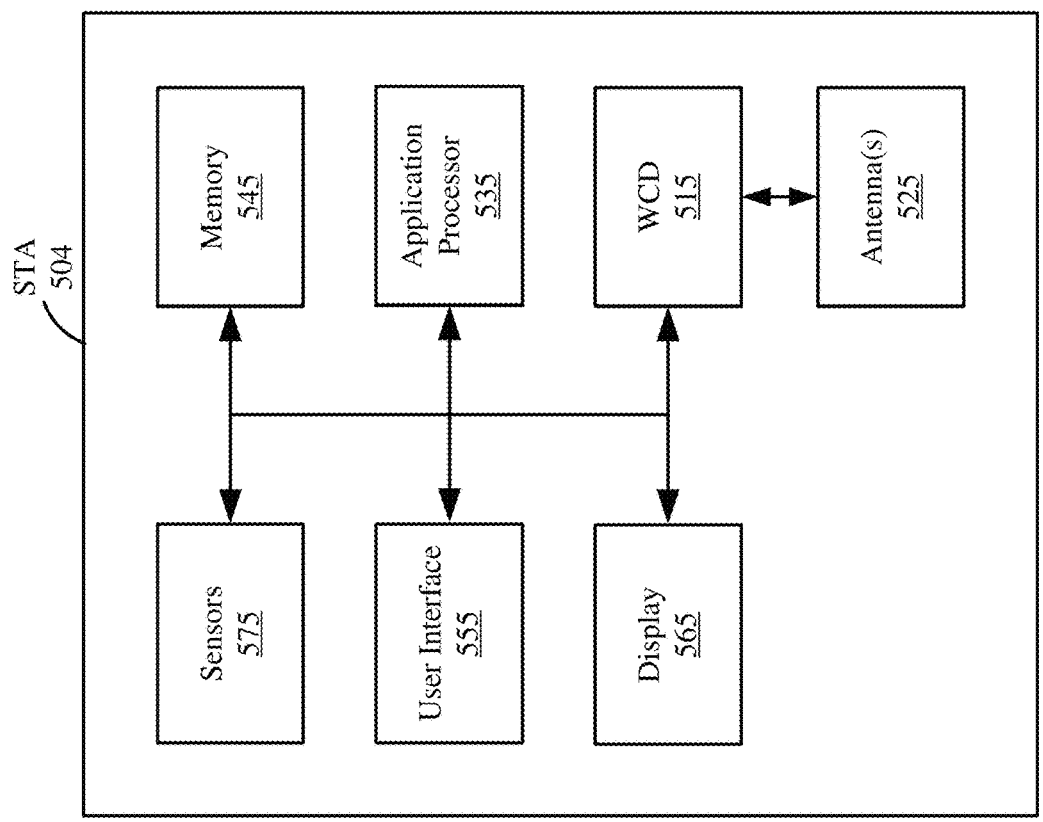
FIG. 5B shows a block diagram of an example STA.
Figure 5A:
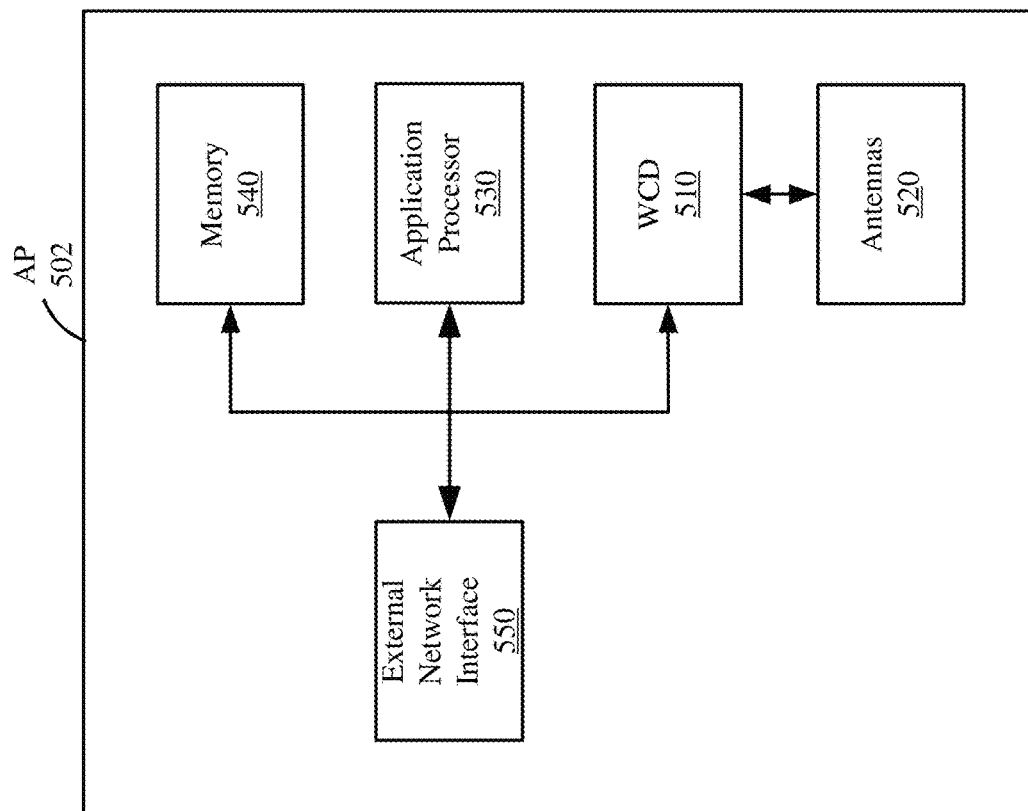
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, new WLAN communication protocols are being developed to enable enhanced features for wireless communications on carrier frequencies above 7 GHz (such as in the 45 GHz or 60 GHz frequency bands). However, wireless communications on higher carrier frequencies may suffer from greater phase noise and path loss compared to wireless communications on lower frequency bands. For example, increasing the carrier frequency from 5.8 GHz to 60 GHz results in a 10× increase in phase noise. Aspects of the present disclosure recognize that the phase noise can be mitigated by increasing the SCS between modulated subcarriers. Existing WLAN packet formats include an L-STF (such as the L-STF 206 of FIG. 2A) that is modulated on every $4^{th}$ subcarrier spanning a given bandwidth to support CFO estimations up to 2 subcarriers apart. Aspects of the present disclosure also recognize that the LOs implemented by existing WLAN transmitters and receivers are required to be accurate up to ±20 ppm. As such, existing WLAN architectures can support CFOs up to ±40 ppm (between the transmitter and the receiver), which is equivalent to ±2.4 MHz in the 60 GHz frequency band and ±1.8 MHz in the 45 GHz frequency band. To support CFOs up to ±2.4 MHz, the SCS associated with L-STF should be greater than or equal to 1.2 MHz Various aspects relate generally to increasing carrier frequencies for wireless communications in WLANs, and more particularly, to packet designs that support wireless communications on carrier frequencies above 7 GHz. In some aspects, a wireless communication device may map a PPDU to OFDM subcarriers according to existing tone plans associated with carrier frequencies below 7 GHz (also referred to as "sub-7 GHz" tone plans) and may up-clock the PPDU for transmission on carrier frequencies above 7 GHz. As used herein, the term "up-clocking" refers to increasing the frequency of a clock signal used to convert the PPDU between the frequency domain and the time domain (beyond a frequency ($f_0$) associated with the existing sub-7 GHz tone plan), and the ratio (K) of the up-clocked frequency ($f_s$) to $f_0$ is referred to as the "up-clocking ratio"

$$\left(\text{where } K = \frac{f_s}{f_0}\right).$$

In some aspects, the up-clocking may result in an SCS greater than or equal to 1.2 MHz, where the SCS represents a spacing between the subcarriers to which at least a portion of the PPDU (including L-STF) is mapped. More specifically, the SCS as a result of up-clocking ($SCS_U$) may be a multiple of an SCS associated with the existing sub-7 GHz tone plan ($SCS_0$), where $SCS_U=K*SCS_0$. In some implementations, the up-clocked PPDU may conform to an existing PPDU format designed for sub-7 GHz wireless communications. In some other implementations, the up-clocked PPDU may conform to a new "green field" PPDU format optimized for wireless communications on carrier frequencies above 7 GHz.

Particular implementations of the subject matter described in this disclosure can be implemented to realize one or more of the following potential advantages. By up-clocking PPDUs that are mapped to OFDM subcarriers according to existing sub-7 GHz tone plans, aspects of the present disclosure can leverage existing WLAN hardware to increase the carrier frequencies on which such PPDUs are transmitted (such as to the 60 GHz or 45 GHz frequency bands). As described above, existing WLAN architectures can support CFO estimation in the 60 GHz frequency band if the SCS associated with L-STF is greater than or equal to 1.2 MHz. The SCS depends, in part, on the tone plan used to map the PPDU to the OFDM subcarriers, and more particularly, the size of the IFFT associated with the tone plan. Aspects of the present disclosure recognize that, for any given IFFT size ($N_{IFFT}$) associated with an existing sub-7 GHz tone plan, a suitable sampling rate $f_s$ can be selected so that $$SCS = \frac{f_s}{N_{IFFT}} \geq 1.2 \text{ MHz}.$$

By up-clocking existing sub-7 GHz tone plans, aspects of the present disclosure can further reuse existing PPDU formats (associated with such tone plans) for wireless communications on carrier frequencies above 7 GHz, thereby reducing the cost and complexity of hardware that would otherwise be needed to support new PPDU formats. On the other hand, by designing new green field PPDU formats, aspects of the present disclosure can reduce the overhead of communications on carrier frequencies above 7 GHz by eliminating various fields, signaling, or other redundancies associated with legacy WLAN communication protocols (such as in existing PPDU formats).

Figure 6:
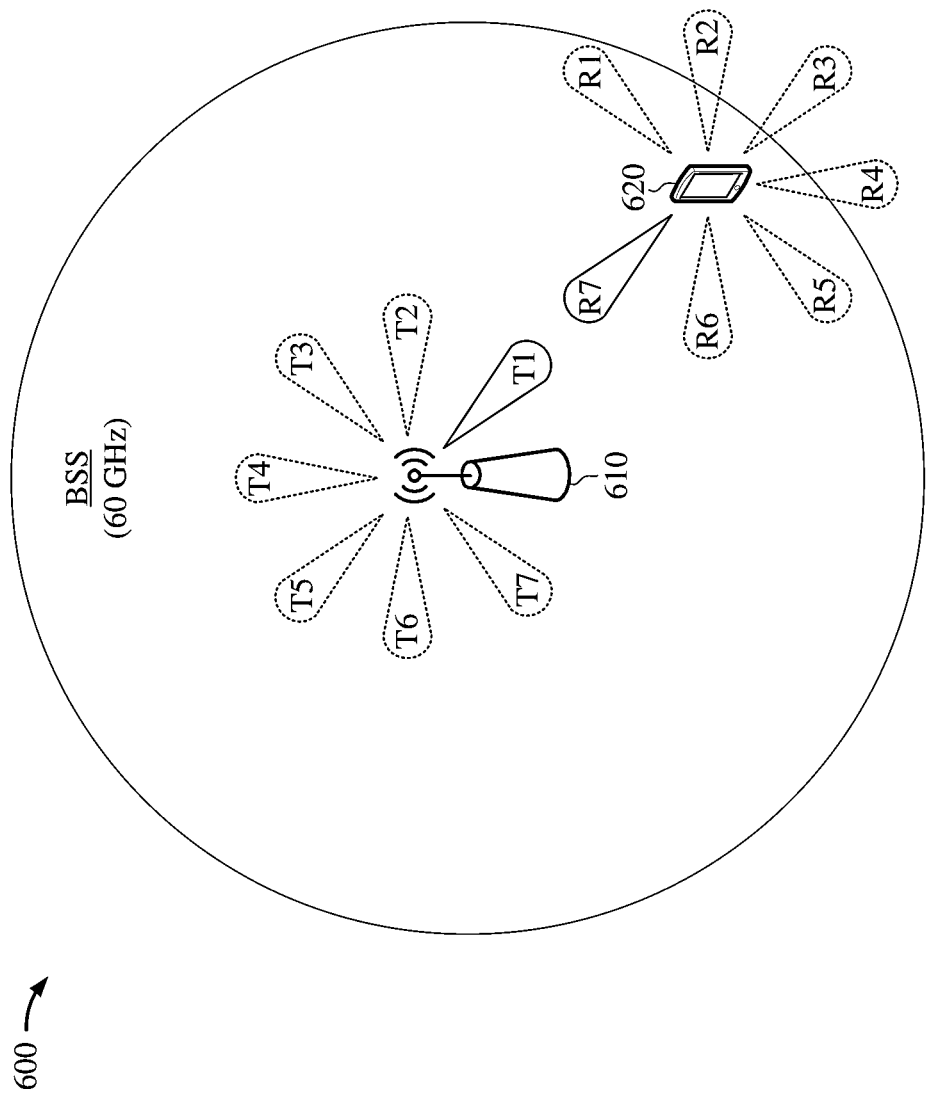
FIG. 6 shows an example communication environment that includes an AP and a STA, according to some implementations.

FIG. 6 shows an example communication environment 600 that includes an AP 610 and a STA 620, according to some implementations. In some implementations, the AP 610 may be one example of any of the APs 102 or 502 of FIGS. 1 and 5A, respectively. In some implementations, the STA 620 may be one example of any of the STAs 104 or 504 of FIGS. 1 and 5B, respectively. In the example of FIG. 6, the AP 610 is associated with a BSS that supports wireless communications at carrier frequencies above 7 GHz (such as in the 60 GHz frequency band).

As described above, wireless communications in the 60 GHz frequency band may suffer from greater path loss compared to wireless communications in sub-7 GHz frequency bands. Aspects of the present disclosure recognize that analog beamforming (using a large number of antenna elements) can mitigate the effects of path loss and achieve greater wireless communication range on carrier frequencies above 7 GHz. Analog beamforming is a wireless communication technique by which a transmitting device and a receiving device can adjust the gains and phases of their transmit (TX) and receive (RX) antenna elements to achieve directionality in wireless communications. The process by which the transmitting device and the receiving device tune their antennas for beamforming is referred to as "beamforming training."

In some implementations, the AP 610 may use analog beamforming techniques to communicate with the STA 620. In the example of FIG. 6, the AP 610 is depicted as a transmitting device. As such, the AP 610 may tune a set of TX antennas to focus the energy of transmitted signals in a particular direction (referred to as "TX beamforming"). For example, the AP 610 may transmit packets or PPDUs via a number of antenna sectors T1-T7 (also referred to as "TX sectors") configured or tuned for TX beamforming. The antenna elements associated with each TX sector are weighted so that the energy radiated by each antenna element combines along a particular beam direction. Accordingly, each of the TX sectors T1-T7 may be tuned to a respective TX beam direction. For simplicity, the AP 610 is shown to include 7 TX sectors T1-T7. However, in actual implementations, the AP 610 may include fewer or more TX sectors than those depicted in FIG. 6.

In some implementations, the STA 620 also may use analog beamforming techniques to communicate with the AP 610. In the example of FIG. 6, the STA 620 is depicted as a receiving device. As such, the STA 620 may tune a set of RX antennas to focus the energy of received signals in a particular direction (referred to as "RX beamforming"). For example, the STA 620 may receive packets or PPDUs via a number of antenna sectors R1-R7 (also referred to as "RX sectors") configured or tuned for RX beamforming. The antenna elements associated with each RX sector are weighted so that the energy received by each antenna element combines along a particular beam direction. Accordingly, each of the RX sectors R1-R7 may be tuned to a respective RX beam direction. For simplicity, the STA 620 is shown to include 7 RX sectors R1-R7. However, in actual implementations, the STA 620 may include fewer or more RX sectors than those depicted in FIG. 6.

In some aspects, the AP 610 may perform a beamforming training operation with the STA 620 to determine TX and RX beam directions that optimize beamforming gains for wireless communications between the AP 610 and the STA 620. For example, the AP 610 may train its TX antennas for TX beamforming by transmitting a respective beamforming training (BFT) packet via each of the TX sectors T1-T7 and receiving feedback from the STA 620 indicating the TX beam direction associated with the highest TX beamforming gain. Further, the STA 620 may train its RX antennas for RX beamforming by listening for a respective BFT packet from the AP 610 via each of the RX sectors R1-R7 and determining the RX beam direction associated with the highest RX beamforming gain based on the received BFT packets. In some implementations, the AP 610 may further train its RX antennas (not shown for simplicity) for RX beamforming and the STA 620 may further train its TX antennas (not shown for simplicity) for TX beamforming.

In the example of FIG. 6, the AP 610 and the STA 620 may achieve optimal beamforming gains for beams transmitted via the TX sector T1 (of the AP 610) and received via the RX sector R7 (of the STA 620). By contrast, beams transmitted by the AP 610 in other TX beam directions (such as via any of the TX sectors T2-T7) may fail to reach the STA 620. The direction of the STA 620 is generally not known to the AP 610 prior to performing a beamforming training operation. In some aspects, the AP 610 may transmit beams in each of its TX beam directions while the STA 620 listens in an omnidirectional mode to increase the likelihood that at least one of the beams transmitted by the AP 610 will be received by the STA 620 prior to performing a beamforming training operation.

Aspects of the present disclosure recognize that beamforming gains are significantly greater when TX beamforming is used at the transmitting device in combination with RX beamforming at the receiving device (also referred to as "full beamforming gains") than when TX beamforming is used at the transmitting device while the receiving device operates in an omnidirectional mode (also referred to as "one-sided beamforming gains"). In some aspects, different PPDU formats may be used for wireless communications between the AP 610 and the STA 620 depending on the level of beamforming gains that can be achieved. More specifically, a "data PHY" (DPHY) PPDU format may be used when full beamforming gains are achievable and a "control PHY" (CPHY) PPDU format may be used when only one-sided beamforming gains are achievable.

Figure 7:
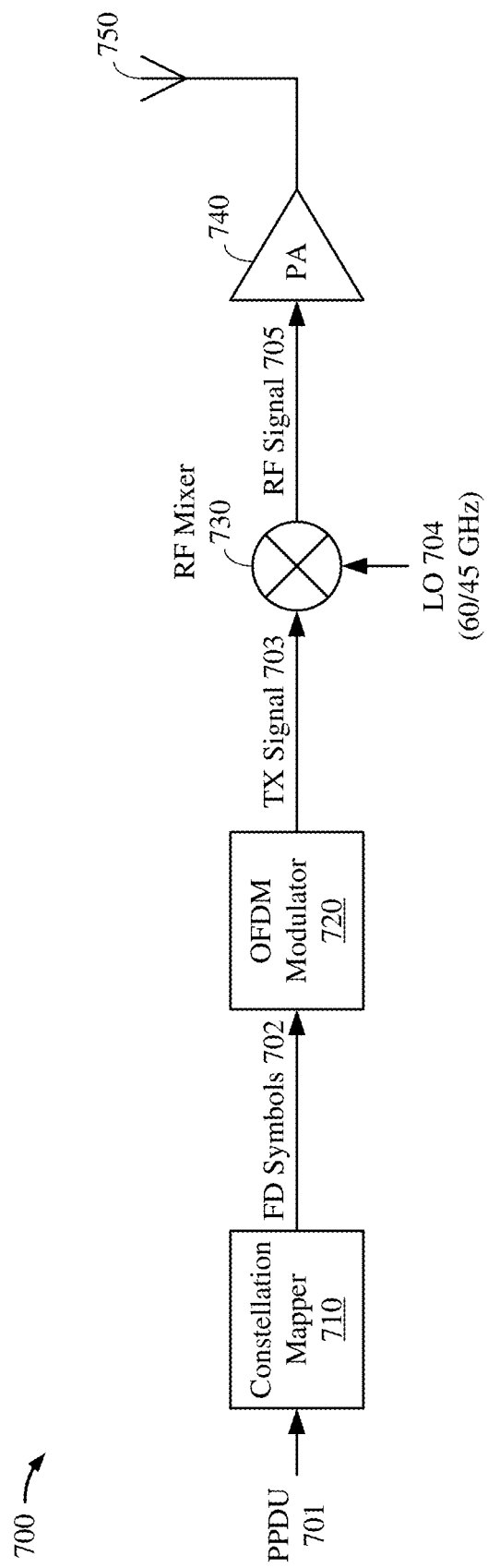
FIG. 7 shows a block diagram of an example transmit (TX) processing chain for a wireless communication device, according to some implementations.

FIG. 7 shows a block diagram of an example TX processing chain 700 for a wireless communication device, according to some implementations. The TX processing chain 700 is configured to process a PPDU 701 for transmission, as a radio frequency (RF) signal 705. In some aspects, the PPDU 701 may be one example of the PPDU 300 of FIG. 3. In some implementations, the wireless communication device may be one example of the AP 610 of FIG. 6. In some other implementations, the wireless communication device may be one example of the STA 620 of FIG. 6. For simplicity, only a single spatial stream of the TX processing chain 700 is depicted in FIG. 7. In actual implementations, the TX processing chain 700 may include any number of spatial streams.

The TX processing chain 700 includes a constellation mapper 710, an OFDM modulator 720, an RF mixer 730, and a power amplifier (PA) 740. The constellation mapper 710 maps the PPDU 701 to one or more frequency-domain (FD) symbols 702 associated with a modulation scheme. Example suitable modulation schemes include binary phase-shift keying (BPSK), quadrature phase-shift keying (QPSK), and quadrature amplitude modulation (QAM). The OFDM modulator 720 modulates the FD symbols 702 onto a set of orthogonal subcarriers and converts the modulated subcarriers to a time-varying TX signal 703. The RF mixer 730 up-converts the TX signal 703 to a carrier frequency, and the power amplifier 740 amplifies the resulting RF signal 705 for transmission via one or more antennas 750. For example, the RF mixer 730 may modulate the TX signal 703 onto an LO signal 704 that oscillates at the carrier frequency. In some aspects, the carrier frequency associated with the LO signal 704 may be higher than 7 GHz. In some implementations, the carrier frequency may be in the 60 GHz frequency band. In some other implementations, the carrier frequency may be in the 45 GHz frequency band.

As described above, many existing WLAN architectures are designed for wireless communications on carrier frequencies below 7 GHz (such as in the 2.4 GHz, 5 GHz, or 6 GHz frequency bands). In some aspects, existing WLAN hardware may be repurposed to support wireless communications on carrier frequencies above 7 GHz. For example, the TX processing chain 700 may receive the LO signal 704 from a local oscillator that is accurate up to ±20 ppm. As described above, increasing the carrier frequency of the LO signal 704 also increases the phase noise associated with the RF signal 705. For example, operating the local oscillator at 60 GHz can result in a CFO of ±2.4 MHz between the transmitter and the receiver. According to existing versions of the IEEE 802.11 standard, the PHY preamble of the PPDU 701 includes an L-STF having a 1× symbol duration associated with an SCS equal to 312.5 KHz that can support CFO estimations up to 2 subcarriers apart. As used herein, the term "1×SCS" refers to the subcarrier spacing between the subcarriers to which L-STF is mapped. Thus, to support CFOs up to ±2.4 MHz, the 1×SCS associated with the PPDU 701 should be greater than or equal to 1.2 MHz.

Aspects of the present disclosure recognize that any SCS greater than or equal to 1.2 MHz may not be suitable for wireless communications on sub-7 GHz carrier frequencies. As such, existing WLAN communication protocols for sub-7 GHz wireless communications (such as the IEEE 802.11be, 11ax, 11ac, and earlier amendments of the IEEE 802.11 standard) do not define a PPDU format or tone plan associated with an SCS greater than or equal to 1.2 MHz. In some aspects, the TX processing chain 700 may receive a PPDU 701 that is formatted for transmission on a sub-7 GHz carrier frequency and may up-clock the PPDU 701 to a wider bandwidth that is suitable for transmission on a carrier frequency above 7 GHz (such as in the 60 GHz or 45 GHz frequency bands). For example, the wider bandwidth is achieved by spreading out the subcarriers to which the PPDU 701 is mapped. In some implementations, the TX processing chain 700 may up-clock the PPDU 701 so that the 1×SCS associated with the PPDU 701 is greater than or equal to 1.2 MHz.

In some implementations, the PPDU 701 may conform to a PPDU format defined by the IEEE 802.11ac amendment of the IEEE 802.11 standard (also referred to as an "11ac PPDU format"). For example, the PPDU 701 may conform to an 11ac PPDU format associated with a 20 MHz, 40 MHz, 80 MHz, 80+80 MHz, or 160 MHz channel bandwidth and may be up-clocked for transmission over an 80 MHz, 160 MHz, 320 MHz, 480 MHz, 640 MHz, 960 MHz, 1.28 GHz, 1.92 GHz, or 2.56 GHz bandwidth wireless channel in the 60 GHz or 45 GHz frequency band. In some other implementations, the PPDU 701 may conform to a PPDU format defined by the IEEE 802.11be (or 11ax) amendment of the IEEE 802.11 standard (also referred to as an "11be PPDU format"). For example, the PPDU 701 may conform to an 11be PPDU format associated with a 20 MHz, 40 MHz, or 80 MHz channel bandwidth and may be up-clocked for transmission over an 80 MHz, 160 MHz, 320 MHz, 480 MHz, 640 MHz, 960 MHz, 1.28 GHz, 1.92 GHz, or 2.56 GHz bandwidth wireless channel in the 60 GHz or 45 GHz frequency band. Still further, in some implementations, the PPDU 701 may conform to a new green field PPDU format that is optimized for communications in the 60 GHz or 45 GHz frequency band.

Figure 8:
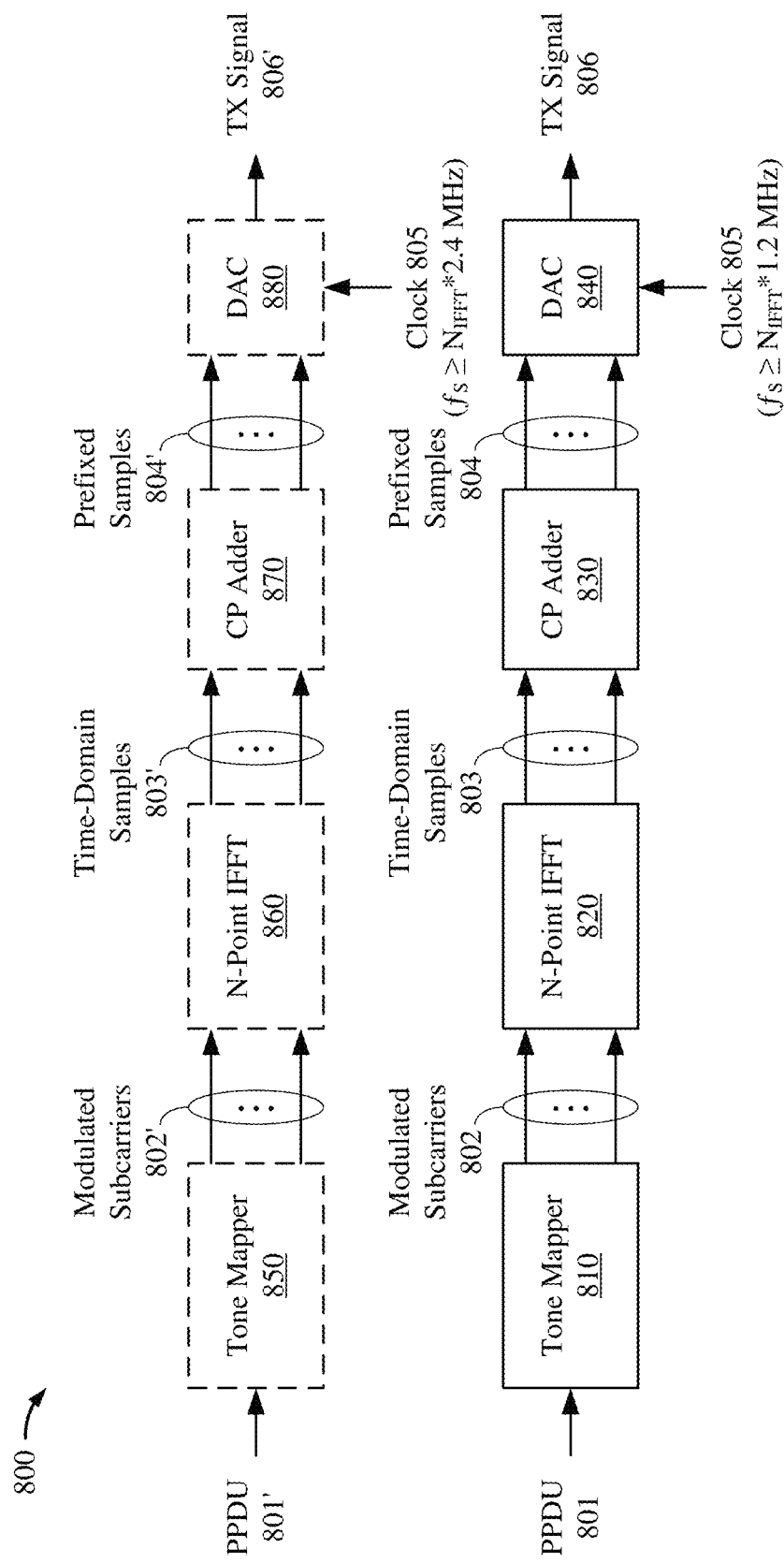
FIG. 8 shows a block diagram of an example orthogonal frequency-division multiplexing (OFDM) up-clocking system, according to some implementations.

FIG. 8 shows a block diagram of an example OFDM up-clocking system 800, according to some implementations. In some aspects, the OFDM up-clocking system 800 may be configured to up-clock a PPDU 801 to a TX signal 806 suitable for transmission on carrier frequencies above 7 GHz (such as in the 60 GHz or 45 GHz frequency bands). More specifically, the OFDM up-clocking system 800 may map the PPDU 801 onto a set of orthogonal subcarriers associated with a 1× SCS greater than or equal to 1.2 MHz. In some implementations, the OFDM up-clocking system 800 may be one example of the OFDM modulator 720 of FIG. 7. In such implementations, the PPDU 801 and the TX signal 806 may be examples of the FD symbols 702 and the TX signal 703, respectively, of FIG. 7.

The OFDM up-clocking system 800 includes a tone mapper 810, an N-point IFFT 820, a CP adder 830, and a DAC 840. The tone mapper 810 is configured to map the PPDU 801 to a number (N) of subcarriers associated with a sub-7 GHz tone plan to produce N modulated subcarriers 802. In some implementations, the sub-7 GHz tone plan may include 64 subcarriers associated with a 20 MHz channel bandwidth (such as in accordance with an 11ac PPDU format). For example, the 64 subcarriers may include 52 data subcarriers, 4 pilot subcarriers, 7 guard subcarriers, and 1 direct current (DC) subcarrier. In some other implementations, the sub-7 GHz tone plan may include 128 subcarriers associated with a 40 MHz channel bandwidth (such as in accordance with an 11ac PPDU format). For example, the 128 subcarriers may include 108 data subcarriers, 6 pilot subcarriers, 11 guard subcarriers, and 3 DC subcarriers.

In some implementations, the sub-7 GHz tone plan may include 256 subcarriers associated with an 80 MHz channel bandwidth (such as in accordance with an 11ac PPDU format) or a 20 MHz channel bandwidth (such as in accordance with an 11be PPDU format). For example, the 256 subcarriers may include 234 data subcarriers, 8 pilot subcarriers, 11 guard subcarriers, and 3 DC subcarriers. In some other implementations, the sub-7 GHz tone plan may include 512 subcarriers associated with a 160 MHz channel bandwidth (such as in accordance with an 11ac PPDU format). In such implementations, the 512 subcarriers may include 468 data subcarriers, 16 pilot subcarriers, 11 guard subcarriers, and 11 DC subcarriers. Still further, in some implementations, the sub-7 GHz tone plan may include 512 subcarriers associated with a 40 MHz channel bandwidth (such as in accordance with an 11be PPDU format). In such implementations, the 512 subcarriers may include 468 data subcarriers, 16 pilot subcarriers, 23 guard subcarriers, and 5 DC subcarriers.

In some implementations, the sub-7 GHz tone plan may include 1024 subcarriers associated with a 80 MHz channel bandwidth (such as in accordance with an 11be PPDU format). In such implementations, the 1024 subcarriers may include 980 data subcarriers, 16 pilot subcarriers, 23 guard subcarriers, and 5 DC subcarriers. In some other implementations, the sub-7 GHz tone plan may include 2048 subcarriers associated with a 160 MHz channel bandwidth (such as in accordance with an 11be PPDU format). In such implementations, the 2048 subcarriers may include 1960 data subcarriers, 32 pilot subcarriers, 23 guard subcarriers, and 23 DC subcarriers. Still further, in some implementations, the sub-7 GHz tone plan may include 4096 subcarriers associated with a 320 MHz channel bandwidth (such as in accordance with an 11be PPDU format). In such implementations, the 4096 subcarriers may include 3920 data subcarriers, 64 pilot subcarriers, 23 guard subcarriers, and 23 DC subcarriers.

The N-point IFFT 820 transforms the N modulated subcarriers 802, from the frequency domain to the time domain, as N time-domain samples 803. The CP adder 830 adds a cyclic prefix to the N time-domain samples 803 to produce a number of prefixed samples 804. The DAC 840 converts the prefixed samples 804 to the TX signal 806 based on a clock signal 805. More specifically, the frequency of the clock signal 805 controls the sampling rate ($f_s$) of the DAC 840. Further, the SCS associated with the TX signal 806 depends on the sampling rate $f_s$ of the DAC 840 (which is controlled by the frequency of the clock signal 805) and the size ($N_{IFFT}$) of the IFFT 820, where $$SCS = \frac{f_s}{N_{IFFT}}.$$

In some aspects, the clock signal 805 may be up-clocked so that the 1×SCS associated with the TX signal 806 is greater than or equal to 1.2 MHz ($f_s N_{IFFT}*1.2$ MHz).

Aspects of the present disclosure recognize that some existing versions of the IEEE 802.11 standard support channel bonding, whereby a PPDU can be transmitted concurrently over multiple channels to achieve gains similar to a wider bandwidth channel. For example, the IEEE 802.11ac amendment of the IEEE 802.11 standards defines a PPDU format that can be transmitted concurrently on two 80 MHz channels (also referred to as an 80+80 channel bandwidth) to achieve gains similar to a 160 MHz channel. In some aspects, the OFDM up-clocking system 800 may leverage existing channel bonding hardware to transmit PPDUs having wider bandwidths (without additional up-clocking). In such aspects, the PPDU 801 may represent a first PPDU segment configured to be transmitted over a first wireless channel. The OFDM up-clocking system 800 may further receive a second PPDU segment 801' configured to be transmitted over a second wireless channel, where the PPDU segments 801 and 801' collectively form a single PPDU.

In some implementations, the OFDM up-clocking system 800 may include an additional tone mapper 850, an additional N-point IFFT 860, an additional CP adder 870, and an additional DAC 880. The tone mapper 850 is configured to map the second PPDU segment 801' to N subcarriers associated with a sub-7 GHz tone plan to produce N modulated subcarriers 802'. More specifically, the tone mappers 810 and 850 may implement the same sub-7 GHz tone plan. The N-point IFFT 860 transforms the N modulated subcarriers 802', from the frequency domain to the time domain, as N time-domain samples 803'. The CP adder 870 adds a cyclic prefix to the time-domain samples 803 to produce a number of prefixed samples 804. The DAC 880 converts the prefixed samples 804' to a TX signal 806' based on the clock signal 805. In some implementations, the TX signals 806 and 806' can be concurrently transmitted on respective bandwidth portions of a wireless channel.

Figure 9A:
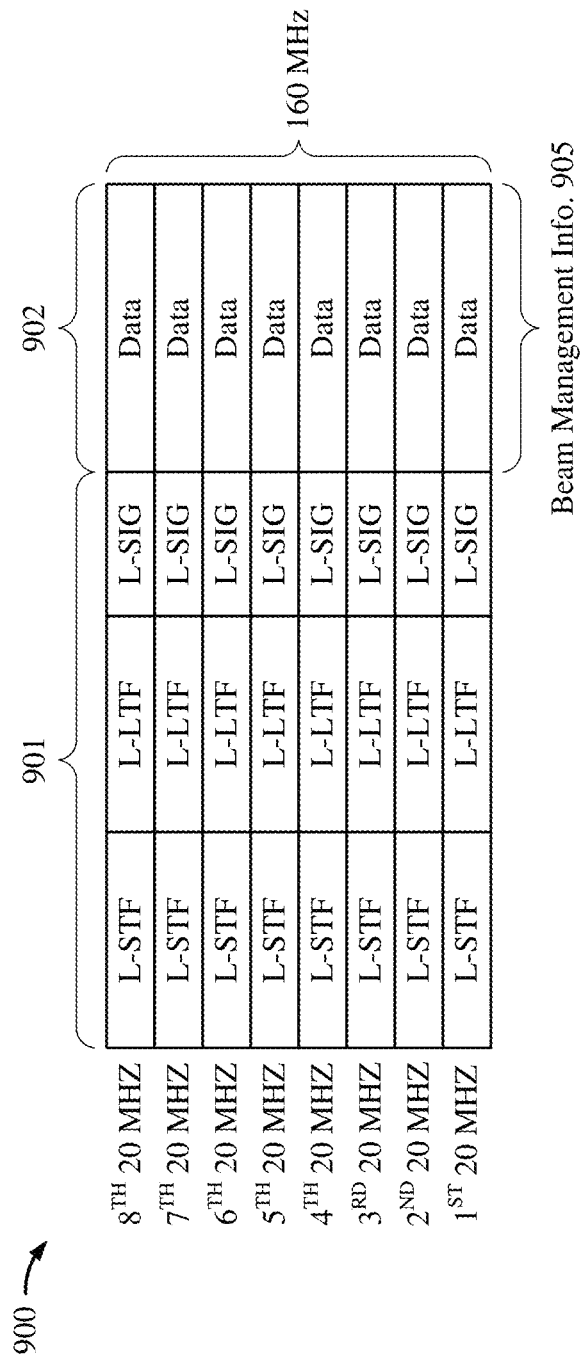
FIG. 9A shows an example PPDU formatted in accordance with a legacy PPDU format.

FIG. 9A shows an example PPDU 900 formatted in accordance with a legacy PPDU format. In the example of FIG. 9A, the legacy PPDU format is an 11ac PPDU format associated with a 160 MHz channel bandwidth. More specifically, the PPDU 900 conforms to a non-High Throughput (non-HT) duplicate transmission (DUP) PPDU format. The PPDU 900 includes a PHY preamble 901 followed by a data portion 902. The PHY preamble includes an L-STF, an L-LTF, and an L-SIG. As shown in FIG. 9A, the PHY preamble 901 and the data portion 902 are duplicated on eight 20 MHz sub-bands spanning the 160 MHz bandwidth. As such, the bandwidth (BW) of the PPDU 900 is a multiple of the sampling rate ($f_s$) of a clock signal used to convert the PPDU 900 from the frequency domain to the time domain (BW=8*$f_s$). According to the 11ac PPDU format, the PPDU 900 is mapped to the data subcarriers associated with a 64-subcarrier tone plan (within each 20 MHz sub-band). In other words, the PHY preamble 901 is mapped to the same number of subcarriers as the data portion 902.

In some aspects, the PPDU 900 may be up-clocked as a CPHY PPDU for wireless communications on carrier frequencies above 7 GHz. More specifically, the PPDU 900 may be used for wireless communications when only one-sided beamforming gains are achievable between a transmitting device and a receiving device. In some implementations, the transmitting device may transmit the PPDU 900 prior to performing a beamforming training operation with the receiving device. In some other implementations, the transmitting device may transmit the PPDU 900 as part of a beamforming training operation with the receiving device. As such, the PPDU 900 may carry beam management information 905 indicating whether the PPDU 900 is associated with a beamforming training operation or various parameters associated with the beamforming training operation. Example beam management information 905 may include a PPDU type, a training direction, a beam tracking request, a training length, a countdown, a sector ID, an antenna ID, a best antenna ID, a best sector ID, a number of RX sectors or RX antennas of the transmitting device, or an SNR report, among other examples. In some implementations, the beam management information 905 may be carried in the data portion 902 (such as in a MAC payload).

FIG. 9B shows an example up-clocked PPDU 910 based on the PPDU format depicted in FIG. 9A, according to some implementations. The PPDU 910 includes a PHY preamble 911 followed by a data portion 912. In some aspects, the PPDU 910 may represent an up-clocking of the PPDU 900 by a factor of M. In such aspects, the PHY preamble 911 and the data portion 912 may be examples of the PHY preamble 901 and the data portion 902, respectively, of FIG. 9A. In some implementations, a packet extension (PE) or one or more training fields (TRNs) 913 may be added to the PPDU 910 to support enhanced features for wireless communications on carrier frequencies above 7 GHz (such as beamforming training operations). In some aspects, the up-clocking may be performed by the OFDM up-clocking system 800 of FIG. 8.

As a result of up-clocking, the PHY preamble 911, the data portion 912, and the PE or TRNs 913 are duplicated on eight 20*M MHz sub-bands spanning a 160*M MHz bandwidth. For example, given a 2× up-clocking ratio (M=2), the PHY preamble 911, the data portion 912, and the PE or TRNs 913 are duplicated on eight 40 MHz sub-bands spanning a 320 MHz bandwidth. In some aspects, the PPDU 910 may be a CPHY PPDU that can be used for wireless communications on carrier frequencies above 7 GHz when only one-sided beamforming gains are achievable between a transmitting device and a receiving device. In some implementations, the data portion 912 may carry beam management information (such as the beam management information 905 of FIG. 9A) indicating whether the PPDU 910 is associated with a beamforming training operation or various parameters associated with the beamforming training operation.

Aspects of the present disclosure recognize that, because the CPHY PPDU format is used for wireless communications prior to (or during) the performance of a beamforming training operation between a transmitting device and a receiving device, the data portion 912 may not carry any user data. In some aspects, the overhead associated with the PPDU 910 (or delays in processing the PPDU 910) may be reduced by moving the beam management information 905 from the MAC layer to the PHY layer. For example, L-SIG may be repurposed to carry at least a portion of the beam management information 905. However, aspects of the present disclosure recognize that the length of L-SIG may not be sufficient to accommodate all of the beam management information 905. In other words, the PHY preamble 911 may require one or more additional SIG fields (or symbols) to carry the beam management information 905 (in lieu of the data portion 912).

FIG. 9C shows another example up-clocked PPDU 920 based on the PPDU format depicted in FIG. 9A, according to some implementations. The PPDU 920 includes a PHY preamble having a first portion 921 and a second portion 922. In contrast with the PPDU 910 of FIG. 9B, the PPDU 920 does not include a data portion but adds two SIG symbols (SIG-A1 and SIG-A2) via the second preamble portion 922 (similar to the Very High Throughput (VHT) 11ac PPDU format). In some aspects, the PPDU 920 may represent an up-clocking of the PPDU 900 by a factor of M. In such aspects, the first preamble portion 921 may be an example of the PHY preamble 901 of FIG. 9A. In some implementations, a PE or one or more TRNs 923 may be added to the PPDU 920 to support enhanced features for wireless communications on carrier frequencies above 7 GHz (such as beamforming training operations). In some aspects, the up-clocking may be performed by the OFDM up-clocking system 800 of FIG. 8.

As a result of up-clocking, the first preamble portion 921, the second preamble portion 922, and the PE or TRNs 923 are duplicated on eight 20*M MHz sub-bands spanning a 160*M MHz bandwidth. For example, given a 2× up-clocking ratio (M=2), the first preamble portion 921, the second preamble portion 922, and the PE or TRNs 923 are duplicated on eight 40 MHz sub-bands spanning a 320 MHz bandwidth. In some aspects, the PPDU 920 may be a CPHY PPDU that can be used for wireless communications on carrier frequencies above 7 GHz when only one-sided beamforming gains are achievable between a transmitting device and a receiving device. In some implementations, L-SIG, SIG-A1, and SIG-A2 may be repurposed to carry beam management information (such as the beam management information 905 of FIG. 9A) indicating whether the PPDU 920 is associated with a beamforming training operation or various parameters associated with the beamforming training operation.

FIG. 9D shows another example up-clocked PPDU 930 based on the PPDU format depicted in FIG. 9A, according to some implementations. The PPDU 930 includes a PHY preamble having a first portion 931 and a second portion 932. In contrast with the PPDU 910 of FIG. 9B, the PPDU 930 does not include a data portion but adds a repetition of L-SIG (RL-SIG) and two more SIG symbols (SIG1 and SIG2) via the second preamble portion 932 (similar to the 11be PPDU format). In some aspects, the PPDU 930 may represent an up-clocking of the PPDU 900 by a factor of M. In such aspects, the first preamble portion 931 may be an example of the PHY preamble 901 of FIG. 9A. In some implementations, a PE or one or more TRNs 933 may be added to the PPDU 930 to support enhanced features for wireless communications on carrier frequencies above 7 GHz (such as beamforming training operations). In some aspects, the up-clocking may be performed by the OFDM up-clocking system 800 of FIG. 8.

As a result of up-clocking, the first preamble portion 931, the second preamble portion 932, and the PE or TRNs 933 are duplicated on eight 20*M MHz sub-bands spanning a 160*M MHz bandwidth. For example, given a 2× up-clocking ratio (M=2), the first preamble portion 931, the second preamble portion 932, and the PE or TRNs 933 are duplicated on eight 40 MHz sub-bands spanning a 320 MHz bandwidth. In some aspects, the PPDU 930 may be a CPHY PPDU that can be used for wireless communications on carrier frequencies above 7 GHz when only one-sided beamforming gains are achievable between a transmitting device and a receiving device. In some implementations, L-SIG, RL-SIG, SIG1, and SIG2 may be repurposed to carry beam management information (such as the beam management information 905 of FIG. 9A) indicating whether the PPDU 930 is associated with a beamforming training operation or various parameters associated with the beamforming training operation.

Figure 10A:
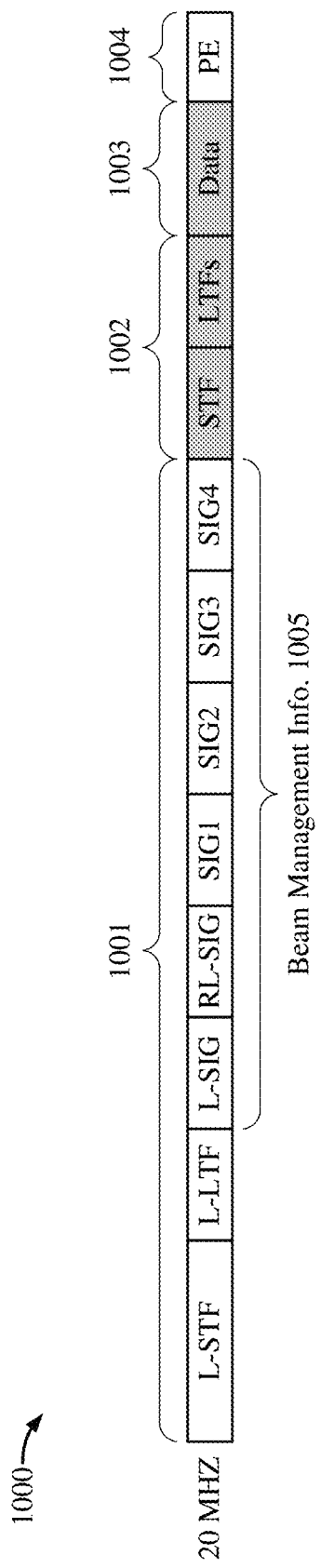
FIG. 10A shows an example PPDU formatted in accordance with a legacy PPDU format.

FIG. 10A shows an example PPDU 1000 formatted in accordance with a legacy PPDU format. In the example of FIG. 10A, the legacy PPDU format is an 11be PPDU format associated with a 20 MHz channel bandwidth. More specifically, the PPDU 1000 conforms to an extended range (ER) single-user (SU) PPDU format. The PPDU 1000 includes a PHY preamble, having a first portion 1001 and a second portion 1002, followed by a data portion 1003 and a PE 1004. The first preamble portion 1001 includes an L-STF, an L-LTF, an L-SIG, an RL-SIG, and four non-legacy signal fields (SIG1-SIG4). The second preamble portion 1002 includes a non-legacy short training field (STF) and one or more non-legacy long training fields (LTFs).

The IEEE 802.11be amendment of the IEEE 802.11 standard defines each of the non-legacy signal fields SIG1-SIG4 as a respective symbol of a universal signal field (U-SIG) and defines the remaining non-legacy fields STF and LTFs as Extremely High Throughput (EHT) fields EHT-STF and EHT-LTFs, respectively. Further, the STF sequence associated with L-STF is repeated (2×) in the time domain to produce an "extended L-STF." According to the 11be PPDU format, the data portion 1003 (and the PE 1004) is mapped to each contiguous data subcarrier associated with a 256-subcarrier tone plan. In contrast, L-STF is mapped to every $4^{th}$ data subcarrier associated with a 64-subcarrier tone plan while the remainder of the first preamble portion 1001 is mapped to each contiguous data subcarrier associated with the 64-subcarrier tone plan. Thus, while the bandwidth (BW) of the PPDU 1000 is equal to the sampling rate ($f_s$) of a clock signal used to convert the PPDU 1000 from the frequency domain to the time domain (BW=$f_s$), the SCS associated with L-STF is 4× larger than the SCS associated with the data portion 1003.

In some aspects, the PPDU 1000 may be up-clocked as a CPHY PPDU for wireless communications on carrier frequencies above 7 GHz. More specifically, the PPDU 1000 may be used for wireless communications when only one-sided beamforming gains are achievable between a transmitting device and a receiving device. In some implementations, the transmitting device may transmit the PPDU 1000 prior to performing a beamforming training operation with the receiving device. In some other implementations, the transmitting device may transmit the PPDU 1000 as part of a beamforming training operation with the receiving device. As such, the PPDU 1000 may carry beam management information 1005 indicating whether the PPDU 1000 is associated with a beamforming training operation or various parameters associated with the beamforming training operation (such as described with reference to FIG. 9A). In some implementations, the beam management information 1005 may be carried in one or more of the SIG fields L-SIG, RL-SIG, or SIG1-SIG4. In such implementations, the data portion 1003 and the PHY preamble fields associated therewith (such as the second preamble portion 1002) can be omitted from the PPDU 1000 to reduce overhead.

Figure 10B:
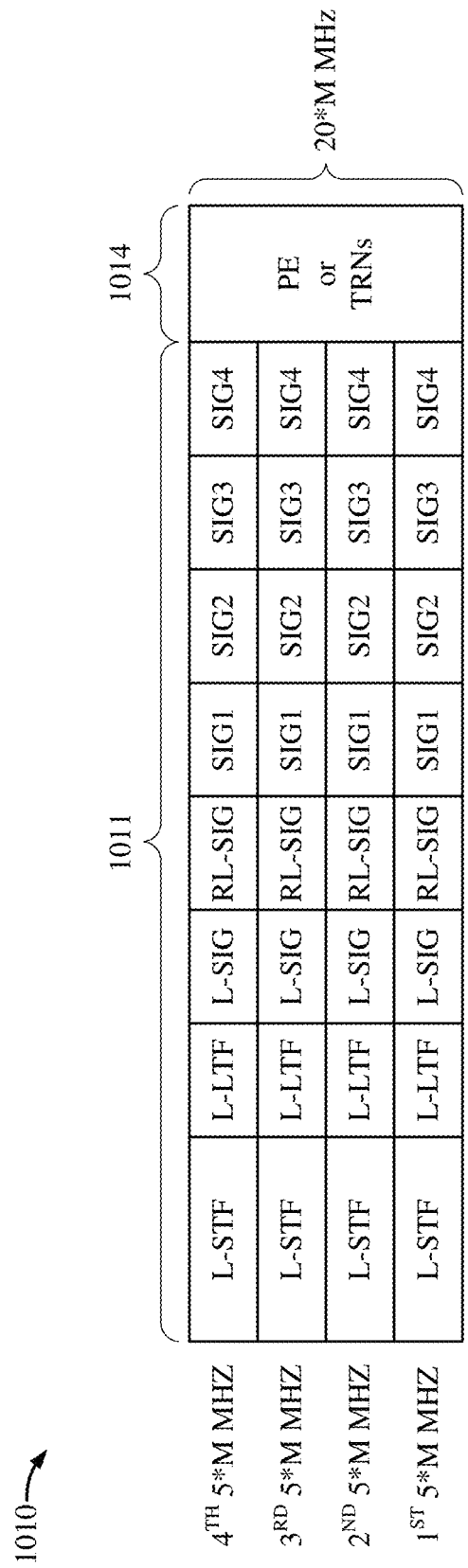
FIG. 10B shows an example up-clocked PPDU based on the PPDU format depicted in FIG. 10A, according to some implementations.

FIG. 10B shows an example up-clocked PPDU 1010 based on the PPDU format depicted in FIG. 10A, according to some implementations. In some aspects, the PPDU 1010 may be a CPHY PPDU that can be used for wireless communications on carrier frequencies above 7 GHz when only one-sided beamforming gains are achievable between a transmitting device and a receiving device. The PPDU 1010 includes a PHY preamble 1011 followed by a PE or one or more TRNs 1014. In some aspects, the PPDU 1010 may represent an up-clocking of the PPDU 1000 by a factor of M. In such aspects, the PHY preamble 1011 and the PE or TRNs 1014 may be examples of the first preamble portion 1001 and the PE 1004, respectively, of FIG. 10A. However, in contrast with the PPDU format depicted in FIG. 10A, the second preamble portion 1002 and the data portion 1003 of FIG. 10A are omitted from the PPDU 1010. In some aspects, the up-clocking may be performed by the OFDM up-clocking system 800 of FIG. 8.

As described with reference to FIG. 10A, the SCS associated with L-STF is 4× larger than the SCS associated with the data portion 1003. Thus, the first preamble portion 1001 can be up-clocked by a factor of M/4, and duplicated 4× in the frequency domain, to achieve an SCS in L-STF greater than or equal to 1.2 MHz. In some implementations, the OFDM up-clocking system 800 may up-clock the first preamble portion 1001 by a factor of M/4 to achieve a PPDU bandwidth equal to 20*M MHz. As a result, the PHY preamble 1011 is duplicated on four 5*M MHz sub-bands spanning the 20*M MHz bandwidth. For example, given a 16× up-clocking ratio (M=16), the PHY preamble 1011 is duplicated on four 80 MHz sub-bands spanning the 320 MHz bandwidth. Duplicating the PHY preamble 1011 4× in the frequency domain results in a 6 dB frequency combining gain at the receiving device. Moreover, repeating various fields of the PHY preamble 1011 in the time domain (such as L-STF, L-LTF, and each of the SIG fields or symbols) results in an additional 3 dB gain at the receiving device. Such frequency-domain duplication and time-domain repetition of various fields of the PPDU 1010 may result in a combined gain of 9 dB at the receiving device, which can help compensate for one-sided beamforming gains.

Figure 11A:
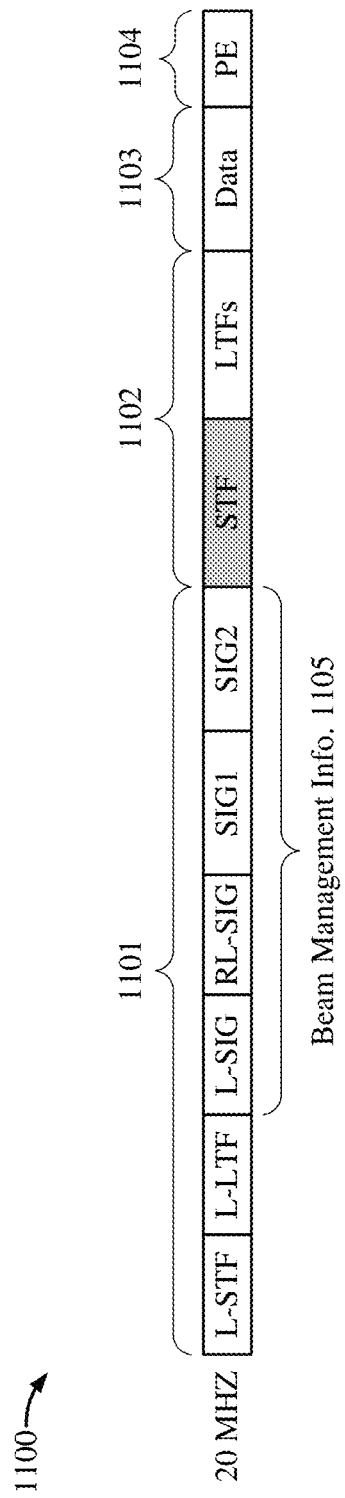
FIG. 11A shows an example PPDU formatted in accordance with a legacy PPDU format.

FIG. 11A shows an example PPDU 1100 formatted in accordance with a legacy PPDU format. In the example of FIG. 11A, the legacy PPDU format is an 11be PPDU format associated with a 20 MHz channel bandwidth. The PPDU 1100 includes a PHY preamble, having a first portion 1101 and a second portion 1102, followed by a data portion 1103 and a PE 1104. The first preamble portion 1101 includes an L-STF, an L-LTF, an L-SIG, an RL-SIG, a first non-legacy signal field (SIG1) and a second non-legacy signal field (SIG2). The second preamble portion 1102 includes a non-legacy short training field (STF) and one or more non-legacy long training fields (LTFs).

The IEEE 802.11be amendment of the IEEE 802.11 standard defines the first non-legacy signal field SIG1 as a universal signal field (U-SIG) and defines the remaining non-legacy fields SIG2, STF, and LTFs as EHT fields EHT-SIG, EHT-STF, and EHT-LTFs, respectively. According to the 11be PPDU format, the data portion 1103 (and the PE 1104) is mapped to each contiguous data subcarrier associated with a 256-subcarrier tone plan. In contrast, L-STF is mapped to every $4^{th}$ data subcarrier associated with a 64-subcarrier tone plan while the remainder of the first preamble portion 1101 is mapped to each contiguous data subcarrier associated with the 64-subcarrier tone plan. Thus, while the bandwidth (BW) of the PPDU 1100 is equal to the sampling rate ($f_s$) of a clock signal used to convert the PPDU 1100 from the frequency domain to the time domain (BW=$f_s$), the SCS associated with L-STF is 4× larger than the SCS associated with the data portion 1103.

In some aspects, the PPDU 1100 may be up-clocked as a DPHY PPDU for wireless communications on carrier frequencies above 7 GHz. More specifically, the PPDU 1100 may be used for wireless communications when full beamforming gains are achievable between a transmitting device and a receiving device. In other words, the transmitting device may transmit the PPDU 1100 after performing a beamforming training operation with the receiving device. In some other implementations, the transmitting device may transmit the PPDU 1100 as part of a beamforming training operation with the receiving device (such as when the transmitting device trains its TX antennas for TX beamforming while the receiving device concurrently trains its RX antennas for RX beamforming) or a beam refinement procedure associated with a beam tracking request. In some implementations, the PPDU 1100 may carry beam management information 1105 indicating whether the PPDU 1100 is associated with a beamforming training operation or various parameters associated with the beamforming training operation (such as described with reference to FIG. 9A). In some implementations, the beam management information 1105 may be carried in one or more of the SIG fields L-SIG, RL-SIG, SIG1, or SIG2.

In some implementations, the training sequence associated with L-STF may be replaced with a Golay sequence to simplify packet detection. For example, Golay sequences are sequence of bipolar symbols (+1 or −1) that are often used for channel estimation due to their auto-correlation characteristics. According to the 11be PPDU format, the non-legacy STF (in the second preamble portion 1102) provides AGC and CFO estimation for the data portion 1103. However, aspects of the present disclosure recognize that because the channel (or beam) does not change between the transmission of the first preamble portion 1101 and the transmission of the data portion 1103, a receiving device can perform AGC and CFO estimation for the data portion 1103 based on L-STF (in the first preamble portion 1101). In some aspects, the non-legacy STF can be "turned off" or otherwise disregarded in the PPDU 1100. In some implementations, turned-off fields may carry padding bits or non-essential information. In some other implementations, turned-off fields may be omitted entirely from the PPDU 1100.

Figure 11B:
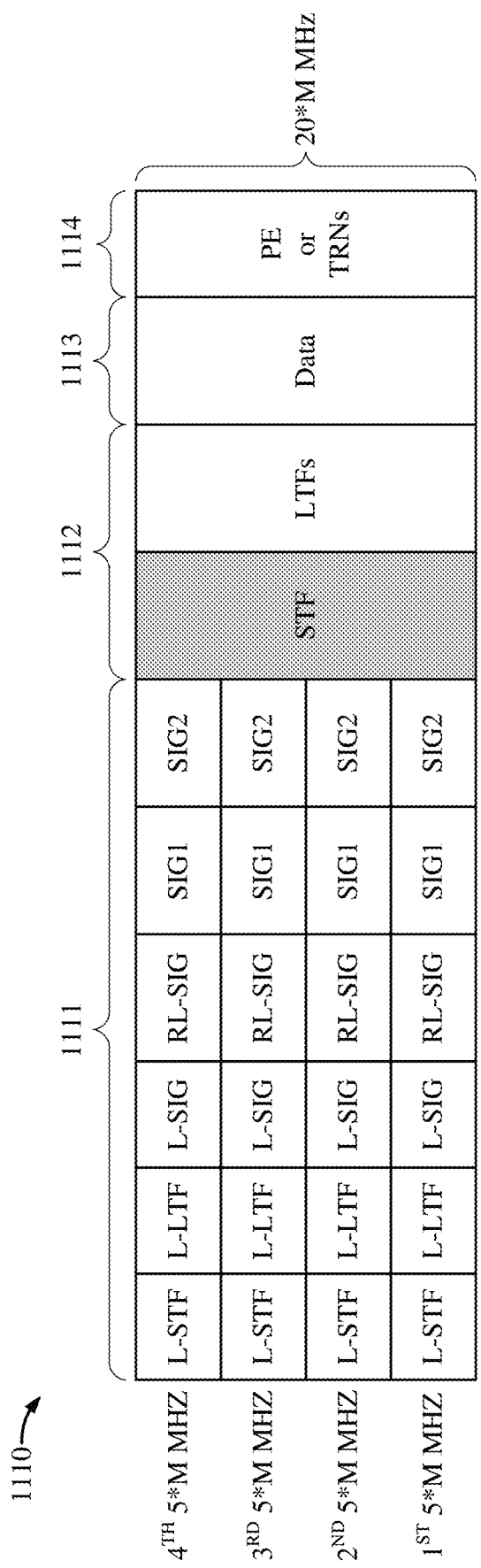
FIG. 11B shows an example up-clocked PPDU based on the PPDU format depicted in FIG. 11A, according to some implementations.

FIG. 11B shows an example up-clocked PPDU 1110 based on the PPDU format depicted in FIG. 11A, according to some implementations. In some aspects, the PPDU 1110 may be a DPHY PPDU that can be used for wireless communications on carrier frequencies above 7 GHz when full beamforming gains are achievable between a transmitting device and a receiving device. The PPDU 1110 includes a PHY preamble, having a first portion 1111 and a second portion 1112, followed by a data portion 1113 and a PE or one or more TRNs 1114. In some aspects, the PPDU 1110 may represent an up-clocking of the PPDU 1100 by a factor of M. In such aspects, the first preamble portion 1111, the second preamble portion 1112, the data portion 1113, and the PE or TRNs 1114 may be examples of the first preamble portion 1101, the second preamble portion 1102, the data portion 1103, and the PE 1104, respectively, of FIG. 11A. In some aspects, the up-clocking may be performed by the OFDM up-clocking system 800 of FIG. 8.

As described with reference to FIG. 11A, the SCS associated with L-STF is 4× larger than the SCS associated with the data portion 1113. Thus, the first preamble portion 1101 can be up-clocked by a factor of M/4, and duplicated 4× in the frequency domain, to achieve the same SCS in L-STF as in the data portion 1103. In some implementations, the OFDM up-clocking system 800 may up-clock the first preamble portion 1101 by a factor of M/4 and may up-clock the remainder of the PPDU 1100 by a factor of M to produce the PPDU 1110. As a result, the second preamble portion 1112 and the data portion 1113 are spread over a 20*M MHz bandwidth and the first preamble portion 1111 is duplicated on four 5*M MHz sub-bands spanning the 20*M MHz bandwidth. For example, given a 16× up-clocking ratio (M=16), the second preamble portion 1112 and the data portion 1113 are spread over a 320 MHz bandwidth while the first preamble portion 1111 is duplicated on four 80 MHz sub-bands spanning the 320 MHz bandwidth.

As described with reference to FIG. 11A, the non-legacy STF (in the second preamble portion 1112) may be turned off to reduce the overhead associated with the PPDU 1110. In the example of FIG. 11B, the non-legacy LTFs are retained in the second preamble portion 1112. The non-legacy LTFs provide channel estimation for the data portion 1113. Aspects of the present disclosure recognize that because the channel (or beam) does not change between the transmission of the first preamble portion 1111 and the transmission of the data portion 1113, a receiving device may estimate the channel associated with the data portion 1113 based on L-LTF (in the first preamble portion 1111). In some aspects, the non-legacy LTFs can be turned off or otherwise disregarded to further reduce the overhead associated with the PPDU 1110 when the PPDU 1100 is transmitted on a single spatial stream ($N_{SS}=1$). In some implementations, the non-legacy LTFs may carry padding bits or non-essential information. In some other implementations, the non-legacy LTFs may be omitted entirely from the PPDU 1110.

Aspects of the present disclosure further recognize that L-LTF and the non-legacy LTFs are mapped to different subcarriers, according to different tone plans. As described with reference to FIG. 11A, L-LTF is mapped to the (52) data subcarriers associated with a 64-point IFFT (and duplicated 4× in the frequency domain) whereas the non-legacy LTFs are mapped to the (234) data subcarriers associated with a 256-point IFFT. As such, L-LTF is mapped to fewer data subcarriers (across the bandwidth of the PPDU 1110) than the non-legacy LTFs. In some implementations, the receiving device may need to interpolate the missing data subcarriers (such as the data subcarriers to which the data portion 1113 is mapped but L-LTF is not) when using the existing L-LTF to estimate the channel associated with the data portion 1113. However, such channel interpolations may result in a loss of performance. In some other implementations, L-LTF may be modified or redesigned to provide more accurate channel estimation for the data portion 1113.

Figure 11C:
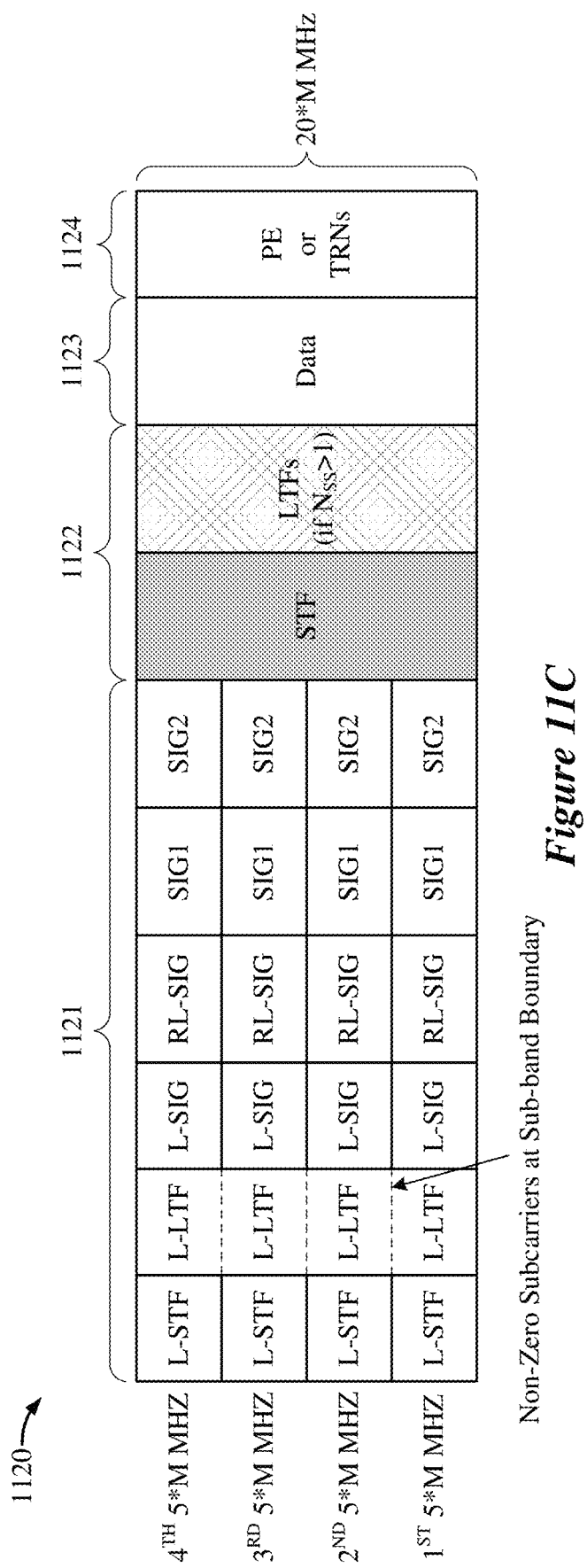
FIG. 11C shows another example up-clocked PPDU based on the PPDU format depicted in FIG. 11A, according to some implementations.

FIG. 11C shows another example up-clocked PPDU 1120 based on the PPDU format depicted in FIG. 11A, according to some implementations. In some aspects, the PPDU 1120 may be a DPHY PPDU that can be used for wireless communications on carrier frequencies above 7 GHz when full beamforming gains are achievable between a transmitting device and a receiving device. The PPDU 1120 includes a PHY preamble, having a first portion 1121 and a second portion 1122, followed by a data portion 1123 and a PE or one or more TRNs 1124. In some aspects, the PPDU 1120 may represent an up-clocking of the PPDU 1100 by a factor of M. In such aspects, the first preamble portion 1121, the second preamble portion 1122, the data portion 1123, and the PE or TRNs 1124 may be examples of the first preamble portion 1101, the second preamble portion 1102, the data portion 1103, and the PE 1104, respectively, of FIG. 11A. In some aspects, the up-clocking may be performed by the OFDM up-clocking system 800 of FIG. 8.

As described with reference to FIG. 11A, the SCS associated with L-STF is 4× larger than the SCS associated with the data portion 1123. Thus, the first preamble portion 1101 can be up-clocked by a factor of M/4, and duplicated 4× in the frequency domain, to achieve the same SCS in L-STF as in the data portion 1103. In some implementations, the OFDM up-clocking system 800 may up-clock the first preamble portion 1101 by a factor of M/4 and may up-clock the remainder of the PPDU 1100 by a factor of M to produce the PPDU 1120. As a result, the second preamble portion 1122 and the data portion 1123 are spread over a 20*M MHz bandwidth and the PHY preamble 1121 is duplicated on four 5*M MHz sub-bands spanning the 20*M MHz bandwidth. For example, given a 16× up-clocking ratio (M=16), the second preamble portion 1122 and the data portion 1123 are spread over a 320 MHz bandwidth and the first preamble portion 1121 are duplicated on four 80 MHz sub-bands spanning the 320 MHz bandwidth.

As described with reference to FIG. 11A, the non-legacy STF (in the second preamble portion 1122) may be turned off to reduce the overhead associated with the PPDU 1120. In some implementations, the non-legacy LTFs (in the second preamble portion 1122) also may be turned off to further reduce the overhead associated with the PPDU 1120. In the example of FIG. 11C, L-LTF may be populated on the same subcarriers as the data portion 1123 to compensate for the lack of non-legacy LTFs. As described with reference to FIG. 11B, existing L-LTFs are mapped to fewer data subcarriers than the data portion 1123 due to the differences in tone plans associated therewith. More specifically, the tone plan associated with the first preamble portion 1121 includes guard subcarriers at the boundaries of each 5*M MHz sub-band. In some aspects, non-zero values may be modulated on at least some of the guard subcarriers associated with the data subcarriers to which L-LTF is mapped. In other words, L-LTF may include non-zero values that are mapped to each data subcarrier of its associated tone plan and a number of the guard subcarriers at each sub-band boundary (which coincide with data subcarriers to which the data portion 1123 is mapped).

Aspects of the present disclosure recognize that the mapping of non-zero values to guard subcarriers can be implemented by existing WLAN hardware (which operates on 20 MHz bandwidth portions). However, the resulting LTF values may increase the peak-to-average power ratio (PAPR) of the PPDU 1120. Aspects of the present disclosure further recognize that additional LTFs may be needed to support multiple spatial streams. More specifically, the application of a P-matrix requires the LTF values to be the same for each spatial stream. Thus, in some implementations, the non-legacy LTFs may be included in the second preamble portion 1122 only when the PPDU 1120 is to be transmitted over more than one spatial stream ($N_{SS}$>1). In some other implementations, a P-matrix applied directly to L-LTF (in the first preamble portion 1121) to produce two non-identical OFDM symbols that can support up to two spatial streams. In such implementations, the non-legacy LTFs may be included in the second preamble portion 1122 only when the PPDU 1120 is to be transmitted over more than two spatial streams ($N_{SS}$>2).

Figure 11D:
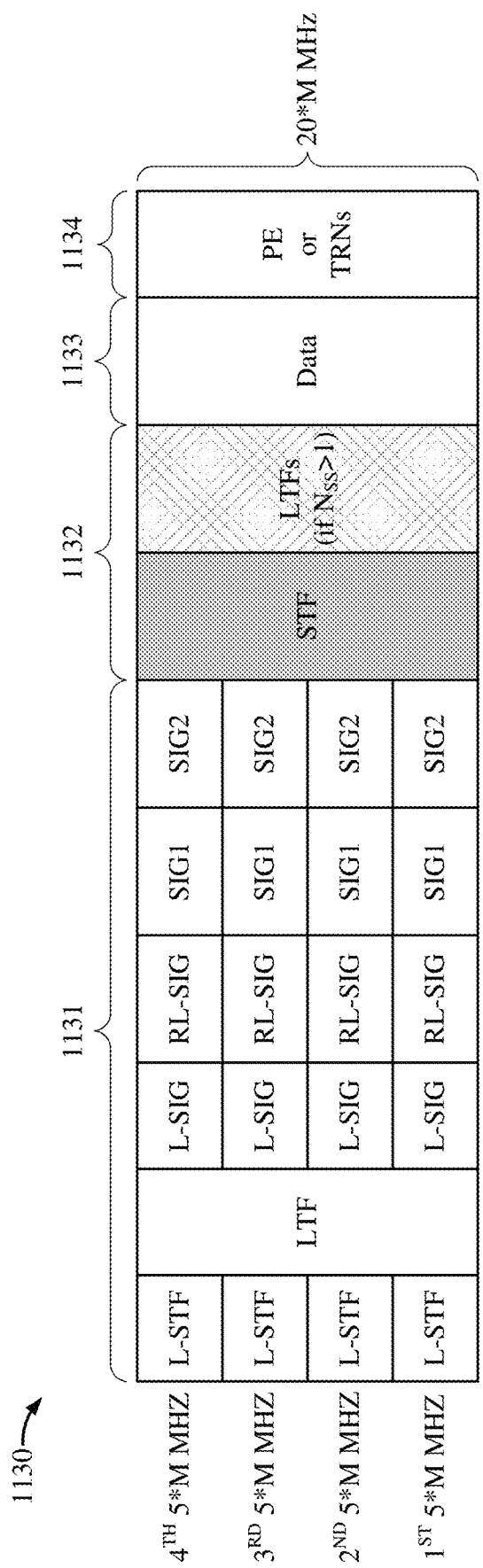
FIG. 11D shows another example up-clocked PPDU based on the PPDU format depicted in FIG. 11A, according to some implementations.

FIG. 11D shows another example up-clocked PPDU 1130 based on the PPDU format depicted in FIG. 11A, according to some implementations. In some aspects, the PPDU 1130 may be a DPHY PPDU that can be used for wireless communications on carrier frequencies above 7 GHz when full beamforming gains are achievable between a transmitting device and a receiving device. The PPDU 1130 includes a PHY preamble, having a first portion 1131 and a second portion 1132, followed by a data portion 1133 and a PE or one or more TRNs 1134. In some aspects, the PPDU 1130 may represent an up-clocking of the PPDU 1100 by a factor of M. However, in contrast with the PPDU 1100 of FIG. 11A, the first preamble portion 1131 includes a non-legacy long training field (LTF) which replaces L-LTF and is mapped to the same data subcarriers (according to the same tone plan) as the data portion 1133. In some aspects, the up-clocking may be performed by the OFDM up-clocking system 800 of FIG. 8.

As described with reference to FIG. 11A, the SCS associated with L-STF is 4× larger than the SCS associated with the data portion 1133. Thus, the first preamble portion 1101 (excluding LTF) can be up-clocked by a factor of M/4, and duplicated 4× in the frequency domain, to achieve the same SCS in L-STF as in the data portion 1103. In some implementations, the OFDM up-clocking system 800 may up-clock the first preamble portion 1101 (excluding LTF) by a factor of M/4 and may up-clock the remainder of the PPDU 1100 (including LTF in the first preamble portion 1101) by a factor of M to produce the PPDU 1130. As a result, the non-legacy LTF in the first preamble portion 1131, the second preamble portion 1132, and the data portion 1133 are spread over a 20*M MHz bandwidth and the remainder of the first preamble portion 1131 is duplicated on four 5*M MHz sub-bands spanning the 20*M MHz bandwidth. For example, given a 16× up-clocking ratio (M=16), the non-legacy LTF in the first preamble portion 1131, the second preamble portion 1132, and the data portion 1133 are spread over a 320 MHz bandwidth while the remainder of the first preamble portion 1131 is duplicated on four 80 MHz sub-bands spanning the 320 MHz bandwidth.

As described with reference to FIG. 11A, the non-legacy STF (in the second preamble portion 1132) may be turned off to reduce the overhead associated with the PPDU 1130. In some implementations, the non-legacy LTFs (in the second preamble portion 1132) also may be turned off to further reduce the overhead associated with the PPDU 1130. In the example of FIG. 11D, the non-legacy LTF in the first preamble portion 1131 is populated on the same subcarriers as the data portion 1133 to compensate for the lack of non-legacy LTFs in the second preamble portion 1132. In some implementations, the non-legacy LTF may be optimized for the bandwidth associated with the PPDU 1130. With reference for example to FIG. 11C, the non-legacy LTF in the first preamble portion 1131 may yield a lower PAPR than the L-LTF mapping in the first preamble portion 1121 of the PPDU 1120.

Aspects of the present disclosure further recognize that additional LTFs may be needed to support multiple spatial streams (such as described with reference to FIG. 11C). Thus, in some implementations, additional non-legacy LTFs may be included in the second preamble portion 1132 only when the PPDU 1130 is to be transmitted over multiple spatial streams ($N_{SS}$>1). In some other implementations, a P-matrix may be applied directly to the non-legacy LTF in the first preamble portion 1131 to produce two non-identical OFDM symbols that can support up to two spatial streams. In such implementations, additional non-legacy LTFs may be included in the second preamble portion 1132 only when the PPDU 1130 is to be transmitted over more than two spatial streams ($N_{SS}$>2).

Figure 12A:
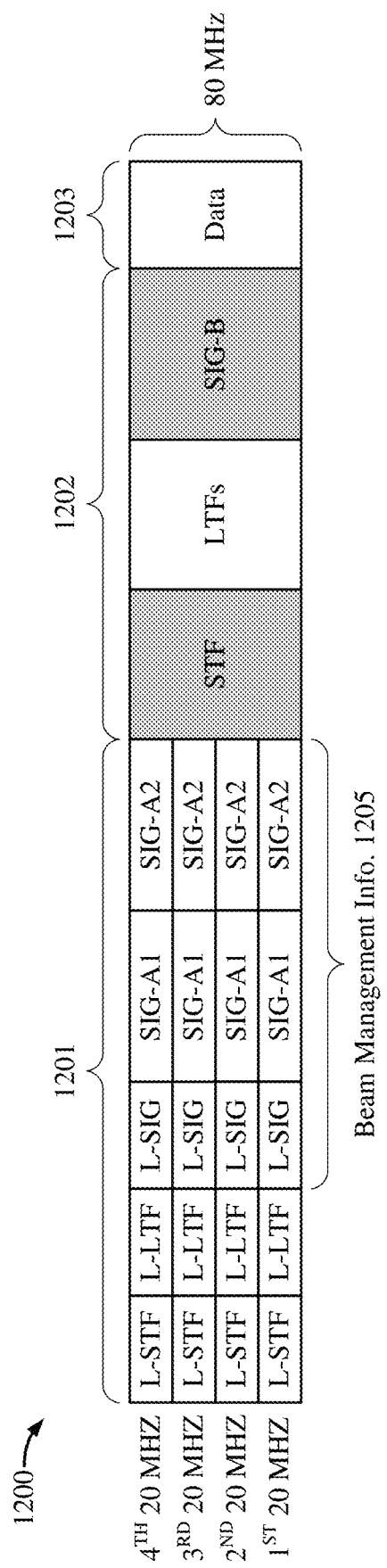
FIG. 12A shows an example PPDU formatted in accordance with a legacy PPDU format.

FIG. 12A shows an example PPDU 1200 formatted in accordance with a legacy PPDU format. In the example of FIG. 12A, the legacy PPDU format is an 11ac PPDU format associated with an 80 MHz channel bandwidth. The PPDU 1200 includes a PHY preamble, having a first portion 1201 and a second portion 1202, followed by a data portion 1203. The first preamble portion 1201 includes an L-STF, an L-LTF, an L-SIG, and a first non-legacy signal field (SIG-A) spanning a first OFDM symbol (SIG-A1) and a second OFDM symbol (SIG-A2). The second preamble portion 1202 includes a non-legacy short training field (STF), one or more non-legacy long training fields (LTFs), and a second non-legacy signal field (SIG-B).

The IEEE 802.11ac amendment of the IEEE 802.11 standard defines the non-legacy fields SIG-A1, SIG-A2, STF, LTFs, and SIG-B as VHT fields VHT-SIG-A1, VHT-SIG-A2, VHT-STF, VHT-LTFs, and VHT-SIG-B, respectively. According to the 11ac PPDU format, the data portion 1203 is mapped to each contiguous data subcarrier associated with a 256-subcarrier tone plan spanning the 80 MHz bandwidth. In contrast, the first preamble portion 1201 is duplicated on four 20 MHz sub-bands spanning the 80 MHz bandwidth. More specifically, L-STF is mapped to every $4^{th}$ data subcarrier associated with a 64-subcarrier tone plan while the remainder of the first preamble portion 1201 is mapped to each contiguous data subcarrier associated with the 64-subcarrier tone plan. Thus, the bandwidth (BW) of the PPDU 1200 is equal to the sampling rate ($f_s$) of a clock signal used to convert the PPDU 1200 from the frequency domain to the time domain (BW=$f_s$), and the SCS associated with L-STF is equal to the SCS associated with the data portion 1203.

In some aspects, the PPDU 1200 may be up-clocked as a DPHY PPDU for wireless communications on carrier frequencies above 7 GHz. More specifically, the PPDU 1200 may be used for wireless communications when full beamforming gains are achievable between a transmitting device and a receiving device. In other words, the transmitting device may transmit the PPDU 1200 after performing a beamforming training operation with the receiving device. In some implementations, the PPDU 1200 may carry beam management information 1205 indicating whether the PPDU 1200 is associated with a beamforming training operation or various parameters associated with the beamforming training operation (such as described with reference to FIG. 9A). In some implementations, the beam management information 1205 may be carried in one or more of the SIG fields in the first preamble portion 1201 (such as L-SIG, SIG-A1, or SIG-A2).

In some implementations, the training sequence associated with L-STF may be replaced with a Golay sequence to simplify packet detection (such as described with reference to FIG. 11A). In some aspects, the non-legacy STF can be turned off to reduce the overhead associated with the PPDU 1200 (such as described with reference to FIG. 11A). According to the 11ac PPDU format, SIG-B (in the second preamble portion 1202) provides signaling for multi-user (MU) communications. However, aspects of the present disclosure recognize that the PPDU 1200 may not support MU communications due to the narrow beams required to overcome path loss on carrier frequencies above 7 GHz (such as described with reference to FIG. 6). In some aspects, SIG-B also may be turned off to further reduce the overhead associated with the PPDU 1200. In some implementations, turned-off fields may carry padding bits or non-essential information. In some other implementations, turned-off fields may be omitted entirely from the PPDU 1200.

Figure 12B:
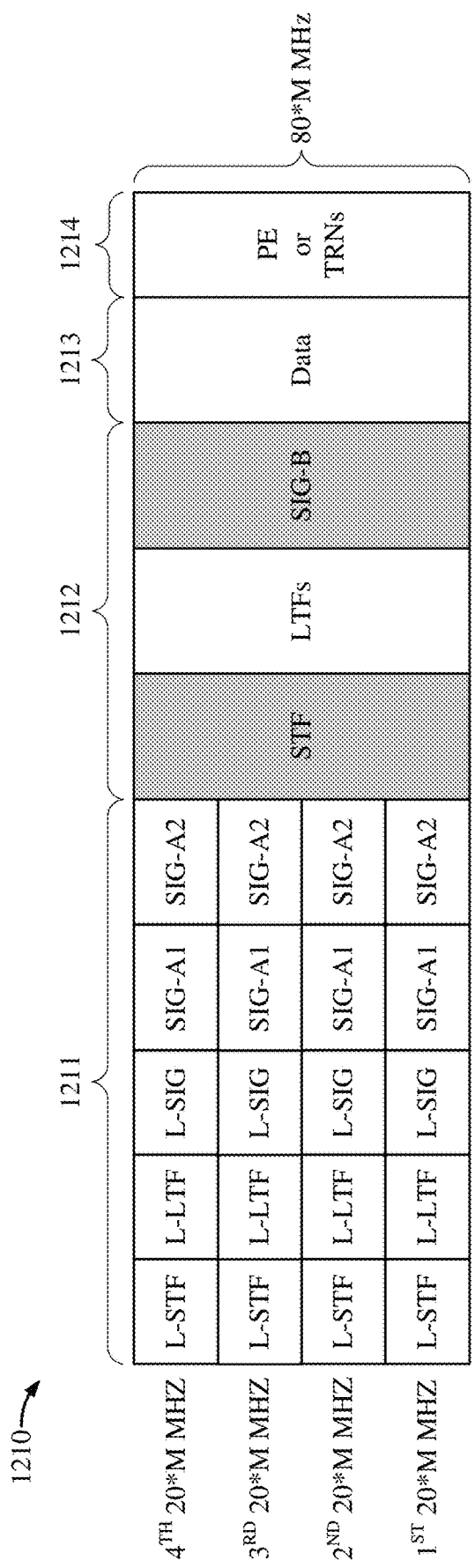
FIG. 12B shows an example up-clocked PPDU based on the PPDU format depicted in FIG. 12A, according to some implementations.

FIG. 12B shows an example up-clocked PPDU 1210 based on the PPDU format depicted in FIG. 12A, according to some implementations. In some aspects, the PPDU 1210 may be a DPHY PPDU that can be used for wireless communications on carrier frequencies above 7 GHz when full beamforming gains are achievable between a transmitting device and a receiving device. The PPDU 1210 includes a PHY preamble, having a first portion 1211 and a second portion 1212, followed by a data portion 1213. In some aspects, the PPDU 1210 may represent an up-clocking of the PPDU 1200 by a factor of M. In such aspects, the first preamble portion 1211, the second preamble portion 1212, and the data portion 1213 may be examples of the first preamble portion 1201, the second preamble portion 1202, and the data portion 1203, respectively, of FIG. 12A. In some aspects, the up-clocking may be performed by the OFDM up-clocking system 800 of FIG. 8.

In some implementations, a PE or one or more TRNs 1214 may be added to the PPDU 1210 to support enhanced features for wireless communications on carrier frequencies above 7 GHz (such as beamforming training operations). As a result of up-clocking, the second preamble portion 1212 and the data portion 1213 are spread over an 80*M MHz bandwidth and the first preamble portion 1211 is duplicated on four 20*M MHz sub-bands spanning the 80*M MHz bandwidth. For example, given a 4× up-clocking ratio (M=4), the second preamble portion 1212 and the data portion 1213 are spread over a 320 MHz bandwidth while the first preamble portion 1211 is duplicated on four 80 MHz sub-bands spanning the 320 MHz bandwidth.

As described with reference to FIG. 12A, the non-legacy STF and SIG-B (in the second preamble portion 1212) may be turned off to reduce the overhead associated with the PPDU 1210. In the example of FIG. 12B, the non-legacy LTFs are retained in the second preamble portion 1212. In some other aspects, the non-legacy LTFs can be turned off or otherwise disregarded to further reduce the overhead associated with the PPDU 1210 (such as described with reference to FIG. 11B). In some implementations, the receiving device may estimate the channel associated with the data portion 1213 based on the existing L-LTF in the first preamble portion 1211 (such as through interpolation of the missing data subcarriers). In some other implementations, L-LTF may be modified or redesigned to provide more accurate channel estimation for the data portion 1213.

Figure 12C:
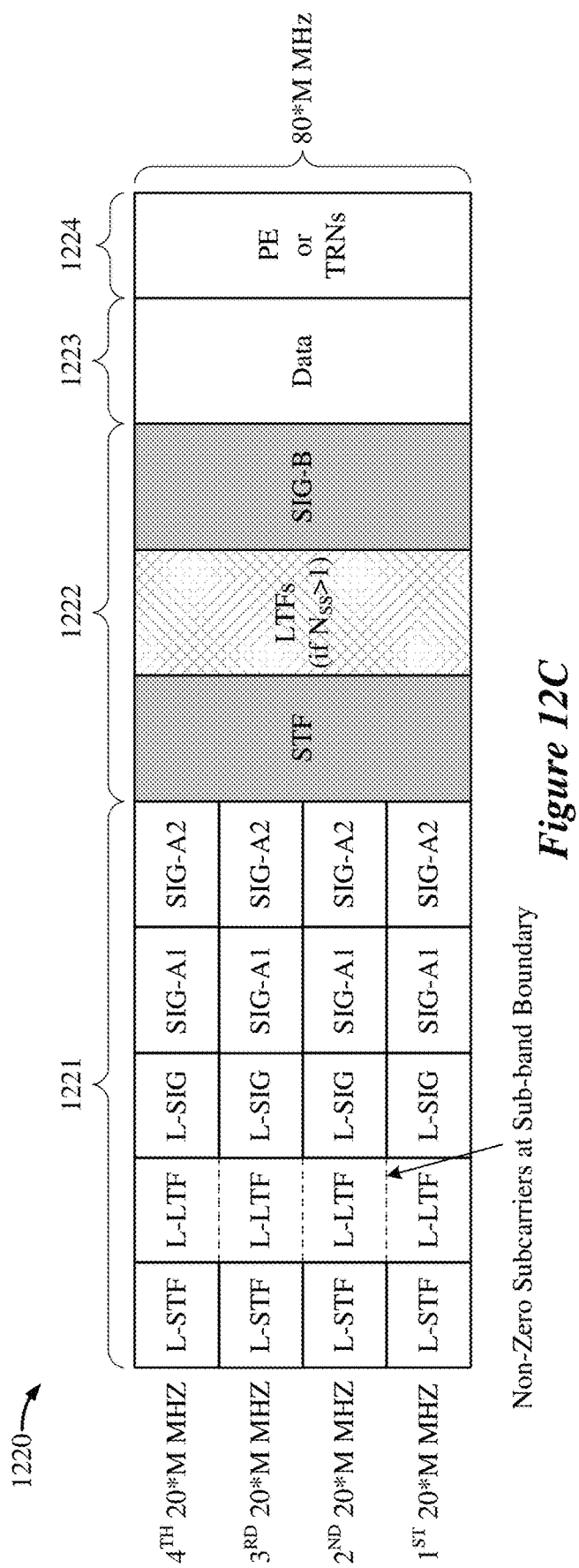
FIG. 12C shows another example up-clocked PPDU based on the PPDU format depicted in FIG. 12A, according to some implementations.

FIG. 12C shows another example up-clocked PPDU 1220 based on the PPDU format depicted in FIG. 12A, according to some implementations. In some aspects, the PPDU 1220 may be a DPHY PPDU that can be used for wireless communications on carrier frequencies above 7 GHz when full beamforming gains are achievable between a transmitting device and a receiving device. The PPDU 1220 includes a PHY preamble, having a first portion 1221 and a second portion 1222, followed by a data portion 1223. In some aspects, the PPDU 1220 may represent an up-clocking of the PPDU 1200 by a factor of M. In such aspects, the first preamble portion 1221, the second preamble portion 1222, and the data portion 1223 may be examples of the first preamble portion 1201, the second preamble portion 1202, and the data portion 1203, respectively, of FIG. 12A. In some aspects, the up-clocking may be performed by the OFDM up-clocking system 800 of FIG. 8.

In some implementations, a PE or one or more TRNs 1224 may be added to the PPDU 1220 to support enhanced features for wireless communications on carrier frequencies above 7 GHz (such as beamforming training operations). As a result of up-clocking, the second preamble portion 1222 and the data portion 1223 are spread over an 80*M MHz bandwidth and the first preamble portion 1221 is duplicated on four 20*M MHz sub-bands spanning the 80*M MHz bandwidth. For example, given a 4× up-clocking ratio (M=4), the second preamble portion 1222 and the data portion 1223 are spread over a 320 MHz bandwidth while the first preamble portion 1221 is duplicated on four 80 MHz sub-bands spanning the 320 MHz bandwidth.

As described with reference to FIG. 12A, the non-legacy STF and SIG-B (in the second preamble portion 1222) may be turned off to reduce the overhead associated with the PPDU 1220. In some implementations, the non-legacy LTFs (in the second preamble portion 1222) also may be turned off to further reduce the overhead associated with the PPDU 1220. In the example of FIG. 12C, L-LTF may be populated on the same subcarriers as the data portion 1223 to compensate for the lack of non-legacy LTFs. In some aspects, non-zero values may be modulated on at least some of the guard subcarriers associated with the data subcarriers to which L-LTF is mapped (such as described with reference to FIG. 11C). In some implementations, the non-legacy LTFs may be included the second preamble portion 1222 only when the PPDU 1220 is to be transmitted over multiple spatial streams ($N_{SS}>1$). In some other implementations, a P-matrix may be applied directly to L-LTF (in the first preamble portion 1221) to produce two non-identical OFDM symbols. In such implementations, the non-legacy LTFs may be included in the second preamble portion 1222 only when the PPDU 1220 is to be transmitted over more than two spatial streams ($N_{SS}>2$).

Figure 12D:
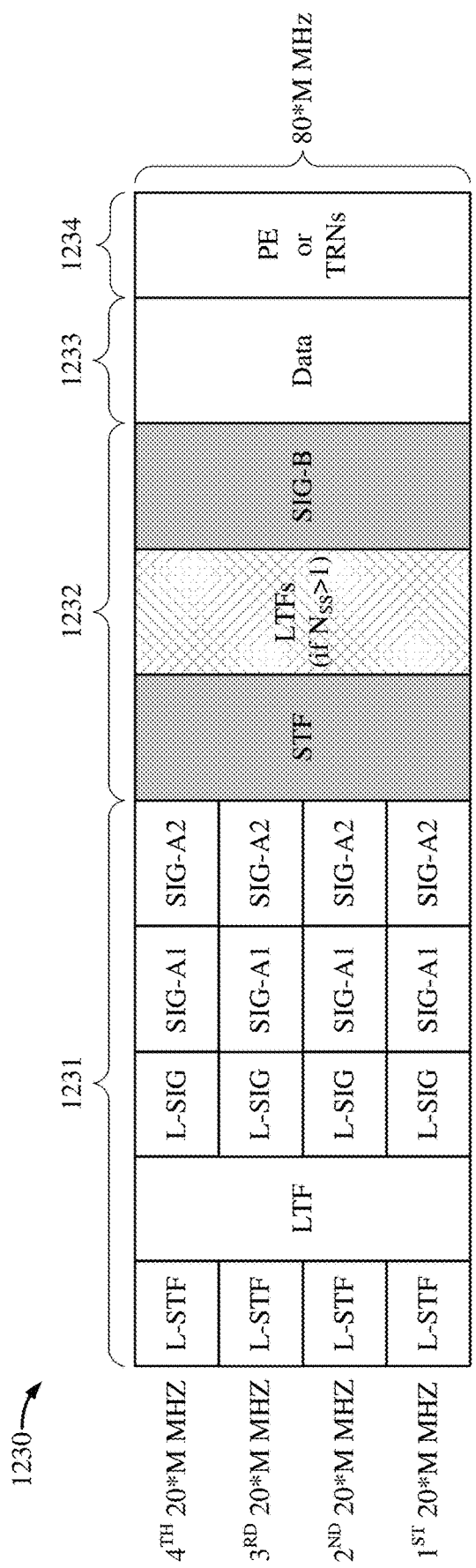
FIG. 12D shows another example up-clocked PPDU based on the PPDU format depicted in FIG. 12A, according to some implementations.

FIG. 12D shows another example up-clocked PPDU 1230 based on the PPDU format depicted in FIG. 12A, according to some implementations. In some aspects, the PPDU 1230 may be a DPHY PPDU that can be used for wireless communications on carrier frequencies above 7 GHz when full beamforming gains are achievable between a transmitting device and a receiving device. The PPDU 1230 includes a PHY preamble, having a first portion 1231 and a second portion 1232, followed by a data portion 1233. In some aspects, the PPDU 1230 may represent an up-clocking of the PPDU 1200 by a factor of M. However, in contrast with the PPDU 1200 of FIG. 12A, the first preamble portion 1231 includes a non-legacy long training field (LTF) which replaces L-LTF and is mapped to the same data subcarriers (according to the same tone plan) as the data portion 1233. In some aspects, the up-clocking may be performed by the OFDM up-clocking system 800 of FIG. 8.

In some implementations, a PE or one or more TRNs 1234 may be added to the PPDU 1230 to support enhanced features for wireless communications on carrier frequencies above 7 GHz (such as beamforming training operations). As a result of up-clocking, the non-legacy LTF in the first preamble portion 1231, the second preamble portion 1232, and the data portion 1233 are spread over an 80*M MHz bandwidth and the first preamble portion 1231 (excluding LTF) is duplicated on four 20*M MHz sub-bands spanning the 80*M MHz bandwidth. For example, given a 4× up-clocking ratio (M=4), the non-legacy LTF in the first preamble portion 1231, the second preamble portion 1232, and the data portion 1233 are spread over a 320 MHz bandwidth while the first preamble portion 1231 (excluding LTF) is duplicated on four 80 MHz sub-bands spanning the 320 MHz bandwidth.

As described with reference to FIG. 12A, the non-legacy STF and SIG-B (in the second preamble portion 1232) may be turned off to reduce the overhead associated with the PPDU 1230. In some implementations, the non-legacy LTFs (in the second preamble portion 1232) also may be turned off to further reduce the overhead associated with the PPDU 1230. In the example of FIG. 12D, the non-legacy LTF in the first preamble portion 1231 is populated on the same subcarriers as the data portion 1233 to compensate for the lack of non-legacy LTFs in the second preamble portion 1232. In some implementations, the non-legacy LTF may be optimized for the bandwidth associated with the PPDU 1230 (such as described with reference to FIG. 11D). In some implementations, additional non-legacy LTFs may be added to the second preamble portion 1232 only when the PPDU 1230 is to be transmitted over multiple spatial streams ($N_{SS}>1$). In some other implementations, a P-matrix may be applied directly to the non-legacy LTF in the first preamble portion 1231 to produce two non-identical OFDM symbols. In such implementations, additional non-legacy LTFs may be included in the second preamble portion 1232 only when the PPDU 1230 is to be transmitted over more than two spatial streams ($N_{SS}>2$).

Figure 13A:
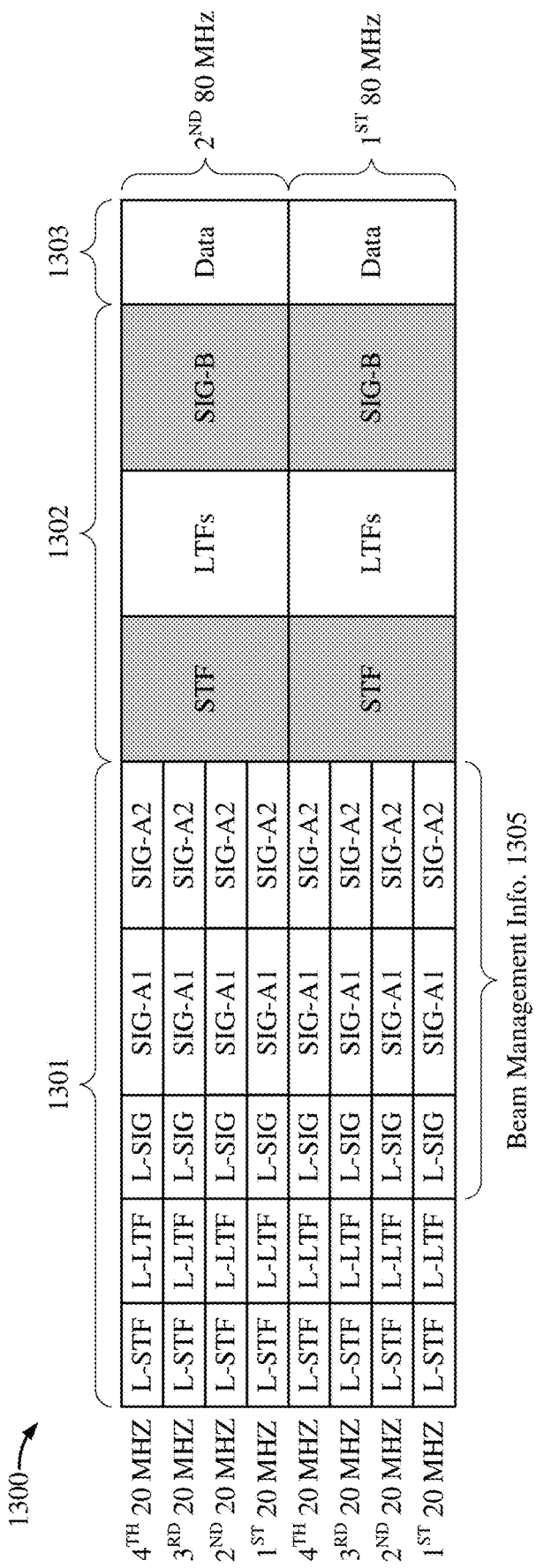
FIG. 13A shows an example PPDU formatted in accordance with a legacy PPDU format.

FIG. 13A shows an example PPDU 1300 formatted in accordance with a legacy PPDU format. In the example of FIG. 13A, the legacy PPDU format is an 11ac PPDU format associated with an 80+80 MHz channel bandwidth. The PPDU 1300 includes a PHY preamble, having a first portion 1301 and a second portion 1302, followed by a data portion 1303. The first preamble portion 1301 includes an L-STF, an L-LTF, an L-SIG, and a first non-legacy signal field (SIG-A) spanning a first OFDM symbol (SIG-A1) and a second OFDM symbol (SIG-A2). The second preamble portion 1302 includes a non-legacy short training field (STF), one or more non-legacy long training fields (LTFs), and a second non-legacy signal field (SIG-B).

The IEEE 802.11ac amendment of the IEEE 802.11 standard defines the non-legacy fields SIG-A1, SIG-A2, STF, LTFs, and SIG-B as VHT fields VHT-SIG-A1, VHT-SIG-A2, VHT-STF, VHT-LTFs, and VHT-SIG-B, respectively. According to the 11ac PPDU format, the data portion 1303 is mapped to each contiguous data subcarrier associated with a 256-subcarrier tone plan spanning a first 80 MHz bandwidth and to each contiguous data subcarrier associated with a 256-subcarrier tone plan spanning a second 80 MHz bandwidth. In contrast, the first preamble portion 1301 is duplicated on four 20 MHz sub-bands spanning the first 80 MHz bandwidth and another four 20 MHz sub-bands spanning the second 80 MHz bandwidth. More specifically, L-STF is mapped to every $4^{th}$ data subcarrier associated with a 64-subcarrier tone plan while the remainder of the first preamble portion 1301 is mapped to each contiguous data subcarrier associated with the 64-subcarrier tone plan. With reference for example to FIG. 12A, each 80 MHz bandwidth portion of the PPDU 1300 mirrors the format of the PPDU 1200.

In some aspects, the PPDU 1300 may be up-clocked as a DPHY PPDU for wireless communications on carrier frequencies above 7 GHz. More specifically, the PPDU 1300 may be used for wireless communications when full beamforming gains are achievable between a transmitting device and a receiving device. In other words, the transmitting device may transmit the PPDU 1300 after performing a beamforming training operation with the receiving device. In some implementations, the PPDU 1300 may carry beam management information 1305 indicating whether the PPDU 1300 is associated with a beamforming training operation or various parameters associated with the beamforming training operation (such as described with reference to FIG. 9A). In some implementations, the beam management information 1305 may be carried in one or more of the SIG fields in the first preamble portion 1301 (such as L-SIG, SIG-A1, or SIG-A2).

In some implementations, the training sequence associated with L-STF may be replaced with a Golay sequence to simplify packet detection (such as described with reference to FIG. 11A). In some aspects, the non-legacy STF can be turned off to reduce the overhead associated with the PPDU 1300 (such as described with reference to FIG. 11A). In some aspects, SIG-B also may be turned off to further reduce the overhead associated with the PPDU 1300 (such as described with reference to FIG. 12A). In some implementations, turned-off fields may carry padding bits or non-essential information. In some other implementations, turned-off fields may be omitted entirely from the PPDU 1300.

Figure 13B:
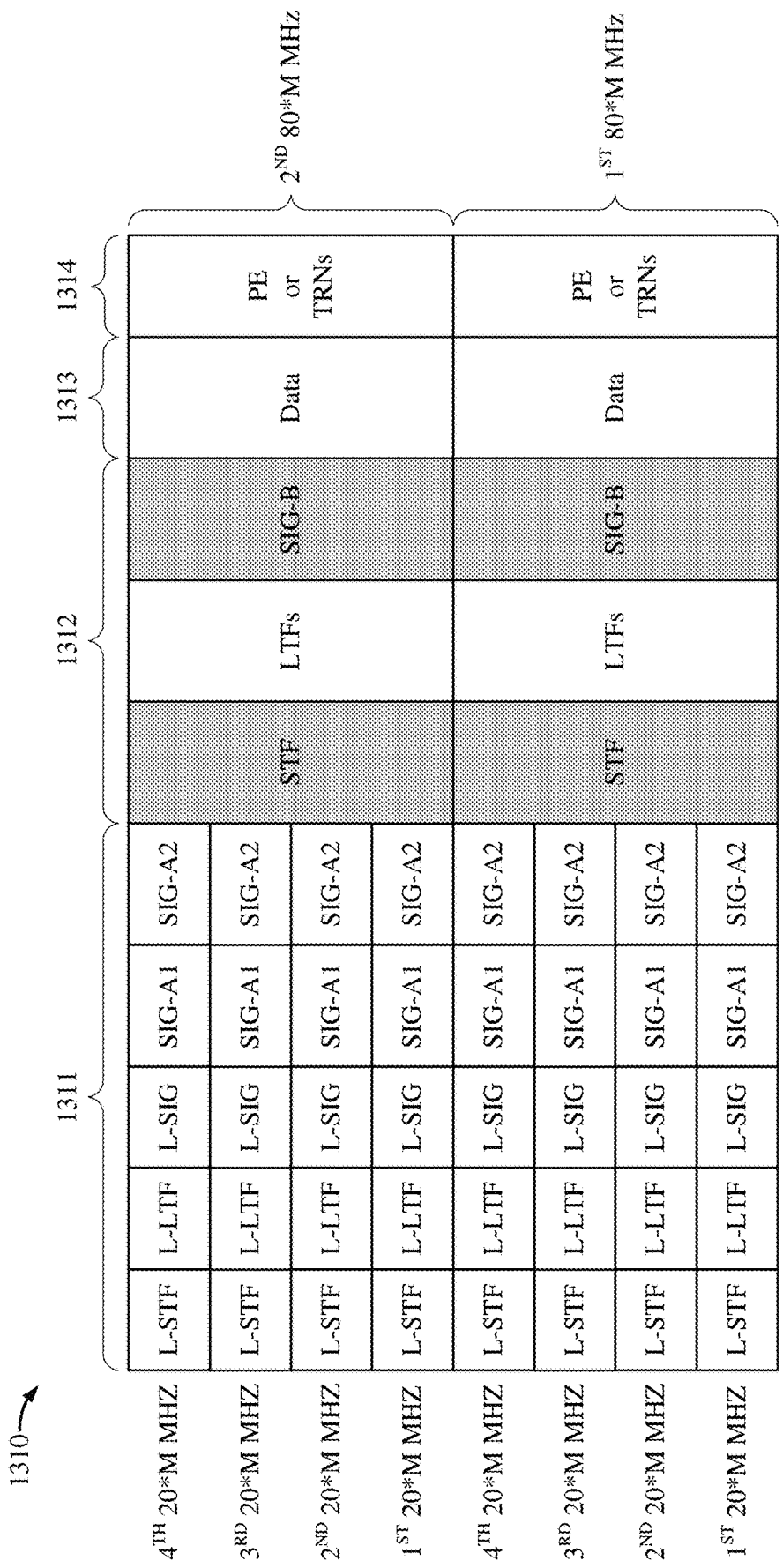
FIG. 13B shows an example up-clocked PPDU based on the PPDU format depicted in FIG. 13A, according to some implementations.

FIG. 13B shows an example up-clocked PPDU 1310 based on the PPDU format depicted in FIG. 13A, according to some implementations. In some aspects, the PPDU 1310 may be a DPHY PPDU that can be used for wireless communications on carrier frequencies above 7 GHz when full beamforming gains are achievable between a transmitting device and a receiving device. The PPDU 1310 includes a PHY preamble, having a first portion 1311 and a second portion 1312, followed by a data portion 1313. In some aspects, the PPDU 1310 may represent an up-clocking of the PPDU 1300 by a factor of M. In such aspects, the first preamble portion 1311, the second preamble portion 1312, and the data portion 1313 may be examples of the first preamble portion 1301, the second preamble portion 1302, and the data portion 1303, respectively, of FIG. 13A. In some aspects, the up-clocking may be performed by the OFDM up-clocking system 800 of FIG. 8.

In some implementations, a PE or one or more TRNs 1314 may be added to the PPDU 1310 to support enhanced features for wireless communications on carrier frequencies above 7 GHz (such as beamforming training operations). As a result of up-clocking, the second preamble portion 1312 and the data portion 1313 are spread over two 80*M MHz bandwidth portions, and the first preamble portion 1311 is duplicated on four 20*M MHz sub-bands spanning the first 80*M MHz bandwidth and another four 20*M MHz sub-bands spanning the second 80*M MHz bandwidth. For example, given a 4× up-clocking ratio (M=4), the second preamble portion 1312 and the data portion 1313 are spread over a 640 MHz bandwidth while the first preamble portion 1311 is duplicated on eight 80 MHz sub-bands spanning the 640 MHz bandwidth. With reference for example to FIG. 12B, each 80 MHz bandwidth portion of the PPDU 1310 mirrors the format of the PPDU 1210.

As described with reference to FIG. 13A, the non-legacy STF and SIG-B (in the second preamble portion 1312) may be turned off to reduce the overhead associated with the PPDU 1310. In the example of FIG. 13B, the non-legacy LTFs are retained in the second preamble portion 1312. In some other aspects, the non-legacy LTFs can be turned off or otherwise disregarded to further reduce the overhead associated with the PPDU 1310 (such as described with reference to FIG. 11B). In some implementations, the receiving device may estimate the channel associated with the data portion 1313 based on the existing L-LTF in the first preamble portion 1311 (such as through interpolation of the missing data subcarriers). In some other implementations, L-LTF may be modified or redesigned to provide more accurate channel estimation for the data portion 1313.

Figure 13C:
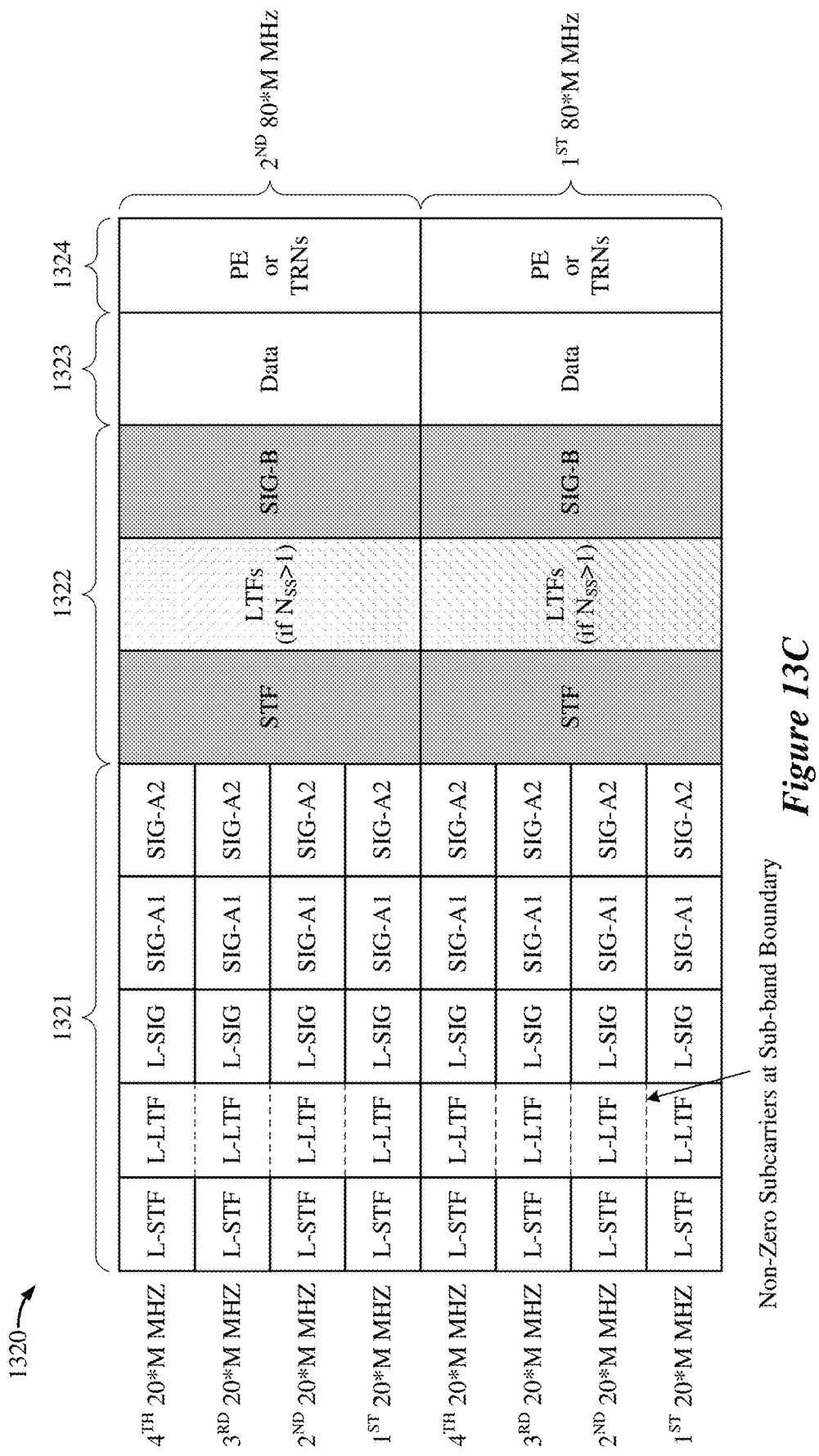
FIG. 13C shows another example up-clocked PPDU based on the PPDU format depicted in FIG. 13A, according to some implementations.

FIG. 13C shows another example up-clocked PPDU 1320 based on the PPDU format depicted in FIG. 13A, according to some implementations. In some aspects, the PPDU 1320 may be a DPHY PPDU that can be used for wireless communications on carrier frequencies above 7 GHz when full beamforming gains are achievable between a transmitting device and a receiving device. The PPDU 1320 includes a PHY preamble, having a first portion 1321 and a second portion 1322, followed by a data portion 1323. In some aspects, the PPDU 1320 may represent an up-clocking of the PPDU 1300 by a factor of M. In such aspects, the first preamble portion 1321, the second preamble portion 1322, and the data portion 1323 may be examples of the first preamble portion 1301, the second preamble portion 1302, and the data portion 1303, respectively, of FIG. 13A. In some aspects, the up-clocking may be performed by the OFDM up-clocking system 800 of FIG. 8.

In some implementations, a PE or one or more TRNs 1324 may be added to the PPDU 1320 to support enhanced features for wireless communications on carrier frequencies above 7 GHz (such as beamforming training operations). As a result of up-clocking, the second preamble portion 1322 and the data portion 1323 are spread over two 80*M MHz bandwidth portions, and the first preamble portion 1321 is duplicated on four 20*M MHz sub-bands spanning the first 80*M MHz bandwidth portion and another four 20*M MHz sub-bands spanning the second 80*M MHz bandwidth portion. For example, given a 4× up-clocking ratio (M=4), the second preamble portion 1322 and the data portion 1323 are spread over a 640 MHz bandwidth while the first preamble portion 1321 is duplicated on eight 80 MHz sub-bands spanning the 640 MHz bandwidth. With reference for example to FIG. 12C, each 80 MHz bandwidth portion of the PPDU 1320 mirrors the format of the PPDU 1220.

As described with reference to FIG. 13A, the non-legacy STF and SIG-B (in the second preamble portion 1322) may be turned off to reduce the overhead associated with the PPDU 1320. In some implementations, the non-legacy LTFs (in the second preamble portion 1322) also may be turned off to further reduce the overhead associated with the PPDU 1320. In the example of FIG. 13C, L-LTF may be populated on the same subcarriers as the data portion 1323 to compensate for the lack of non-legacy LTFs. In some aspects, non-zero values may be modulated on at least some of the guard subcarriers associated with the data subcarriers to which L-LTF is mapped (such as described with reference to FIG. 11C). In some implementations, the non-legacy LTFs may be included in the second preamble portion 1322 only when the PPDU 1320 is to be transmitted over multiple spatial streams ($N_{SS}$>1). In some other implementations, a P-matrix may be applied directly to L-LTF (in the first preamble portion 1321) to produce two non-identical OFDM symbols. In such implementations, the non-legacy LTFs may be included in the second preamble portion 1322 only when the PPDU 1320 is to be transmitted over more than two spatial streams ($N_{SS}$>2).

Figure 13D:
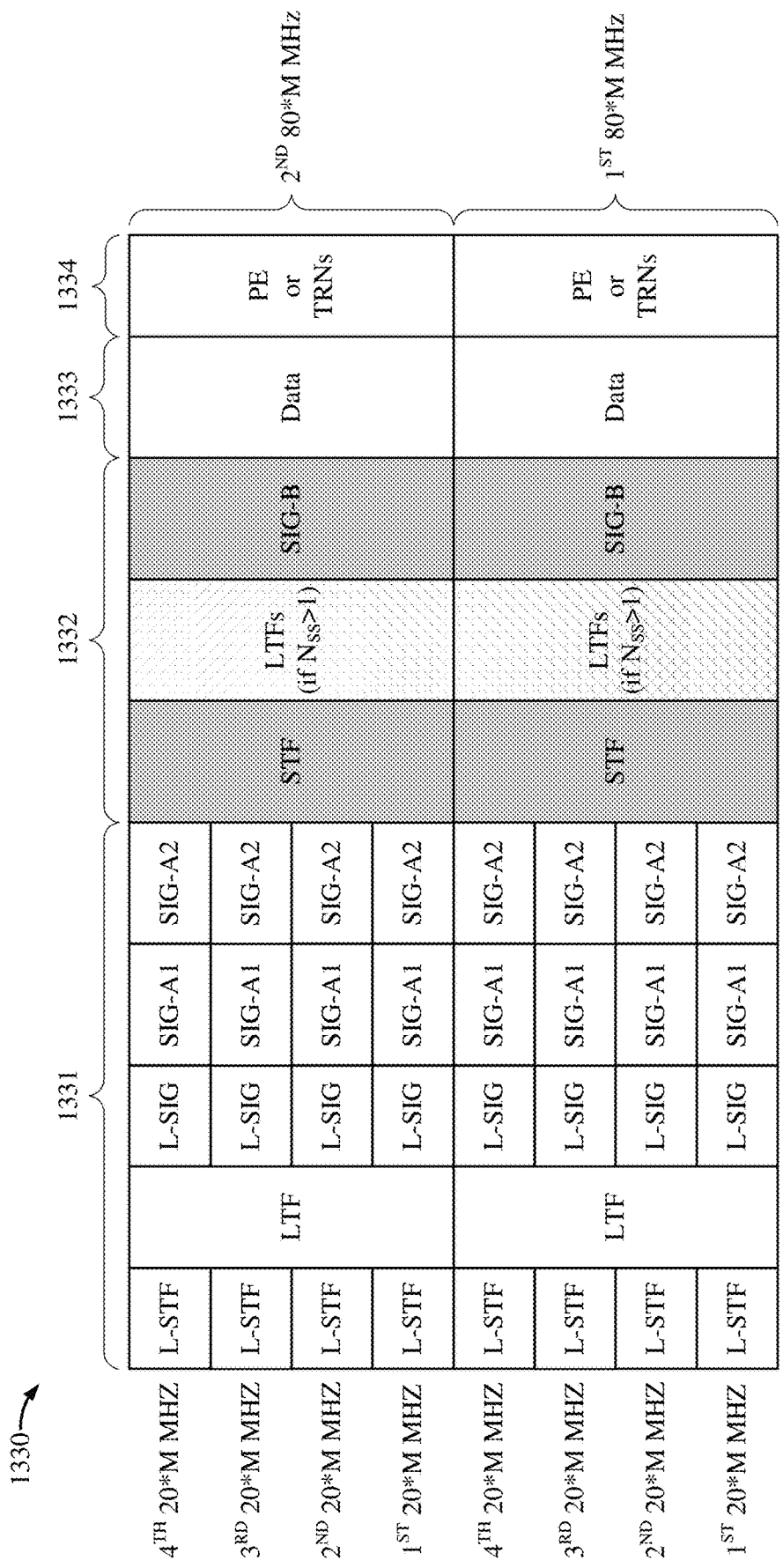
FIG. 13D shows another example up-clocked PPDU based on the PPDU format depicted in FIG. 13A, according to some implementations.

FIG. 13D shows another example up-clocked PPDU 1330 based on the PPDU format depicted in FIG. 13A, according to some implementations. In some aspects, the PPDU 1330 may be a DPHY PPDU that can be used for wireless communications on carrier frequencies above 7 GHz when full beamforming gains are achievable between a transmitting device and a receiving device. The PPDU 1330 includes a PHY preamble, having a first portion 1331 and a second portion 1332, followed by a data portion 1333. In some aspects, the PPDU 1330 may represent an up-clocking of the PPDU 1300 by a factor of M. However, in contrast with the PPDU 1300 of FIG. 13A, the first preamble portion 1331 includes a non-legacy long training field (LTF) which replaces L-LTF and is mapped to the same data subcarriers (according to the same tone plan) as the data portion 1333.

In some aspects, the up-clocking may be performed by the OFDM up-clocking system 800 of FIG. 8.

In some implementations, a PE or one or more TRNs 1334 may be added to the PPDU 1330 to support enhanced features for wireless communications on carrier frequencies above 7 GHz (such as beamforming training operations). As a result of up-clocking, the non-legacy LTF in the first preamble portion 1331, the second preamble portion 1332, and the data portion 1333 are spread over two 80*M MHz bandwidth portions, and the first preamble portion 1331 (excluding LTF) is duplicated on four 20*M MHz sub-bands spanning the first 80*M MHz bandwidth portion and another four 20*M MHz sub-bands spanning the second 80*M MHz bandwidth portion. For example, given a 4× up-clocking ratio (M=4), the non-legacy LTF in the first preamble portion 1331, the second preamble portion 1332, and the data portion 1333 are spread over a 640 MHz bandwidth while the first preamble portion 1331 (excluding LTF) is duplicated on eight 80 MHz sub-bands spanning the 640 MHz bandwidth. With reference for example to FIG. 12D, each 80 MHz bandwidth portion of the PPDU 1330 mirrors the format of the PPDU 1230.

As described with reference to FIG. 13A, the non-legacy STF and SIG-B (in the second preamble portion 1332) may be turned off to reduce the overhead associated with the PPDU 1330. In some implementations, the non-legacy LTFs (in the second preamble portion 1332) also may be turned off to further reduce the overhead associated with the PPDU 1330. In the example of FIG. 13D, the non-legacy LTF in the first preamble portion 1331 is populated on the same subcarriers as the data portion 1333 to compensate for the lack of non-legacy LTFs in the second preamble portion 1332. In some implementations, the non-legacy LTF may be optimized for the bandwidth associated with the PPDU 1330 (such as described with reference to FIG. 11D). In some implementations, additional non-legacy LTFs may be included the second preamble portion 1332 only when the PPDU 1130 is to be transmitted over multiple spatial streams ($N_{SS}$>1). In some other implementations, a P-matrix may be applied directly to L-LTF (in the first preamble portion 1331) to produce two non-identical OFDM symbols. In such implementations, additional non-legacy LTFs may be included in the second preamble portion 1332 only when the PPDU 1330 is to be transmitted over more than two spatial streams ($N_{SS}$>2).

Aspects of the present disclosure recognize that the CPHY PPDU format of FIG. 10B and the DPHY PPDU format of FIG. 11B can be implemented using the same processing and up-clocking resources. For example, the PHY preamble 1011 and the first preamble portion 1111 each include an RL-SIG and have the same SCS and frequency repetition. As such, the CPHY PPDU format of FIG. 10B and the DPHY PPDU format of FIG. 11B may collectively represent a "harmonized" PPDU format. In some aspects, the harmonized PPDU format may include signaling to indicate whether the PPDU conforms to a CPHY PPDU format (which includes four L-STF symbols and four non-legacy SIG symbols SIG1-SIG4) or a DPHY PPDU format (which includes two L-STF symbols and two non-legacy SIG symbols SIG1 and SIG2).

In some implementations, the PPDU format (CPHY or DPHY) may be signaled by the value of a length field (L_LEN) in L-SIG. For example, the PPDU may conform to either the DPHY PPDU format or the CPHY PPDU format depending on whether L_LEN % 3=0. In some other implementations, the PPDU format (CPHY or DPHY) may be signaled by the modulation scheme associated with one of the non-legacy SIG fields (or SIG symbols). For example, the second SIG symbol SIG2 may be modulated according to either a BPSK modulation scheme or a quadrature BPSK (QBPSK) modulation scheme to indicate whether the PPDU conforms to the DPHY PPDU format or the CPHY PPDU format.

As described with reference to FIGS. 9A-13D, many existing PPDU formats (including the 11ac PPDU format and the 11be PPDU format) include redundant fields or signaling. Such redundancies may provide backwards compatibility with legacy WLAN devices operating in sub-7 GHz frequency bands. However, aspects of the present disclosure recognize that there are currently no legacy WLAN devices operating at carrier frequencies above 7 GHz. Thus, in some aspects, a new "green field" PPDU format may be designed for carrier frequencies above 7 GHz. More specifically, the green field PPDU format may be optimized for communications on carrier frequencies above 7 GHz, for example, by reducing or eliminating redundant fields or signaling that would otherwise be included for backwards compatibility with legacy WLAN devices. In some implementations, the PHY preamble of the green field PPDU format may have the same symbol duration as the data portion. In some other implementations, the PHY preamble of the green field PPDU format may have a shorter symbol duration than the data portion (to further reduce the overhead of the PPDU).

Figure 14A:
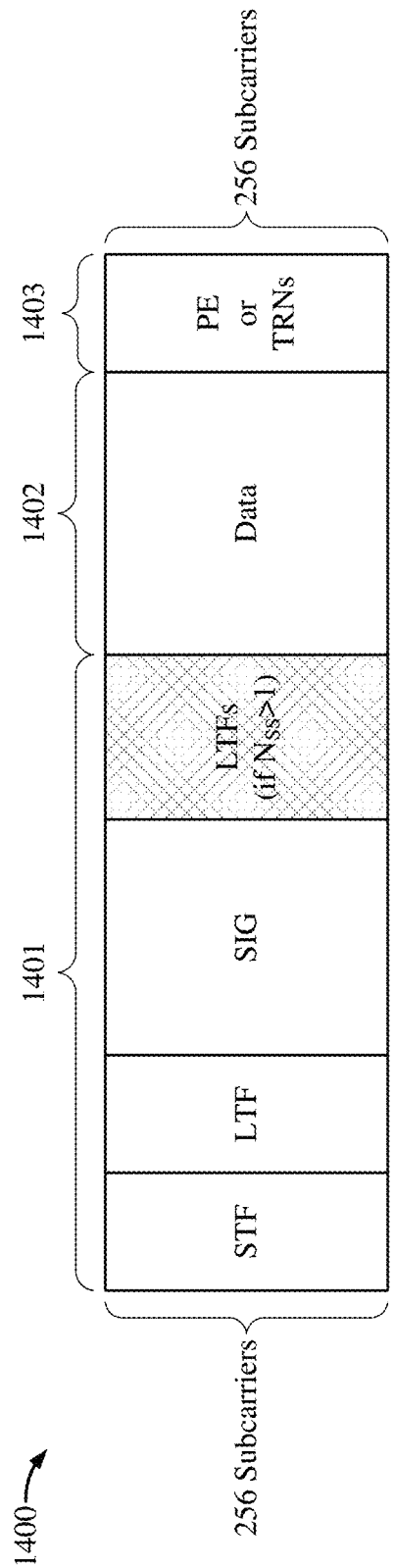
FIG. 14A shows an example PPDU conforming to a green field PPDU format, according to some implementations.

FIG. 14A shows an example PPDU 1400 conforming to a green field PPDU format, according to some implementations. In some implementations, the PPDU 1400 may be a DPHY PPDU that can be used for wireless communications on carrier frequencies above 7 GHz when full beamforming gains are achievable between a transmitting device and a receiving device. The PPDU 1400 includes a PHY preamble 1401 followed by a data portion 1402 and a PE or one or more TRNs 1403. The PHY preamble 1401 includes a short training field (STF), a long training field (LTF), and a signal (SIG) field.

In some implementations, the PHY preamble 1401 may have the same symbol duration as the data portion 1402. In the example of FIG. 14A, the data portion 1402 is mapped to 256 subcarriers associated with a sub-7 GHz tone plan and the PHY preamble 1401 is also mapped to the same 256 subcarriers. As such, the SCS associated with the PHY preamble 1401 is equal to the SCS associated with the data portion 1402. As described with reference to FIG. 8, a sub-7 GHz tone plan maps the subcarriers to a channel bandwidth suitable for wireless communications in a sub-7 GHz frequency band. For example, the tone plan associated with the 11ac PPDU format spreads the 256 subcarriers over an 80 MHz bandwidth. Thus, the PPDU 1400 may be further up-clocked to a wider bandwidth to achieve an SCS suitable for wireless communications on carrier frequencies above 7 GHz (such as described with reference to FIGS. 9A-13D). In some aspects, the up-clocking may be performed by the OFDM up-clocking system 800 of FIG. 8.

In some aspects, the STF may span 2 OFDM symbols (similar to L-STF in existing PPDU formats). In some implementations, the STF may reuse an existing training sequence associated with wireless communications on carrier frequencies below 7 GHz (such as an STF sequence associated with the 11ac PPDU format or the 11be PPDU format). For example, the training sequence may be mapped to every $4^{th}$, $8^{th}$, or $16^{th}$ data subcarrier associated with the 256-subcarrier tone plan (similar to the periodicity of L-STF in existing PPDU formats). In some implementations, the existing training sequence may be a trigger-based (TB) STF sequence associated with the up-clocked PPDU bandwidth. For example, when the PPDU 1400 is up-clocked 4× from an 80 MHz sub-7 GHz channel bandwidth, the STF may carry a TB STF sequence associated with a 320 MHz bandwidth. In some other implementations, the STF may include a Golay sequence to simplify packet detection (such as described with reference to FIG. 11A).

In some aspects, the LTF may span 2 OFDM symbols (similar to L-LTF in existing PPDU formats). In some implementations, the LTF may reuse an existing training sequence associated with wireless communications on carrier frequencies below 7 GHz (such as an LTF sequence associated with the 11ac PPDU format or the 11be PPDU format). For example, the training sequence may be mapped to each of the (234) data plus (8) pilots subcarriers associated with the 256-subcarrier tone plan. In some implementations, the PHY preamble 1401 may include one or more additional LTFs (following the SIG field) when the PPDU 1400 is transmitted over multiple spatial streams ($N_{SS}>1$). In some other implementations, a P-matrix may be applied directly to the first LTF (preceding the SIG field) to produce two non-identical OFDM symbols. In such implementations, the PHY preamble 1401 may include one or more additional LTFs (following the SIG field) only when the PPDU 1400 is transmitted over more than two spatial streams ($N_{SS}>2$).

The SIG field may carry any information needed to demodulate the PPDU 1400. Example demodulation information may include an indication of bandwidth, length, MCS, $N_{SS}$, BSS color, padding, PE ambiguity, or LDPC extra symbol, among other examples. In some implementations, the SIG field also may carry beam management information indicating whether the PPDU 1400 is associated with a beamforming training operation or various parameters associated with the beamforming training operation. Example beam management information may include a PPDU type, a training direction, a beam tracking request, a training length, a countdown, a sector ID, an antenna ID, a best antenna ID, a best sector ID, a number of RX sectors or RX antennas of the transmitting device, or an SNR report, among other examples. Information carried in the SIG field may be modulated on each of the (234) data subcarriers associated with the 256-subcarrier tone plan. Aspects of the present disclosure recognize that 234 data subcarriers can carry 117 bits of information, which may be sufficient to capture the demodulation information and the beam management information. Thus, in some aspects, the SIG field may span 1 OFDM symbol.

Figure 14B:
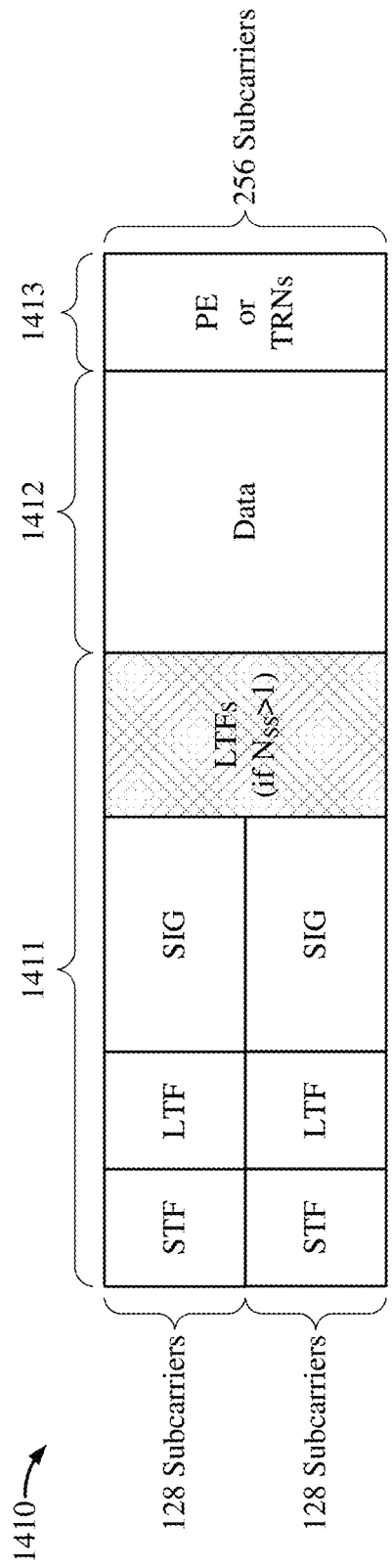
FIG. 14B shows another example PPDU conforming to a green field PPDU format, according to some implementations.

FIG. 14B shows another example PPDU 1410 conforming to a green field PPDU format, according to some implementations. In some implementations, the PPDU 1410 may be a DPHY PPDU that can be used for wireless communications on carrier frequencies above 7 GHz when full beamforming gains are achievable between a transmitting device and a receiving device. The PPDU 1410 includes a PHY preamble 1411 followed by a data portion 1412 and a PE or one or more TRNs 1413. The PHY preamble 1411 includes a short training field (STF), a long training field (LTF), and a signal (SIG) field.

In some implementations, the PHY preamble 1411 may have the same symbol duration as the data portion 1412. In the example of FIG. 14B, the data portion 1412 is mapped to 256 subcarriers associated with a sub-7 GHz tone plan whereas the PHY preamble 1411 is mapped to 128 subcarriers that are duplicated (2×) in the frequency domain across the bandwidth associated with the data portion 1412. As such, the SCS associated with the PHY preamble 1411 is equal to the SCS associated with the data portion 1412. In contrast with the PPDU 1400 of FIG. 14A, the PHY preamble 1411 supports frequency combining at the receiving device, which improves the reliability of the SIG field but also requires more SIG symbols to carry the same amount information (due to fewer data subcarriers). In some aspects, the PPDU 1410 may be up-clocked to a wider bandwidth to achieve an SCS suitable for wireless communications on carrier frequencies above 7 GHz (such as described with reference to FIGS. 9A-13D). In some implementations, the up-clocking may be performed by the OFDM up-clocking system 800 of FIG. 8.

In some aspects, the STF may span 2 OFDM symbols (similar to L-STF in existing PPDU formats). In some implementations, the STF may reuse an existing training sequence associated with wireless communications on carrier frequencies below 7 GHz (such as an STF sequence associated with the 11ac PPDU format or the 11be PPDU format). For example, the training sequence may be mapped to every $4^{th}$, $8^{th}$, or $16^{th}$ data subcarrier associated with the 128-subcarrier tone plan (similar to the periodicity of L-STF in existing PPDU formats). In some implementations, the existing training sequence may be a legacy STF sequence associated with the sub-7 GHz channel bandwidth. For example, when the PPDU 1410 is up-clocked from an 80 MHz sub-7 GHz channel bandwidth, the STF may carry a legacy STF sequence associated with a 40 MHz bandwidth. In some other implementations, the STF may include a Golay sequence to simplify packet detection (such as described with reference to FIG. 11A).

In some aspects, the LTF may span 2 OFDM symbols (similar to L-LTF in existing PPDU formats). In some implementations, the PHY preamble 1411 may include one or more additional LTFs (following the SIG field) to support channel estimation for the data portion 1412. For example, the additional LTFs may be mapped according to the same 256-subcarrier tone plan as the data portion 1412. In some other implementations, the additional LTFs may be included in the PHY preamble 1411 only when the PPDU 1410 is transmitted over multiple spatial streams ($N_{SS}>1$). In some such implementations, non-zero values may be modulated on at least some of the guard subcarriers associated with the 128 subcarriers to which the first LTF (preceding the SIG field) is mapped so that the LTF is populated on the same subcarriers as the data portion 1412 (such as described with reference to FIGS. 11C, 12C, and 13C). In some other such implementations, the first LTF may be directly mapped to the same data subcarriers as the data portion 1412 (such as described with reference to FIGS. 11D, 12D, and 13D). Still further, in some other implementations, a P-matrix may be applied directly to the first LTF to produce two non-identical OFDM symbols. In such implementations, the additional LTFs may be included in the PHY preamble 1411 only when the PPDU 1410 is transmitted over more than two spatial streams ($N_{SS}>2$).

The SIG field may carry any information needed to demodulate the PPDU 1410. Example demodulation information may include an indication of bandwidth, length, MCS, $N_{SS}$, BSS color, padding, PE ambiguity, or LDPC extra symbol, among other examples. In some implementations, the SIG field also may carry beam management information indicating whether the PPDU 1410 is associated with a beamforming training operation or various parameters associated with the beamforming training operation. Example beam management information may include a PPDU type, a training direction, a beam tracking request, a training length, a countdown, a sector ID, an antenna ID, a best antenna ID, a best sector ID, a number of RX sectors or RX antennas of the transmitting device, or an SNR report, among other examples. Information carried in the SIG field may be modulated on each of the (108) data subcarriers associated with the 128-subcarrier tone plan. Aspects of the present disclosure recognize that 108 data subcarriers can carry 54 bits of information, which may not be sufficient to capture the demodulation information and the beam management information. Thus, in some aspects, the SIG field may span 2 OFDM symbols.

Figure 14C:
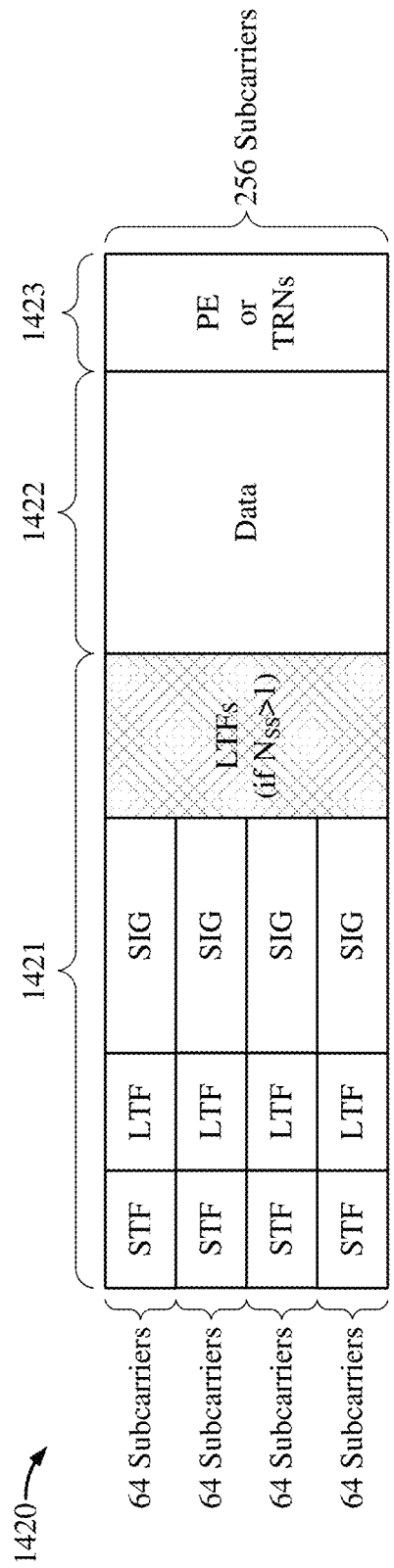
FIG. 14C shows another example PPDU conforming to a green field PPDU format, according to some implementations.

FIG. 14C shows another example PPDU 1420 conforming to a green field PPDU format, according to some implementations. In some implementations, the PPDU 1420 may be a DPHY PPDU that can be used for wireless communications on carrier frequencies above 7 GHz when full beamforming gains are achievable between a transmitting device and a receiving device. The PPDU 1420 includes a PHY preamble 1421 followed by a data portion 1422 and a PE or one or more TRNs 1423. The PHY preamble 1421 includes a short training field (STF), a long training field (LTF), and a signal (SIG) field.

In some implementations, the PHY preamble 1421 may have the same symbol duration as the data portion 1422. In the example of FIG. 14C, the data portion 1422 is mapped to 256 subcarriers associated with a sub-7 GHz tone plan whereas the PHY preamble 1421 is mapped to 64 subcarriers that are duplicated (4×) in the frequency domain across the bandwidth associated with the data portion 1422. As such, the SCS associated with the PHY preamble 1421 is equal to the SCS associated with the data portion 1422. In contrast with the PPDU 1410 of FIG. 14B, the PHY preamble 1421 supports greater frequency combining at the receiving device, which further improves the reliability of the SIG field but requires even more SIG symbols to carry the same amount information (due to fewer data subcarriers). In some aspects, the PPDU 1420 may be up-clocked to a wider bandwidth to achieve an SCS suitable for wireless communications on carrier frequencies above 7 GHz (such as described with reference to FIGS. 9A-13D). In some implementations, the up-clocking may be performed by the OFDM up-clocking system 800 of FIG. 8.

In some aspects, the STF may span 2 OFDM symbols (similar to L-STF in existing PPDU formats). In some implementations, the STF may reuse an existing training sequence associated with wireless communications on carrier frequencies below 7 GHz (such as an STF sequence associated with the 11ac PPDU format or the 11be PPDU format). For example, the training sequence may be mapped to every $4^{th}$, $8^{th}$, or $16^{th}$ data subcarrier associated with the 64-subcarrier tone plan (similar to the periodicity of L-STF in existing PPDU formats). In some implementations, the existing training sequence may be a legacy STF sequence associated with the sub-7 GHz channel bandwidth. For example, when the PPDU 1420 is up-clocked from an 80 MHz sub-7 GHz channel bandwidth, the STF may carry a legacy STF sequence associated with a 20 MHz bandwidth. In some other implementations, the STF may include a Golay sequence to simplify packet detection (such as described with reference to FIG. 11A).

In some aspects, the LTF may span 2 OFDM symbols (similar to L-LTF in existing PPDU formats). In some implementations, the PHY preamble 1421 may include one or more additional LTFs (following the SIG field) to support channel estimation for the data portion 1422. For example, the additional LTFs may be mapped according to the same 256-subcarrier tone plan as the data portion 1422. In some other implementations, the additional LTFs may be included in the PHY preamble 1421 only when the PPDU 1420 is transmitted over multiple spatial streams ($N_{SS}>1$). In some such implementations, non-zero values may be modulated on at least some of the guard subcarriers associated with the 64 subcarriers to which the first LTF (preceding the SIG field) is mapped so that the LTF is populated on the same subcarriers as the data portion 1422 (such as described with reference to FIGS. 11C, 12C, and 13C). In some other such implementations, the first LTF may be directly mapped to the same data subcarriers as the data portion 1422 (such as described with reference to FIGS. 11D, 12D, and 13D). Still further, in some other implementations, a P-matrix may be applied directly to the first LTF to produce two non-identical OFDM symbols. In such implementations, the additional LTFs may be included in the PHY preamble 1421 only when the PPDU 1420 is transmitted over more than two spatial streams ($N_{SS}>2$).

The SIG field may carry any information needed to demodulate the PPDU 1420. Example demodulation information may include an indication of bandwidth, length, MCS, $N_{SS}$, BSS color, padding, PE ambiguity, or LDPC extra symbol, among other examples. In some implementations, the SIG field also may carry beam management information indicating whether the PPDU 1420 is associated with a beamforming training operation or various parameters associated with the beamforming training operation. Example beam management information may include a PPDU type, a training direction, a beam tracking request, a training length, a countdown, a sector ID, an antenna ID, a best antenna ID, a best sector ID, a number of RX sectors or RX antennas of the transmitting device, or an SNR report, among other examples. Information carried in the SIG field may be modulated on each of the (48) data subcarriers associated with the 64-subcarrier tone plan. Aspects of the present disclosure recognize that 48 data subcarriers can carry 24 bits of information, which may not be sufficient to capture the demodulation information and the beam management information. Thus, in some aspects, the SIG field may span 3 or 4 OFDM symbols.

Figure 15A:
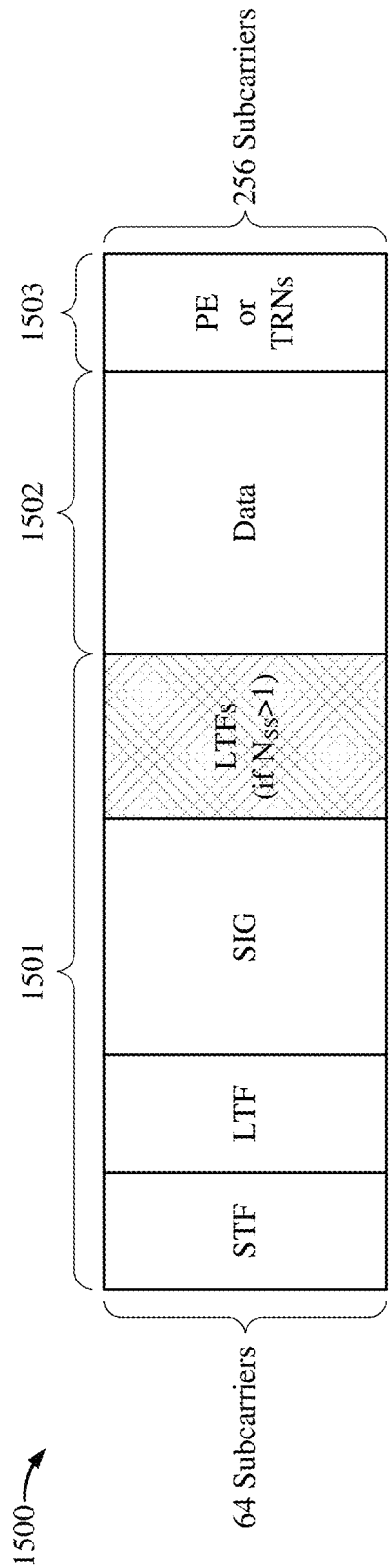
FIG. 15A shows an example PPDU conforming to a green field PPDU format, according to some implementations.

FIG. 15A shows an example PPDU 1500 conforming to a green field PPDU format, according to some implementations. In some implementations, the PPDU 1500 may be a DPHY PPDU that can be used for wireless communications on carrier frequencies above 7 GHz when full beamforming gains are achievable between a transmitting device and a receiving device. The PPDU 1500 includes a PHY preamble 1501 followed by a data portion 1502 and a PE or one or more TRNs 1503. The PHY preamble 1501 includes a short training field (STF), a long training field (LTF), and a signal (SIG) field.

In some implementations, the PHY preamble 1501 may have a shorter symbol duration than the data portion 1502. In the example of FIG. 15A, the data portion 1502 is mapped to 256 subcarriers associated with a sub-7 GHz tone plan whereas the PHY preamble 1501 is mapped to 64 subcarriers spanning the bandwidth associated with the data portion 1502. As such, the SCS associated with the PHY preamble 1501 is 4× larger than the SCS associated with the data portion 1502 (resulting in a 4× shorter symbol duration). Compared to the PPDU 1400 of FIG. 14A, the PHY preamble 1501 may be shorter than the PHY preamble 1401 but also may require more SIG symbols to carry the same amount of information (due to fewer data subcarriers). In some aspects, the PPDU 1500 may be up-clocked to a wider bandwidth to achieve an SCS suitable for wireless communications on carrier frequencies above 7 GHz (such as described with reference to FIGS. 9A-13D). In some implementations, the up-clocking may be performed by the OFDM up-clocking system 800 of FIG. 8.

In some aspects, the STF may span 2 OFDM symbols (similar to L-STF in existing PPDU formats) or longer for AGC gain settling. In some implementations, the STF may reuse an existing training sequence associated with wireless communications on carrier frequencies below 7 GHz (such as an STF sequence associated with the 11ac PPDU format or the 11be PPDU format). For example, the training sequence may be mapped to every $4^{th}$, $8^{th}$, or $16^{th}$ data subcarrier associated with the 64-subcarrier tone plan (similar to the periodicity of L-STF in existing PPDU formats). In some implementations, the existing training sequence may be a TB STF sequence associated with the up-clocked PPDU bandwidth. For example, when the PPDU 1500 is up-clocked 16× from a 20 MHz sub-7 GHz channel bandwidth, the STF may carry a TB STF sequence associated with a 320 MHz bandwidth. In some other implementations, the STF may include a Golay sequence to simplify packet detection (such as described with reference to FIG. 11A).

In some aspects, the LTF may span 2 OFDM symbols (similar to L-LTF in existing PPDU formats). In some implementations, the PHY preamble 1501 may include one or more additional LTFs (following the SIG field) to support channel estimation for the data portion 1502. For example, the additional LTFs may be mapped according to the same 256-subcarrier tone plan as the data portion 1502. In some other implementations, the additional LTFs may be included in the PHY preamble 1501 only when the PPDU 1500 is transmitted over multiple spatial streams ($N_{SS}$>1). In such implementations, the first LTF (preceding the SIG field) may be mapped to the same data subcarriers (according to the same 256-subcarrier tone plan) as the data portion 1502 (such as described with reference to FIGS. 11D, 12D, and 13D). Still further, in some implementations, a P-matrix may be applied directly to the first LTF to produce two non-identical OFDM symbols. In such implementations, the additional LTFs may be included in the PHY preamble 1501 only when the PPDU 1500 is transmitted over more than two spatial streams ($N_{SS}$>2).

The SIG field may carry any information needed to demodulate the PPDU 1500. Example demodulation information may include an indication of bandwidth, length, MCS, $N_{SS}$, BSS color, padding, PE ambiguity, or LDPC extra symbol, among other examples. In some implementations, the SIG field also may carry beam management information indicating whether the PPDU 1500 is associated with a beamforming training operation or various parameters associated with the beamforming training operation. Example beam management information may include a PPDU type, a training direction, a beam tracking request, a training length, a countdown, a sector ID, an antenna ID, a best antenna ID, a best sector ID, a number of RX sectors or RX antennas of the transmitting device, or an SNR report, among other examples. Information carried in the SIG field may be modulated on each of the (48) data subcarriers associated with the 64-subcarrier tone plan. Aspects of the present disclosure recognize that 48 data subcarriers can carry 24 bits of information, which may not be sufficient to capture the demodulation information and the beam management information. Thus, in some aspects, the SIG field may span 3 or 4 OFDM symbols.

Figure 15B:
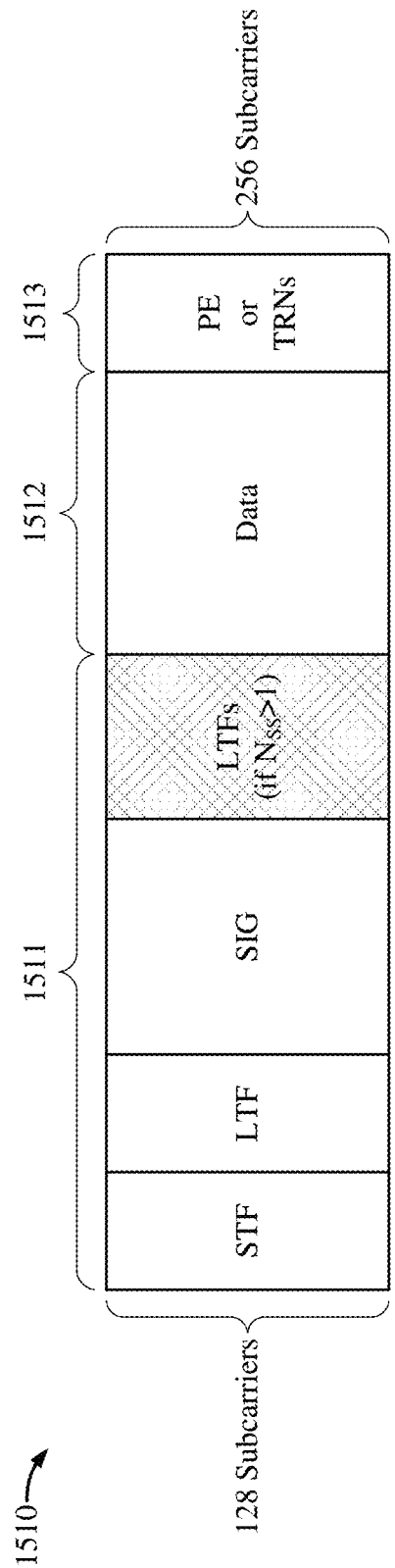
FIG. 15B shows another example PPDU conforming to a green field PPDU format, according to some implementations.

FIG. 15B shows another example PPDU 1510 conforming to a green field PPDU format, according to some implementations. In some implementations, the PPDU 1510 may be a DPHY PPDU that can be used for wireless communications on carrier frequencies above 7 GHz when full beamforming gains are achievable between a transmitting device and a receiving device. The PPDU 1510 includes a PHY preamble 1511 followed by a data portion 1512 and a PE or one or more TRNs 1513. The PHY preamble 1511 includes a short training field (STF), a long training field (LTF), and a signal (SIG) field.

In some implementations, the PHY preamble 1511 may have a shorter symbol duration than the data portion 1512. In the example of FIG. 15B, the data portion 1512 is mapped to 256 subcarriers associated with a sub-7 GHz tone plan whereas the PHY preamble 1511 is mapped to 128 subcarriers spanning the bandwidth associated with the data portion 1512. As such, the SCS associated with the PHY preamble 1511 is 2× larger than the SCS associated with the data portion 1512 (resulting in a 2× shorter symbol duration). Compared to the PPDU 1500 of FIG. 15A, the PHY preamble 1511 may be longer than the PHY preamble 1501 but shorter than the data portion and also may require fewer SIG symbols than the PHY preamble 1501 to carry the same amount of information (due to more data subcarriers). In some aspects, the PPDU 1510 may be up-clocked to a wider bandwidth to achieve an SCS suitable for wireless communications on carrier frequencies above 7 GHz (such as described with reference to FIGS. 9A-13D). In some implementations, the up-clocking may be performed by the OFDM up-clocking system 800 of FIG. 8.

In some aspects, the STF may span 2 OFDM symbols (similar to L-STF in existing PPDU formats) or longer for AGC gain settling. In some implementations, the STF may reuse an existing training sequence associated with wireless communications on carrier frequencies below 7 GHz (such as an STF sequence associated with the 11ac PPDU format or the 11be PPDU format). For example, the training sequence may be mapped to every $4^{th}$, $8^{th}$, or $16^{th}$ data subcarrier associated with the 128-subcarrier tone plan (similar to the periodicity of L-STF in existing PPDU formats). In some implementations, the existing training sequence may be a TB STF sequence associated with the up-clocked PPDU bandwidth. For example, when the PPDU 1510 is up-clocked 16× from a 20 MHz sub-7 GHz channel bandwidth, the STF may carry a TB STF sequence associated with a 320 MHz bandwidth. In some other implementations, the STF may include a Golay sequence to simplify packet detection (such as described with reference to FIG. 11A).

In some aspects, the LTF may span 2 OFDM symbols (similar to L-LTF in existing PPDU formats). In some implementations, the PHY preamble 1511 may include one or more additional LTFs (following the SIG field) to support channel estimation for the data portion 1512. For example, the additional LTFs may be mapped according to the same 256-subcarrier tone plan as the data portion 1512. In some other implementations, the additional LTFs may be included in the PHY preamble 1511 only when the PPDU 1510 is transmitted over multiple spatial streams ($N_{SS}$>1). In such implementations, the first LTF (preceding the SIG field) may be mapped to the same data subcarriers (according to the same 256-subcarrier tone plan) as the data portion 1512 (such as described with reference to FIGS. 11D, 12D, and 13D). Still further, in some implementations, a P-matrix may be applied directly to the first LTF to produce two non-identical OFDM symbols. In such implementations, the additional LTFs may be included in the PHY preamble 1511 only when the PPDU 1510 is transmitted over more than two spatial streams ($N_{SS}$>2).

The SIG field may carry any information needed to demodulate the PPDU 1510. Example demodulation information may include an indication of bandwidth, length, MCS, $N_{SS}$, BSS color, padding, PE ambiguity, or LDPC extra symbol, among other examples. In some implementations, the SIG field also may carry beam management information indicating whether the PPDU 1510 is associated with a beamforming training operation or various parameters associated with the beamforming training operation. Example beam management information may include a PPDU type, a training direction, a beam tracking request, a training length, a countdown, a sector ID, an antenna ID, a best antenna ID, a best sector ID, a number of RX sectors or RX antennas of the transmitting device, or an SNR report, among other examples. Information carried in the SIG field may be modulated on each of the (108) data subcarriers associated with the 128-subcarrier tone plan. Aspects of the present disclosure recognize that 108 data subcarriers can carry 54 bits of information, which may not be sufficient to capture the demodulation information and the beam management information. Thus, in some aspects, the SIG field may span 2 OFDM symbols.

Figure 15C:
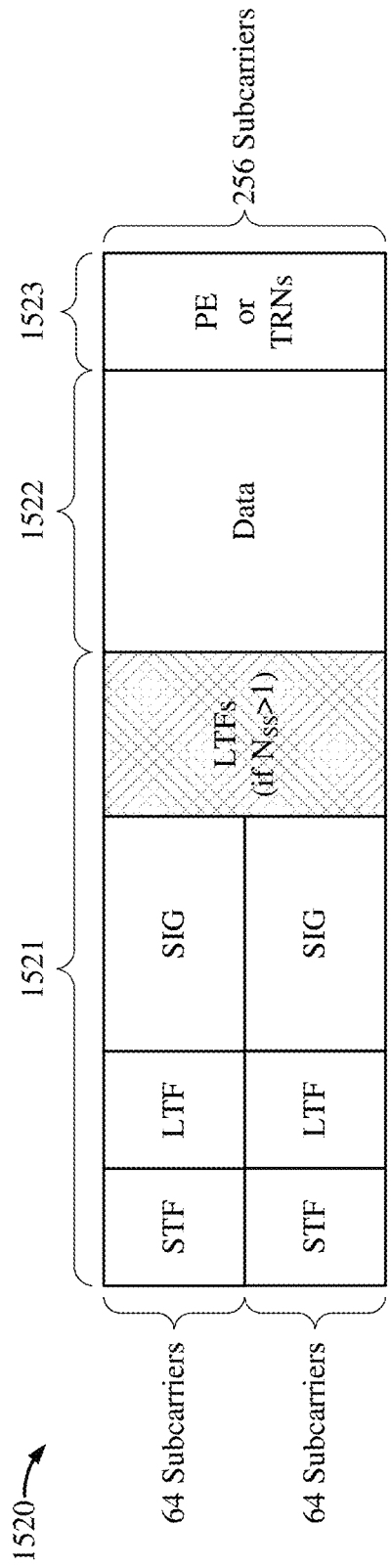
FIG. 15C shows another example PPDU conforming to a green field PPDU format, according to some implementations.

FIG. 15C shows another example PPDU 1520 conforming to a green field PPDU format, according to some implementations. In some implementations, the PPDU 1520 may be a DPHY PPDU that can be used for wireless communications on carrier frequencies above 7 GHz when full beamforming gains are achievable between a transmitting device and a receiving device. The PPDU 1520 includes a PHY preamble 1521 followed by a data portion 1522 and a PE or one or more TRNs 1523. The PHY preamble 1521 includes a short training field (STF), a long training field (LTF), and a signal (SIG) field.

In some implementations, the PHY preamble 1521 may have a shorter symbol duration than the data portion 1522. In the example of FIG. 15B, the data portion 1522 is mapped to 256 subcarriers associated with a sub-7 GHz tone plan whereas the PHY preamble 1521 is mapped to 64 subcarriers that are duplicated (2×) in the frequency domain across the bandwidth associated with the data portion 1522. As such, the SCS associated with the PHY preamble 1521 is 2× larger (and has a 2× shorter symbol duration) than the SCS associated with the data portion 1522. In contrast with the PPDU 1510 of FIG. 15B, the PHY preamble 1521 supports greater frequency combining at the receiving device, which further improves the reliability of the SIG field but requires even more SIG symbols to carry the same amount of information (due to fewer data subcarriers). In some aspects, the PPDU 1520 may be up-clocked to a wider bandwidth to achieve an SCS suitable for wireless communications on carrier frequencies above 7 GHz (such as described with reference to FIGS. 9A-13D). In some implementations, the up-clocking may be performed by the OFDM up-clocking system 800 of FIG. 8.

In some aspects, the STF may span 2 OFDM symbols (similar to L-STF in existing PPDU formats) or longer for AGC gain settling. In some implementations, the STF may reuse an existing training sequence associated with wireless communications on carrier frequencies below 7 GHz (such as an STF sequence associated with the 11ac PPDU format or the 11be PPDU format). For example, the training sequence may be mapped to every $4^{th}$, $8^{th}$, or $16^{th}$ data subcarrier associated with the 64-subcarrier tone plan (similar to the periodicity of L-STF in existing PPDU formats). In some implementations, the existing training sequence may be a legacy STF sequence associated with the sub-7 GHz channel bandwidth. For example, when the PPDU 1420 is up-clocked from a 20 MHz sub-7 GHz channel bandwidth, the STF may carry a legacy STF sequence associated with a 20 MHz bandwidth. In some other implementations, the STF may include a Golay sequence to simplify packet detection (such as described with reference to FIG. 11A).

In some aspects, the LTF may span 2 OFDM symbols (similar to L-LTF in existing PPDU formats). In some implementations, the PHY preamble 1521 may include one or more additional LTFs (following the SIG field) to support channel estimation for the data portion 1522. For example, the additional LTFs may be mapped according to the same 256-subcarrier tone plan as the data portion 1522. In some other implementations, the additional LTFs may be included in the PHY preamble 1521 only when the PPDU 1520 is transmitted over multiple spatial streams ($N_{SS}$>1). In such implementations, the first LTF (preceding the SIG field) may be mapped to the same data subcarriers (according to the same 256-subcarrier tone plan) as the data portion 1522 (such as described with reference to FIGS. 11D, 12D, and 13D). Still further, in some implementations, a P-matrix may be applied directly to the first LTF to produce two non-identical OFDM symbols. In such implementations, the additional LTFs may be included in the PHY preamble 1521 only when the PPDU 1520 is transmitted over more than two spatial streams ($N_{SS}$>2).

The SIG field may carry any information needed to demodulate the PPDU 1520. Example demodulation information may include an indication of bandwidth, length, MCS, $N_{SS}$, BSS color, padding, PE ambiguity, or LDPC extra symbol, among other examples. In some implementations, the SIG field also may carry beam management information indicating whether the PPDU 1520 is associated with a beamforming training operation or various parameters associated with the beamforming training operation. Example beam management information may include a PPDU type, a training direction, a beam tracking request, a training length, a countdown, a sector ID, an antenna ID, a best antenna ID, a best sector ID, a number of RX sectors or RX antennas of the transmitting device, or an SNR report, among other examples. Information carried in the SIG field may be modulated on each of the (48) data subcarriers associated with the 64-subcarrier tone plan. Aspects of the present disclosure recognize that 48 data subcarriers can carry 24 bits of information, which may not be sufficient to capture the demodulation information and the beam management information. Thus, in some aspects, the SIG field may span 3 or 4 OFDM symbols.

Aspects of the present disclosure recognize that the CPHY PPDU format of FIG. 9B and the DPHY PPDU format of FIG. 14C can be implemented using the same processing and up-clocking resources. For example, the PHY preambles 911 and 1421 each include a single SIG field and have the same SCS and frequency repetition. As such, the CPHY PPDU format of FIG. 9B and the DPHY PPDU format of FIG. 14C may collectively represent a harmonized green field PPDU format. In some implementations, the SIG field of the PHY preamble 1421 may be repeated in the time domain or include additional OFDM symbols (such as described with reference to FIGS. 9C and 9D). In some aspects, the harmonized PPDU format may include signaling to indicate whether the PPDU conforms to a CPHY PPDU format or a DPHY PPDU format.

In some implementations, the PPDU format (CPHY or DPHY) may be signaled by the value of a length field (L_LEN) in the SIG field (or L-SIG). For example, the PPDU may conform to either the DPHY PPDU format or the CPHY PPDU format depending on whether L_LEN % 3=0. In some other implementations, the PPDU format (CPHY or DPHY) may be signaled by the modulation scheme associated with one of the SIG fields (or SIG symbols). For example, the second OFDM symbol of the SIG field may be modulated according to either a BPSK modulation scheme or a QBPSK modulation scheme to indicate whether the PPDU conforms to the DPHY PPDU format or the CPHY PPDU format.

Figure 16:
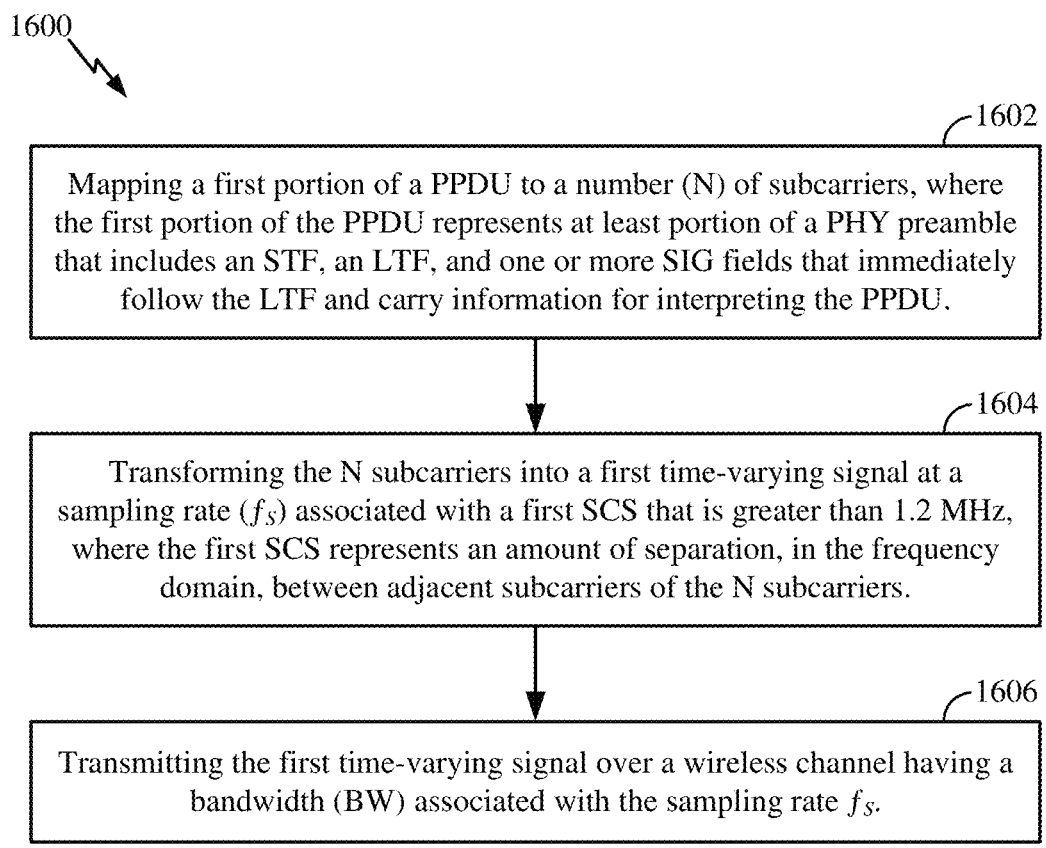
FIG. 16 shows a flowchart illustrating an example process for wireless communication that supports 60 GHz PPDU formats.

FIG. 16 shows a flowchart illustrating an example process 1600 for wireless communication that supports 60 GHz PPDU formats. In some implementations, the process 1600 may be performed by a wireless communication device operating as or within an AP, such as any one of the APs 102 or 502 described above with reference to FIGS. 1 and 5A, respectively. In some other implementations, the process 1600 may be performed by a wireless communication device operating as or within a STA, such as any one of the STAs 104 or 504 described above with reference to FIGS. 1 and 5B, respectively.

In some implementations, the process 1600 begins in block 1602 with mapping a first portion of a PPDU to a number (N) of subcarriers, where the first portion of the PPDU represents at least portion of a PHY preamble that includes an STF, an LTF, and one or more SIG fields that immediately follow the LTF and carry information for interpreting the PPDU. In block 1604, the process 1600 proceeds with transforming the N subcarriers into a first time-varying signal at a sampling rate ($f_s$) associated with a first SCS that is greater than 1.2 MHz, where the first SCS represents an amount of separation, in the frequency domain, between adjacent subcarriers of the N subcarriers. In block 1606, the process 1600 proceeds with transmitting the first time-varying signal over a wireless channel having a bandwidth (BW) associated with the sampling rate $f_s$.

In some aspects, the PPDU may conform to a PPDU format associated with wireless communications on a carrier frequency below 7 GHz. In some implementations, the one or more SIG fields may include an L-SIG and a non-legacy SIG field immediately following L-SIG. In some other implementations, the one or more SIG fields may include an L-SIG, an RL-SIG immediately following L-SIG, and a non-legacy SIG field immediately following RL-SIG. In some implementations, the STF and the non-legacy SIG field may each consist of two OFDM symbols. In some other implementations, the STF may consist of two OFDM symbols that are repeated in time and the non-legacy SIG field may consist of four OFDM symbols.

In some aspects, the PPDU may consist of only the first portion. In some other aspects, the process 1600 may further include mapping, to a number (M) of subcarriers, a second portion of the PPDU including at least a data field, a packet extension, or one or more TRNs; transforming the M subcarriers into a second time-varying signal at the sampling rate $f_s$; and transmitting the second time-varying signal over the wireless channel immediately following the first time-varying signal. In some implementations, the one or more SIG fields may consist of a single SIG field that is immediately followed by the data field, the packet extension, or the one or more TRNs. In some implementations, the second portion of the PPDU may further include one or more additional LTFs. In some implementations, the one or more SIG fields may consist of a single SIG field that is immediately followed by the one or more additional LTFs.

In some implementations, M may be equal to N and BW may be equal to $f_s$. In some other implementations, M may be equal to N and the PPDU may be duplicated for transmission on a number (m) of sub-bands each spanning a respective bandwidth portion equal to BW/m, where BW is equal to $m*f_s$. Still further, in some implementations, M may be greater than N. In some implementations, the first portion of the PPDU may be duplicated for transmission on a number (n) of sub-bands each spanning a respective bandwidth portion equal to BW/n, where BW is equal to $f_s$. In some implementations, the transformation of the M subcarriers into the second time-varying signal may result in a second SCS equal to the first SCS, where the second SCS represents an amount of separation, in the frequency domain, between adjacent subcarriers of the M subcarriers. In some other implementations, the transformation of the M subcarriers into the second time-varying signal may result in a second SCS different than the first SCS, where the second SCS represents an amount of separation, in the frequency domain, between adjacent subcarriers of the M subcarriers.

In some implementations, the LTF may be transmitted on the same subcarriers as the second portion of the PPDU as a result of duplicating the first portion of the PPDU for transmission on the n sub-bands. In some implementations, the LTF may include a first OFDM symbol and a second OFDM symbol identical to the first OFDM symbol. In some other implementations, the LTF may include a first OFDM symbol and a second OFDM symbol, where the process 1600 further includes applying a P-matrix to the LTF so that the first OFDM symbol is different than the second OFDM symbol. In some implementations, the STF may include a Golay sequence. In some implementations, the information carried in the one or more SIG fields may include an indication of whether the PPDU is associated with a beamforming training operation.

Figure 17:
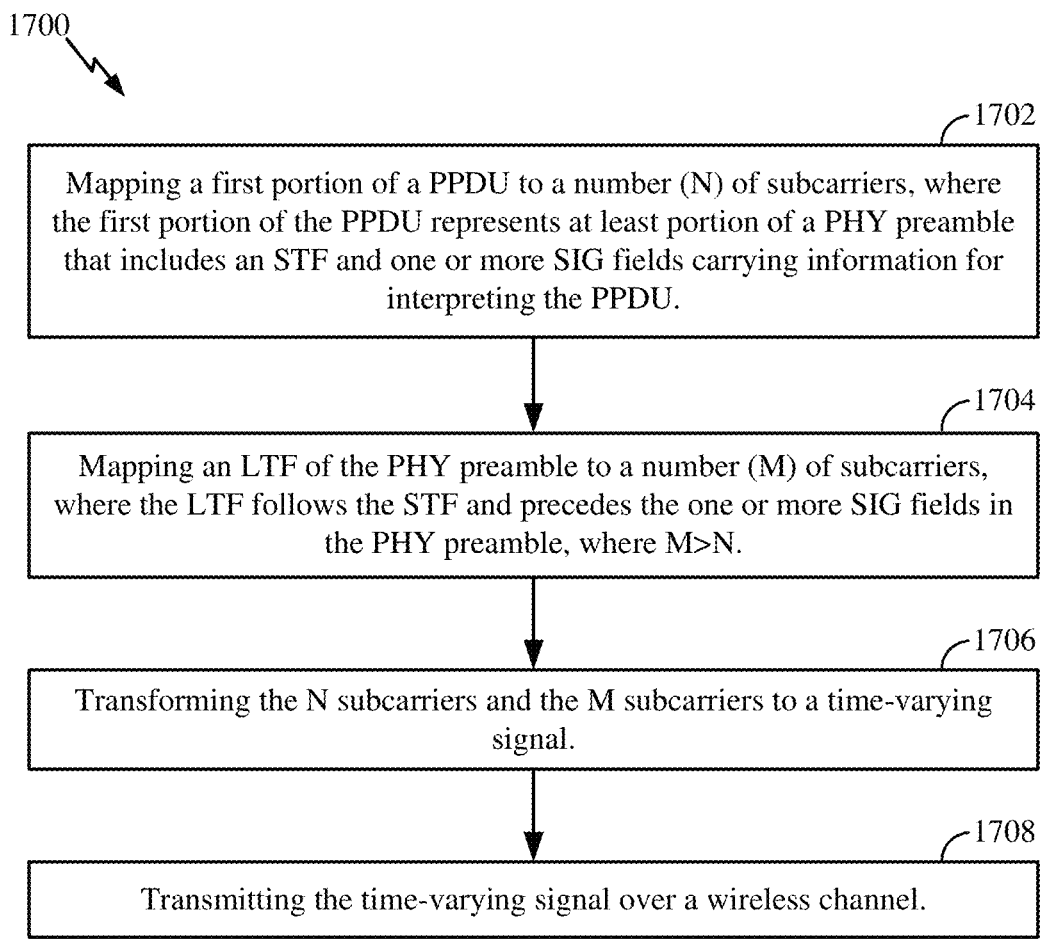
FIG. 17 shows a flowchart illustrating an example process for wireless communication that supports 60 GHz PPDU formats.

FIG. 17 shows a flowchart illustrating an example process for wireless communication that supports 60 GHz PPDU formats. In some implementations, the process 1700 may be performed by a wireless communication device operating as or within an AP, such as any one of the APs 102 or 502 described above with reference to FIGS. 1 and 5A, respectively. In some other implementations, the process 1700 may be performed by a wireless communication device operating as or within a STA, such as any one of the STAs 104 or 504 described above with reference to FIGS. 1 and 5B, respectively.

In some implementations, the process 1700 begins in block 1702 with mapping a first portion of a PPDU to a number (N) of subcarriers, where the first portion of the PPDU represents at least portion of a PHY preamble that includes an STF and one or more SIG fields carrying information for interpreting the PPDU. In block 1704, the process 1700 proceeds with mapping an LTF of the PHY preamble to a number (M) of subcarriers, where the LTF follows the STF and precedes the one or more SIG fields in the PHY preamble, where M>N. In block 1706, the process 1700 proceeds with transforming the N subcarriers and the M subcarriers to a time-varying signal. In block 1708, the process 1700 proceeds with transmitting the time-varying signal over a wireless channel.

In some implementations, the process 1700 may further include mapping, to the M subcarriers, a second portion of the PPDU including at least a data field, a packet extension, or one or more TRNs. In some implementations, the N subcarriers and the M subcarriers may be transformed to the time-varying signal at a sampling rate ($f_s$) associated with an SCS greater than 1.2 MHz, where the SCS represents an amount of separation, in the frequency domain, between adjacent subcarriers of the N subcarriers. In some implementations, the first portion of the PPDU may be duplicated for transmission on a number (n) of sub-bands each spanning a respective bandwidth portion equal to BW/n.

Figure 18:
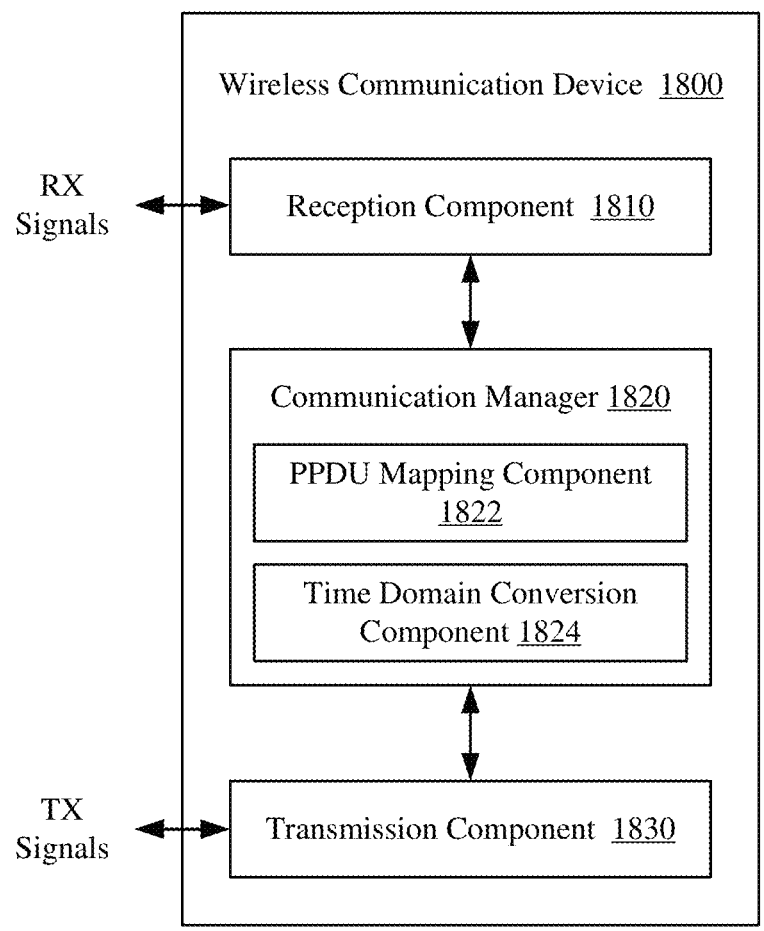
FIG. 18 shows a block diagram of an example wireless communication device according to some implementations.

FIG. 18 shows a block diagram of an example wireless communication device 1800 according to some implementations. In some implementations, the wireless communication device 1800 is configured to perform the process 1600 described with reference to FIG. 16. The wireless communication device 1800 can be an example implementation of the wireless communication device 400 described above with reference to FIG. 4. For example, the wireless communication device 1800 can be a chip, SoC, chipset, package or device that includes at least one processor and at least one modem (for example, a Wi-Fi (IEEE 802.11) modem or a cellular modem).

The wireless communication device 1800 includes a reception component 1810, a communication manager 1820, and a transmission component 1830. The communication manager 1820 further includes a PPDU mapping component 1822 and a time domain conversion component 1824. Portions of one or more of the components 1822 and 1824 may be implemented at least in part in hardware or firmware. In some implementations, at least some of the components 1822 or 1824 are implemented at least in part as software stored in a memory (such as the memory 408). For example, portions of one or more of the components 1822 and 1824 can be implemented as non-transitory instructions (or "code") executable by a processor (such as the processor 406) to perform the functions or operations of the respective component.

The reception component 1810 is configured to receive RX signals, over a wireless channel, from one or more other wireless communication devices. The communication manager 1820 is configured to control or manage communications with one or more other wireless communication devices. In some implementations, the PPDU mapping component 1822 may map a first portion of a PPDU to a number (N) of subcarriers, where the first portion of the PPDU represents at least portion of a PHY preamble that includes a short training field (STF), a long training field (LTF), and one or more signal (SIG) fields that immediately follow the LTF and carry information for interpreting the PPDU; and the time domain conversion component 1824 may transform the N subcarriers into a time-varying signal at a sampling rate ($f_s$) associated with a subcarrier spacing (SCS) that is greater than 1.2 MHz, where the SCS represents an amount of separation, in the frequency domain, between adjacent subcarriers of the N subcarriers. The transmission component 1830 is configured to transmit TX signals, over a wireless channel, to one or more other wireless communication devices. In some implementations, the transmission component 1930 may transmit the first time-varying signal over a wireless channel having a bandwidth (BW) associated with the sampling rate $f_s$.

Figure 19:
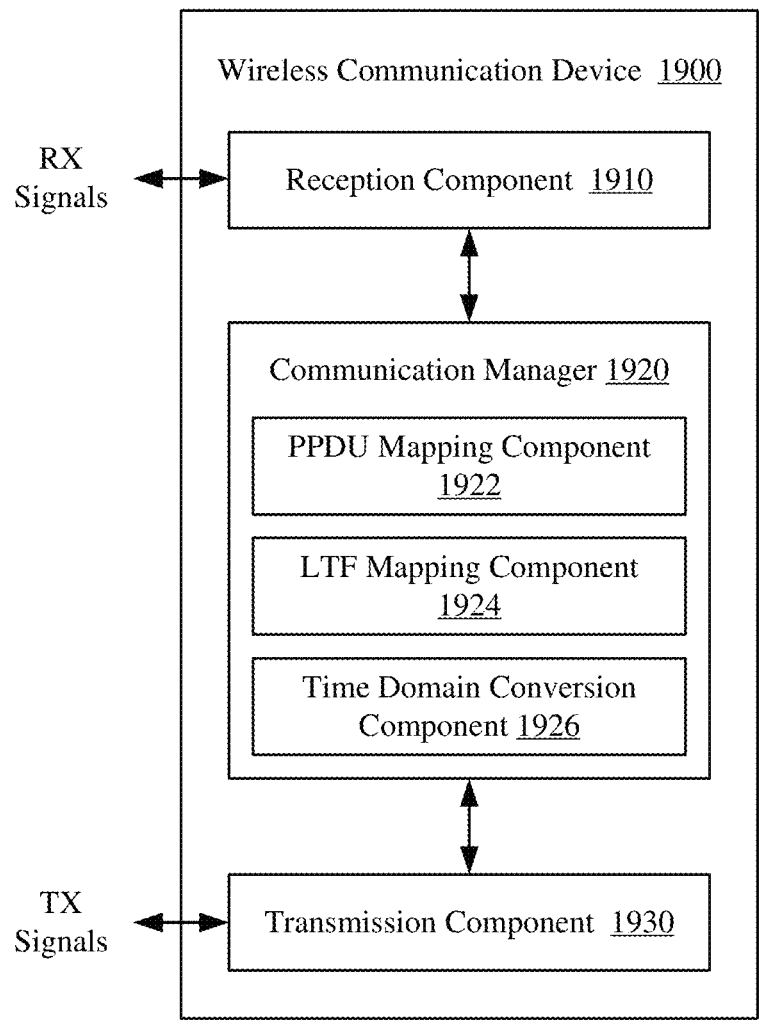
FIG. 19 shows a block diagram of an example wireless communication device according to some implementations.

FIG. 19 shows a block diagram of an example wireless communication device 1900 according to some implementations. In some implementations, the wireless communication device 1900 is configured to perform the process 1700 described with reference to FIG. 17. The wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 further includes a PPDU mapping component 1922, an LTF mapping component 1924, and a time domain conversion component 1926. Portions of one or more of the components 1922, 1924, and 1926 may be implemented at least in part in hardware or firmware. In some implementations, at least some of the components 1922, 1924, or 1926 are implemented at least in part as software stored in a memory (such as the memory 408). For example, portions of one or more of the components 1922, 1924, and 1926 can be implemented as non-transitory instructions (or "code") executable by a processor (such as the processor 406) to perform the functions or operations of the respective component.

The reception component 1910 is configured to receive RX signals, over a wireless channel, from one or more other wireless communication devices. The communication manager 1920 is configured to control or manage communications with one or more other wireless communication devices. In some implementations, the PPDU mapping component 1922 may map a first portion of a PPDU to a number (N) of subcarriers, where the first portion of the PPDU represents at least portion of a PHY preamble that includes a short training field (STF) and one or more signal (SIG) fields carrying information for interpreting the PPDU; the LTF mapping component 1924 may map a long training field (LTF) of the PHY preamble to a number (M) of subcarriers, where the LTF follows the STF and precedes the one or more SIG fields in the PHY preamble, where M>N; and the time domain conversion component 1924 may transform the N subcarriers and the M subcarriers to a time-varying signal. The transmission component 1930 is configured to transmit TX signals, over a wireless channel, to one or more other wireless communication devices. In some implementations, the transmission component 1930 may transmit the time-varying signal over a wireless channel.

Implementation examples are described in the following numbered clauses:

1. A method for wireless communication by a wireless communication device, including:
   mapping a first portion of a physical layer (PHY) convergence protocol (PLCP) protocol data unit (PPDU) to a number (N) of subcarriers, the first portion of the PPDU representing at least portion of a PHY preamble that includes a short training field (STF), a long training field (LTF), and one or more signal (SIG) fields that immediately follow the LTF and carry information for interpreting the PPDU;
   transforming the N subcarriers into a first time-varying signal at a sampling rate ($f_s$) associated with a first subcarrier spacing (SCS) that is greater than 1.2 MHz, the first SCS representing an amount of separation, in the frequency domain, between adjacent subcarriers of the N subcarriers; and
   transmitting the first time-varying signal over a wireless channel having a bandwidth (BW) associated with the sampling rate $f_s$.
2. The method of clause 1, where the first time-varying signal is transmitted on carrier frequency above 7 GHz.
3. The method of any of clauses 1 or 2, where the PPDU conforms to a PPDU format associated with wireless communications on a carrier frequency below 7 GHz.
4. The method of any of clauses 1-3, where the one or more SIG fields include a legacy SIG field (L-SIG) and a non-legacy SIG field immediately following L-SIG.
5. The method of any of clauses 1-3, where the one or more SIG fields include an L-SIG, a repeat of L-SIG (RL-SIG) immediately following L-SIG, and a non-legacy SIG field immediately following RL-SIG.

6. The method of any of clauses 1-3 or 5, where the STF and the non-legacy SIG field each consists of two orthogonal frequency-division multiplexing (OFDM) symbols.

7. The method of any of clauses 1-3 or 5, where the STF consists of two OFDM symbols that are repeated in time and the non-legacy SIG field consists of four OFDM symbols.

8. The method of any of clauses 1-7, where the PPDU consists of only the first portion.

9. The method of any of clauses 1-7, further including:
mapping, to a number (M) of subcarriers, a second portion of the PPDU including at least a data field, a packet extension, or one or more training fields (TRNs);
transforming the M subcarriers into a second time-varying signal at the sampling rate $f_s$; and
transmitting the second time-varying signal over the wireless channel immediately following the first time-varying signal.

10. The method of any of clauses 1-7 or 9, where the one or more SIG fields consist of a single SIG field that is immediately followed by the data field, the packet extension, or the one or more TRNs.

11. The method of any of clauses 1-7 or 9, where the second portion of the PPDU further includes one or more additional LTFs.

12. The method of any of clauses 1-7, 9, or 10, where the one or more SIG fields consist of a single SIG field that is immediately followed by the one or more additional LTFs.

13. The method of any of clauses 1-7 or 9-12, where M=N and BW=$f_s$.

14. The method of any of clauses 1-7, 9 or 10, where M=N and the PPDU is duplicated for transmission on a number (m) of sub-bands each spanning a respective bandwidth portion equal to BW/m, where BW=m*$f_s$.

15. The method of any of clauses 1-7 or 9-12, where M>N.

16. The method of any of clauses 1-7, 9-12, or 15, where the first portion of the PPDU is duplicated for transmission on a number (n) of sub-bands each spanning a respective bandwidth portion equal to BW/n, where BW=$f_s$.

17. The method of any of clauses 1-7, 9-12, 15, or 16, where the transformation of the M subcarriers into the second time-varying signal results in a second SCS equal to the first SCS, the second SCS representing an amount of separation, in the frequency domain, between adjacent subcarriers of the M subcarriers.

18. The method of any of clauses 1-7, 9-12, 15, or 16, where the transformation of the M subcarriers into the second time-varying signal results in a second SCS different than the first SCS, the second SCS representing an amount of separation, in the frequency domain, between adjacent subcarriers of the M subcarriers.

19. The method of any of clauses 1-7, 9-12, or 15-18, where the LTF is transmitted on the same subcarriers as the second portion of the PPDU as a result of duplicating the first portion of the PPDU for transmission on the n sub-bands.

20. The method of any of clauses 1-19, where the LTF includes a first OFDM symbol and a second OFDM symbol identical to the first OFDM symbol.

21. The method of any of clauses 1-19, where the LTF includes a first OFDM symbol and a second OFDM symbol, the method further including:

applying a P-matrix to the LTF so that the first OFDM symbol is different than the second OFDM symbol.

22. The method of any of clauses 1-21, where the STF includes a Golay sequence.

23. The method of any of clauses 1-22, where the information carried in the one or more SIG fields includes an indication of whether the PPDU is associated with a beamforming training operation.

24. A wireless communication device including:
at least one memory; and
at least one processor communicatively coupled with the at least one memory, the at least one processor configured to cause the wireless communication device to perform the method of any one or more of clauses 1-23.

25. A method for wireless communication by a wireless communication device, including:
mapping a first portion of a physical layer (PHY) convergence protocol (PLCP) protocol data unit (PPDU) to a number (N) of subcarriers, the first portion of the PPDU representing at least portion of a PHY preamble that includes a short training field (STF) and one or more signal (SIG) fields carrying information for interpreting the PPDU;
mapping a long training field (LTF) of the PHY preamble to a number (M) of subcarriers, the LTF following the STF and preceding the one or more SIG fields in the PHY preamble, where M>N;
transforming the N subcarriers and the M subcarriers to a time-varying signal; and
transmitting the time-varying signal over a wireless channel.

26. The method of clause 25, where the wireless channel is associated with a carrier frequency above 7 GHz.

27. The method of any of clauses 25 or 26, further including: mapping, to the M subcarriers, a second portion of the PPDU including at least a data field, a packet extension, or one or more training fields (TRNs).

28. The method of any of clauses 25-27, where the N subcarriers and the M subcarriers are transformed to the time-varying signal at a sampling rate ($f_s$) associated with a subcarrier spacing (SCS) greater than 1.2 MHz, the SCS representing an amount of separation, in the frequency domain, between adjacent subcarriers of the N subcarriers.

29. The method of any of clauses 25-28, where the first portion of the PPDU is duplicated for transmission on a number (n) of sub-bands each spanning a respective bandwidth portion equal to BW/n.

30. A wireless communication device including:
at least one memory; and
at least one processor communicatively coupled with the at least one memory, the at least one processor configured to cause the wireless communication device to perform the method of any one or more of clauses 25-29.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
   mapping a first portion of a physical layer (PHY) preamble of a PHY protocol data unit (PPDU) to a first number of data subcarriers in accordance with a first sub-7 GHz PPDU tone plan that comprises N subcarriers including the first number of data subcarriers, the first portion including a legacy short training field (L-STF), a legacy long training field (L-LTF), and one or more signal (SIG) fields;
   transforming the N subcarriers into a first time-varying signal using an N-point inverse fast Fourier transform (IFFT) and a sampling rate ($f_s$) that is equal to a bandwidth (BW) associated with transmission of the PPDU on a carrier frequency above 7 GHz such that a first subcarrier spacing (SCS) associated with the first portion of the PHY preamble is greater than 1.2 MHz; and
   transmitting the PPDU including the first time-varying signal on the carrier frequency that is above 7 GHz.

2. The method of claim 1, wherein the first portion of the PHY preamble further includes a non-legacy SIG field immediately following L-SIG.

3. The method of claim 1, wherein the PPDU consists of only the first portion of the PHY preamble.

4. The method of claim 1, further comprising:
   mapping, to a number (M) of subcarriers, a second portion of the PPDU including at least a data field, a packet extension, or one or more training fields (TRNs);
   transforming the M subcarriers into a second time-varying signal at the sampling rate $f_s$; and
   transmitting the second time-varying signal immediately following the first time-varying signal.

5. The method of claim 4, wherein the one or more SIG fields consist of a single SIG field that is immediately followed by the data field, the packet extension, or the one or more TRNs.

6. The method of claim 4, wherein the second portion of the PPDU further includes one or more additional LTFs.

7. The method of claim 6, wherein the one or more SIG fields consist of a single SIG field that is immediately followed by the one or more additional LTFs.

8. The method of claim 4, wherein M>N.

9. The method of claim 8, wherein the first portion of the PPDU is duplicated for transmission on a number (n) of sub-bands each spanning a respective bandwidth portion equal to BW/n, where BW=$f_s$.

10. The method of claim 9, wherein the transformation of the M subcarriers into the second time-varying signal results in a second SCS equal to the first SCS, the second SCS representing an amount of separation, in a frequency domain, between adjacent subcarriers of the M subcarriers.

11. The method of claim 9, wherein the transformation of the M subcarriers into the second time-varying signal results in a second SCS different than the first SCS, the second SCS representing an amount of separation, in a frequency domain, between adjacent subcarriers of the M subcarriers.

12. The method of claim 9, wherein the L-LTF is transmitted on the same subcarriers as the second portion of the PPDU as a result of duplicating the first portion of the PHY preamble of the PPDU for transmission on the n sub-bands.

13. The method of claim 1, wherein the L-LTF includes a first OFDM symbol and a second OFDM symbol identical to the first OFDM symbol.

14. The method of claim 1, wherein the L-LTF includes a first OFDM symbol and a second OFDM symbol, the method further comprising:
   applying a P-matrix to the L-LTF so that the first OFDM symbol is different than the second OFDM symbol.

15. The method of claim 1, wherein the L-STF comprises a Golay sequence.

16. The method of claim 1, wherein information carried in the one or more SIG fields includes an indication of whether the PPDU is associated with a beamforming training operation.

17. The method of claim 1, wherein:
the PPDU further includes a data field and the method further includes mapping the data field to a second number of data subcarriers in accordance with a second sub-7 GHz PPDU tone plan that comprises M subcarriers including the second number of data subcarriers,
N is equal to 64,
M is equal to 256,
the BW is equal to 20*X MHz,
the first portion of the PHY preamble is duplicated in each of 4 sub-bands within the BW and upclocked by a factor of X/4,
each sub-band has a bandwidth of 5*X MHz, and
the data field is upclocked by a factor of X.

18. The method of claim 17, wherein the L-STF is mapped to only every $4^{th}$ data subcarrier of the first number of data subcarriers while the L-LTF and one or more L-SIG fields are mapped to every data subcarrier of the first number of data subcarriers.

19. The method of claim 17, wherein the first sub-7 GHz tone plan conforms to an IEEE 802.11ac 20 MHz tone plan and the second sub-7 GHz tone plan conforms to an IEEE 802.11be 20 MHz tone plan.

20. The method of claim 1, wherein:
the PPDU further includes a data field and the method further includes mapping the data field to a second number of data subcarriers in accordance with a second sub-7 GHz PPDU tone plan that comprises M subcarriers including the second number of data subcarriers,
N is equal to 64,
M is equal to 256,
the BW is equal to 80*X MHz,
the first portion of the PHY preamble is duplicated in each of 4 sub-bands within the BW,
each sub-band has a bandwidth of 20*X MHz, and
the data field is upclocked by a factor of X.

21. The method of claim 20, wherein the L-STF is mapped to only every $4^{th}$ data subcarrier of the first number of data subcarriers while the L-LTF and one or more L-SIG fields are mapped to every data subcarrier of the first number of data subcarriers.

22. The method of claim 20, wherein the first sub-7 GHz tone plan conforms to an IEEE 802.11ac 20 MHz tone plan and the second sub-7 GHz tone plan conforms to an IEEE 802.11ac 80 MHz tone plan.

23. A wireless communication device comprising:
at least one memory; and
at least one processor communicatively coupled with the at least one memory, the at least one processor configured to cause the wireless communication device to:
map a first portion of a physical layer (PHY) preamble of a PHY protocol data unit (PPDU) to a first number of data subcarriers in accordance with a first sub-7 GHz PPDU tone plan that comprises N subcarriers including the first number of data subcarriers, the first portion including a legacy short training field (L-STF), a legacy long training field (L-LTF), and one or more signal (SIG) fields;
transform the N subcarriers into a first time-varying signal using an N-point inverse fast Fourier transform (IFFT) and a sampling rate ($f_s$) that is equal to a bandwidth (BW) associated with transmission of the PPDU on a carrier frequency above 7 GHz such that a first subcarrier spacing (SCS) associated with the first portion of the PHY preamble is greater than 1.2 MHz; and
transmit the PPDU including the first time-varying signal on the carrier frequency that is above 7 GHz.

24. The wireless communication device of claim 23, wherein:
the PPDU further includes a data field and the at least one processor is further configured to cause the wireless communication device to map the data field to a second number of data subcarriers in accordance with a second sub-7 GHz PPDU tone plan that comprises M subcarriers including the second number of data subcarriers,
N is equal to 64,
M is equal to 256,
the BW is equal to 20*X MHz,
the first portion of the PHY preamble is duplicated in each of 4 sub-bands within the BW and upclocked by a factor of X/4,
each sub-band has a bandwidth of 5*X MHz, and
the data field is upclocked by a factor of X.

25. The wireless communication device of claim 23, wherein:
the PPDU further includes a data field and the at least one processor is further configured to cause the wireless communication device to map the data field to a second number of data subcarriers in accordance with a second sub-7 GHz PPDU tone plan that comprises M subcarriers including the second number of data subcarriers,
N is equal to 64,
M is equal to 256,
the BW is equal to 80*X MHz,
the first portion of the PHY preamble is duplicated in each of 4 sub-bands within the BW,
each sub-band has a bandwidth of 20*X MHz, and
the data field is upclocked by a factor of X.

26. A method of wireless communication performed by a wireless communication device comprising:
mapping a first portion of a physical layer (PHY) preamble of a PHY protocol data unit (PPDU) to a number (N) of subcarriers, the first portion including a short training field (STF) and one or more signal (SIG) fields carrying information for interpreting the PPDU;
mapping a second portion of the PHY preamble that includes a long training field (LTF) to a number (M) of subcarriers, where M>N;
transforming the N subcarriers and the M subcarriers to a time-varying signal; and
transmitting the PPDU including the time-varying signal on a carrier frequency above 7 GHz.

27. The method of claim 26, further comprising:
mapping, to the M subcarriers, at least a data field, a packet extension, or one or more other training fields (TRNs) of the PPDU.

28. The method of claim 26, wherein the N subcarriers and the M subcarriers are transformed to the time-varying signal at a sampling rate ($f_s$) associated with a subcarrier spacing (SCS) greater than 1.2 MHz, the SCS representing an amount of separation, in a frequency domain, between adjacent subcarriers of the N subcarriers.

29. Method of claim 28, wherein the first portion of the PPDU is duplicated for transmission on a number (n) of sub-bands each spanning a respective bandwidth portion of a bandwidth over which the PPDU is transmitted.

30. A wireless communication device comprising:
at least one memory; and at least one processor communicatively coupled with the at least one memory, the at least one processor configured to cause the wireless communication device to:

map a first portion of a physical layer (PHY) preamble of a PHY protocol data unit (PPDU) to a number (N) of subcarriers, the first portion including a short training field (STF) and one or more signal (SIG) fields carrying information for interpreting the PPDU;

map a second portion of the PHY preamble that includes a long training field (LTF) to a number (M) of subcarriers, where M>N;

transform the N subcarriers and the M subcarriers to a time-varying signal; and transmit the time-varying signal.

* * * * *